(12) United States Patent
Bradley

(10) Patent No.: US 8,646,735 B2
(45) Date of Patent: Feb. 11, 2014

(54) POST MOUNTING SYSTEMS AND ACCESSORIES

(76) Inventor: Seldon Bradley, Zionsville, IN (US)

( * ) Notice: Subject to any disclaimer, the term of this patent is extended or adjusted under 35 U.S.C. 154(b) by 1197 days.

(21) Appl. No.: 11/757,016

(22) Filed: Jun. 1, 2007

(65) Prior Publication Data

US 2008/0149791 A1 Jun. 26, 2008

Related U.S. Application Data

(63) Continuation-in-part of application No. 11/644,530, filed on Dec. 22, 2006, now Pat. No. 8,113,473.

(51) Int. Cl.
 *F16L 3/00* (2006.01)
 *F16M 11/00* (2006.01)

(52) U.S. Cl.
 USPC .......... 248/121; 248/188.1; 248/545; 256/32; 256/65.02

(58) Field of Classification Search
 USPC ................. 248/121, 127, 511, 519, 530, 545; 248/177.1, 218.4, 219.2, 188.1; 52/101; 256/65.02, 32, 47, 40, 44
 See application file for complete search history.

(56) References Cited

U.S. PATENT DOCUMENTS

| | | | | |
|---|---|---|---|---|
| 2,195,072 A | * | 3/1940 | Bauer | 256/65.03 |
| 2,291,170 A | | 7/1942 | Moths | |
| 3,818,868 A | * | 6/1974 | Boehland, Jr. | 119/431 |
| 4,249,715 A | * | 2/1981 | Repp | 248/545 |
| 4,326,352 A | * | 4/1982 | Barth | 40/607.06 |
| 4,520,231 A | | 5/1985 | Hubbell | |
| 4,576,364 A | * | 3/1986 | O'Fearna | 256/24 |
| 4,623,756 A | * | 11/1986 | Wilson, Jr. | 174/158 F |
| 4,680,428 A | | 7/1987 | Wilson, Jr. | |
| 5,085,409 A | | 2/1992 | Teixeira | |
| 5,332,196 A | * | 7/1994 | Wright | 256/47 |
| 5,356,101 A | * | 10/1994 | Malloy | 248/156 |
| 5,421,556 A | * | 6/1995 | Dodge et al. | 256/1 |
| 5,653,546 A | | 8/1997 | Cronkhite et al. | |
| 5,685,343 A | * | 11/1997 | Smith | 138/89 |
| 5,731,895 A | | 3/1998 | Owczarzak et al. | |
| 5,755,431 A | * | 5/1998 | Williams | 256/19 |
| 6,047,648 A | * | 4/2000 | Alm et al. | 108/157.16 |
| 6,330,998 B1 | | 12/2001 | Roy | |
| 6,394,228 B1 | | 5/2002 | Stephens et al. | |
| 6,543,750 B1 | | 4/2003 | Calzone | |
| 6,612,551 B1 | | 9/2003 | Roy | |
| 6,619,627 B2 | | 9/2003 | Salisbury et al. | |
| 6,691,479 B1 | | 2/2004 | Tscharner | |
| 6,960,728 B1 | | 11/2005 | Halderman | |
| 2004/0016915 A1 | | 1/2004 | Wood | |
| 2005/0127259 A1 | | 6/2005 | Riker | |
| 2006/0027796 A1 | | 2/2006 | O'Connor | |

OTHER PUBLICATIONS

Fencing Solutions, http://www.fencingsolutions.com/Descriptions. htm#Eqi-Tee%20Adapter, last printed Aug. 31, 2007, 1 page.
Fencing Solutions, http://www.fencingsolutions.com/index.htm, last printed Aug. 31, 2007, Equi-Tee Farm & Fence, 2 pages.

* cited by examiner

*Primary Examiner* — Anita M King
(74) *Attorney, Agent, or Firm* — Woodard, Emhardt, Moriarty, McNett & Henry LLP

(57) ABSTRACT

Described in certain embodiments are mounting systems that employ one or more T-posts to support useful implements such as birdhouses, signs, fencing, banners, and the like. Additional disclosed embodiments relate to unique post- or wall-mount systems for such implements.

4 Claims, 43 Drawing Sheets

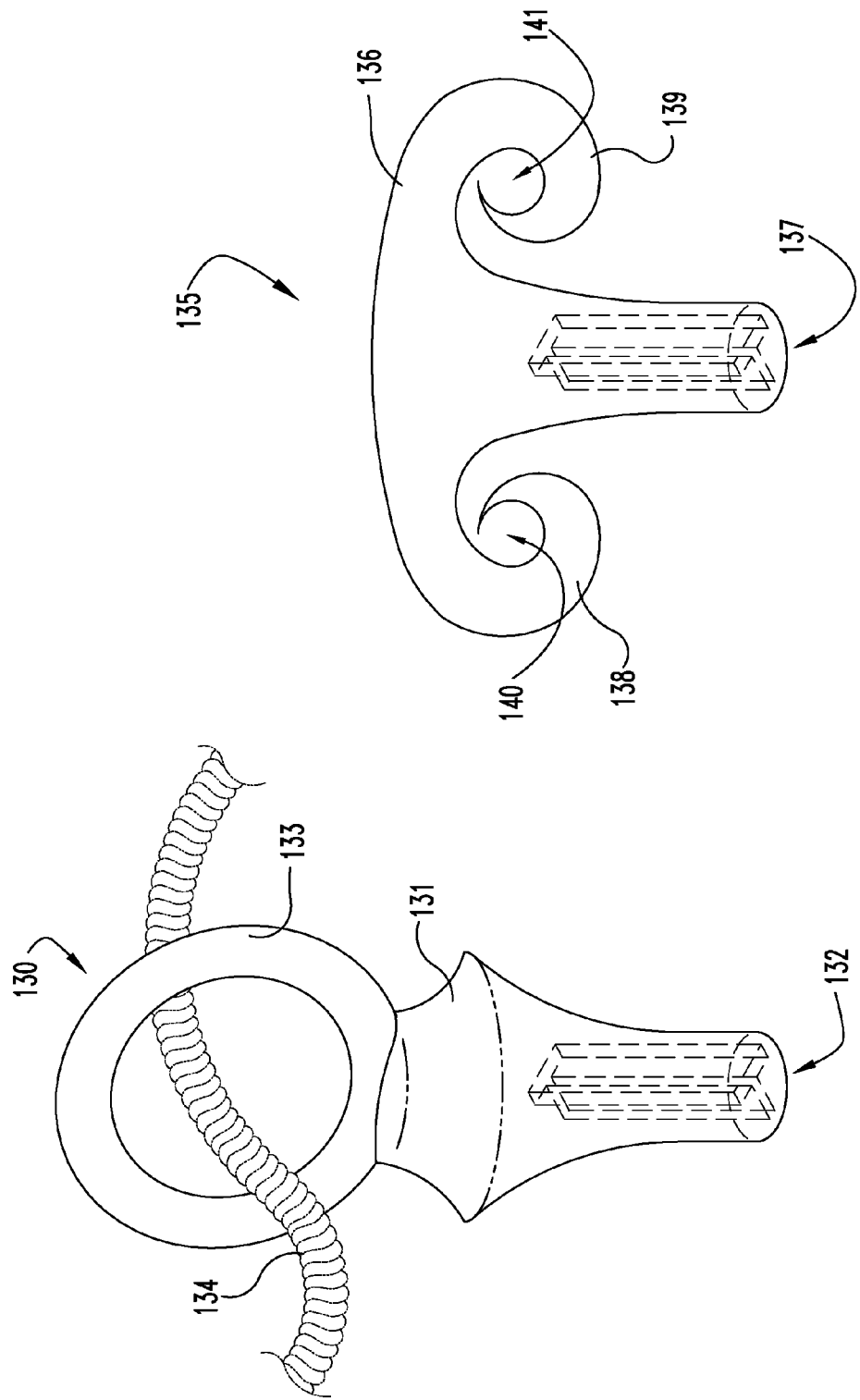

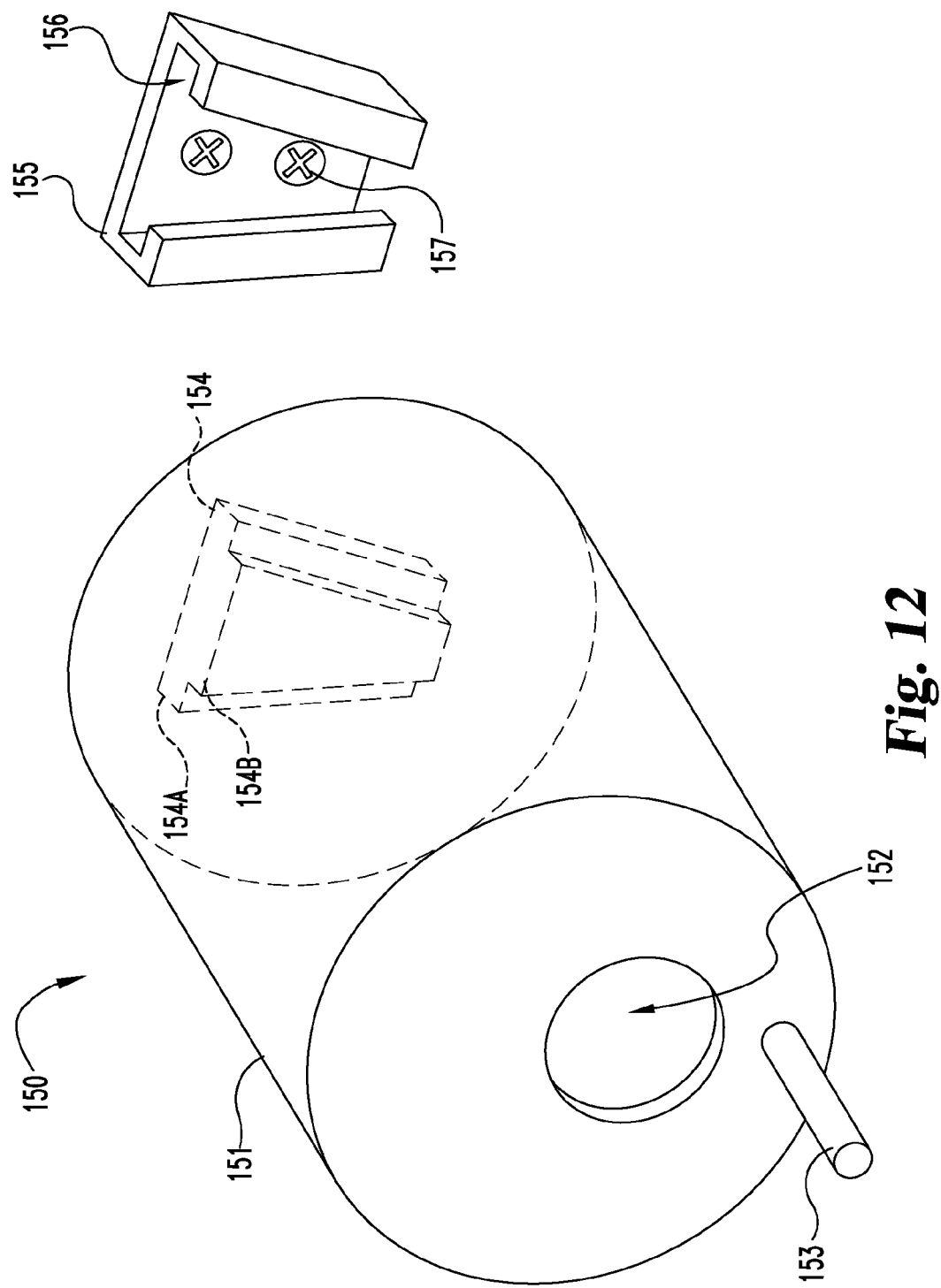

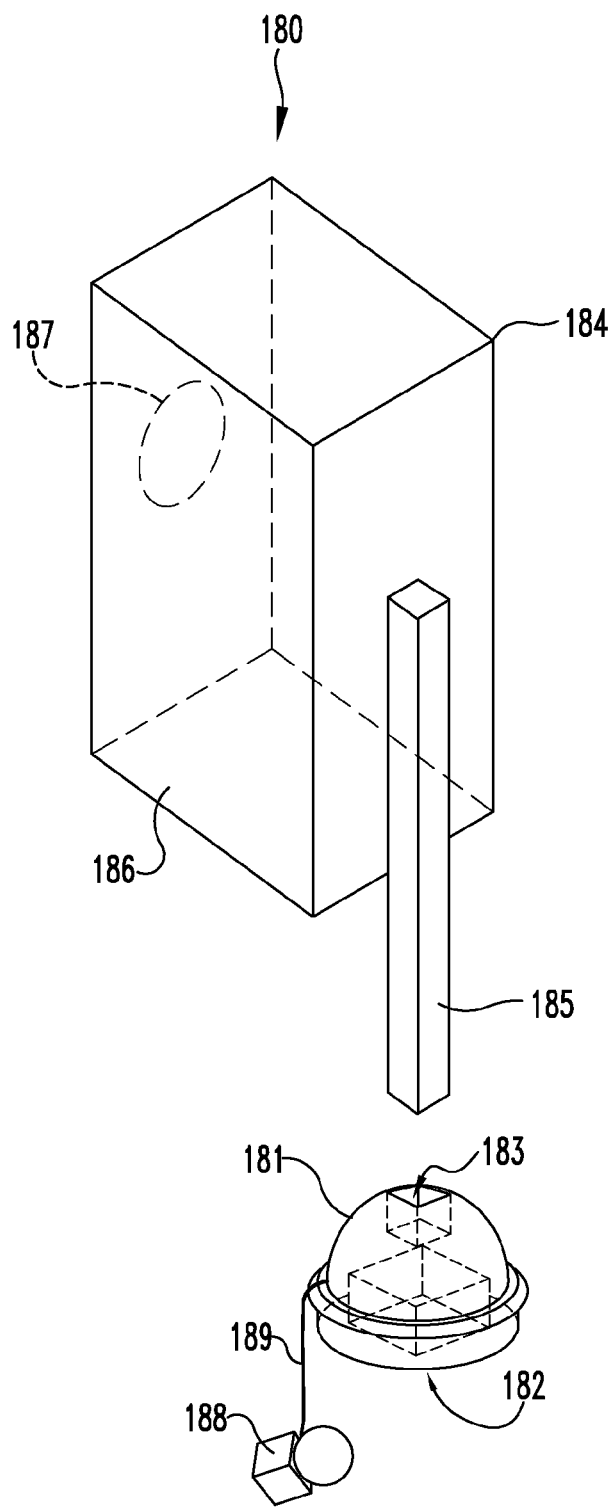
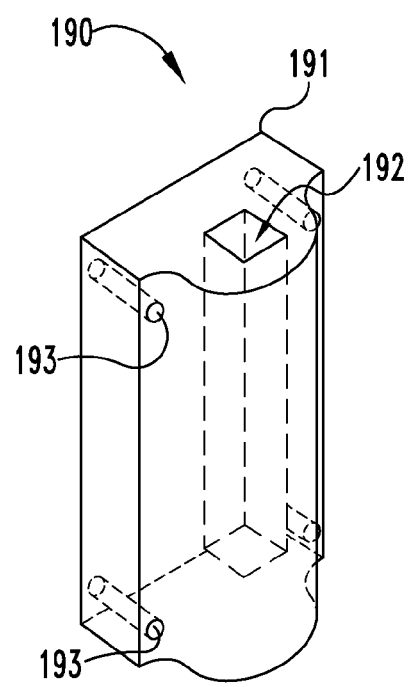
Fig. 14
Fig. 15

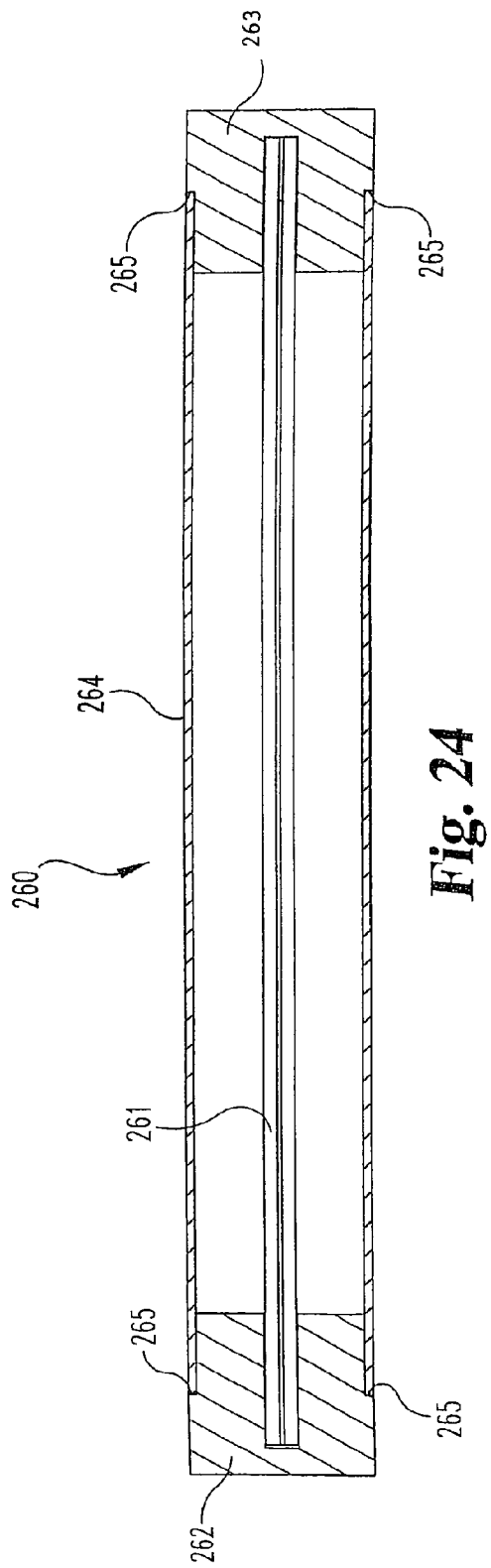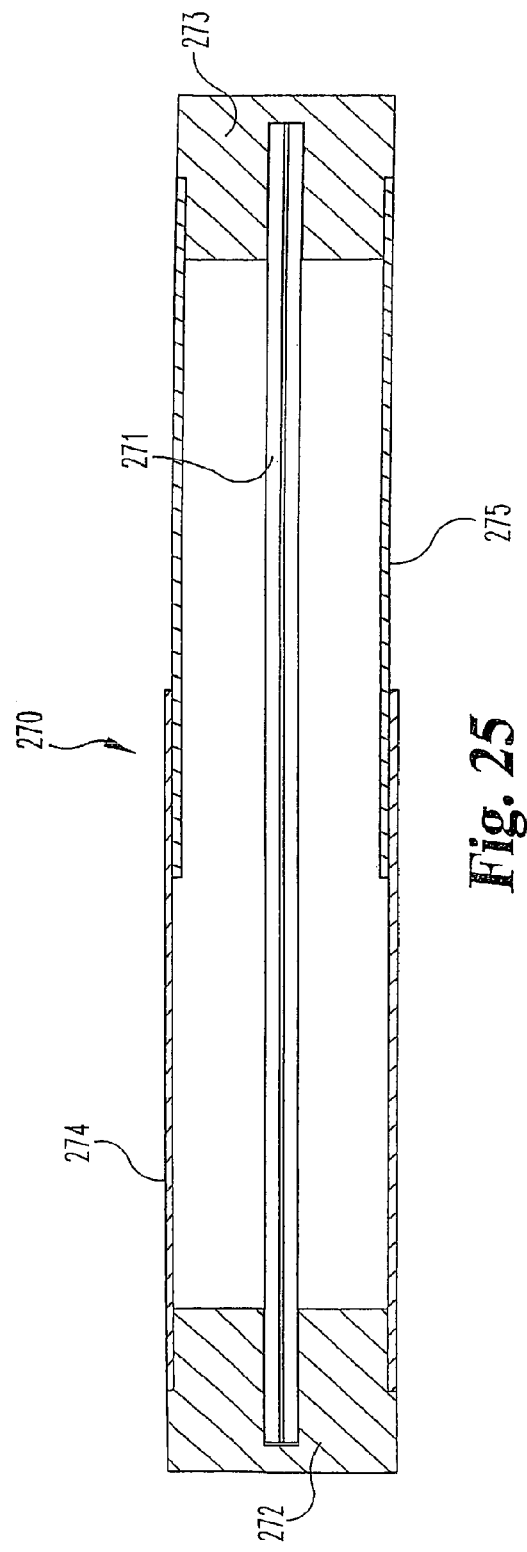

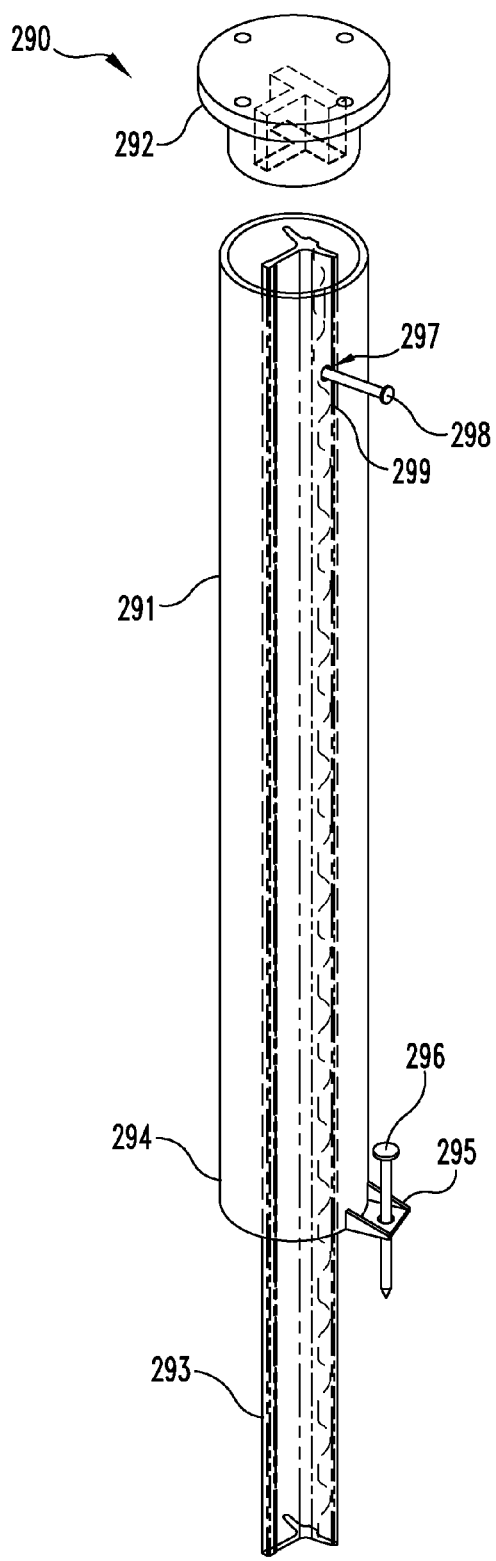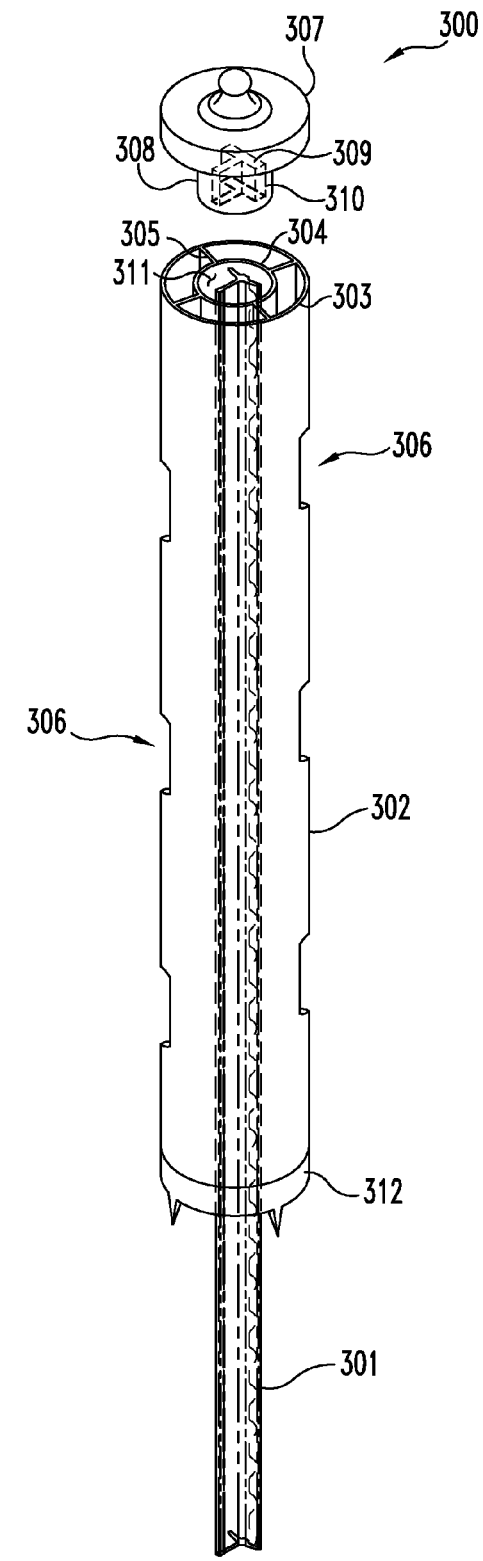
*Fig. 27*  *Fig. 28*

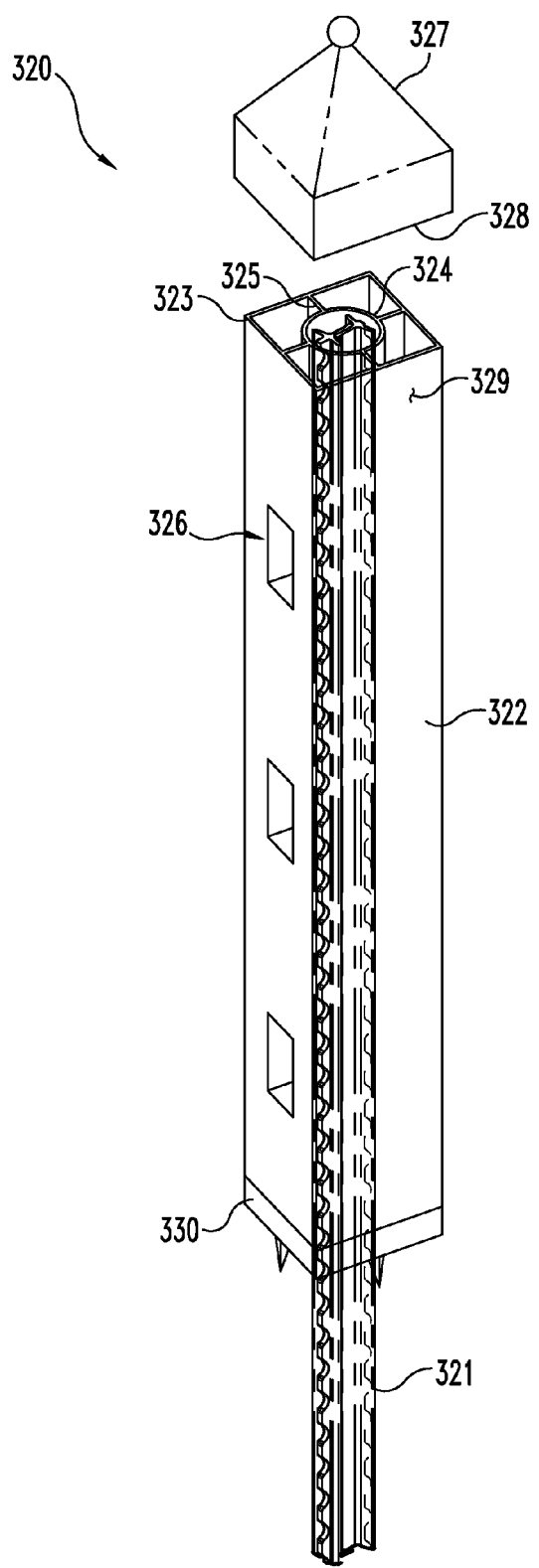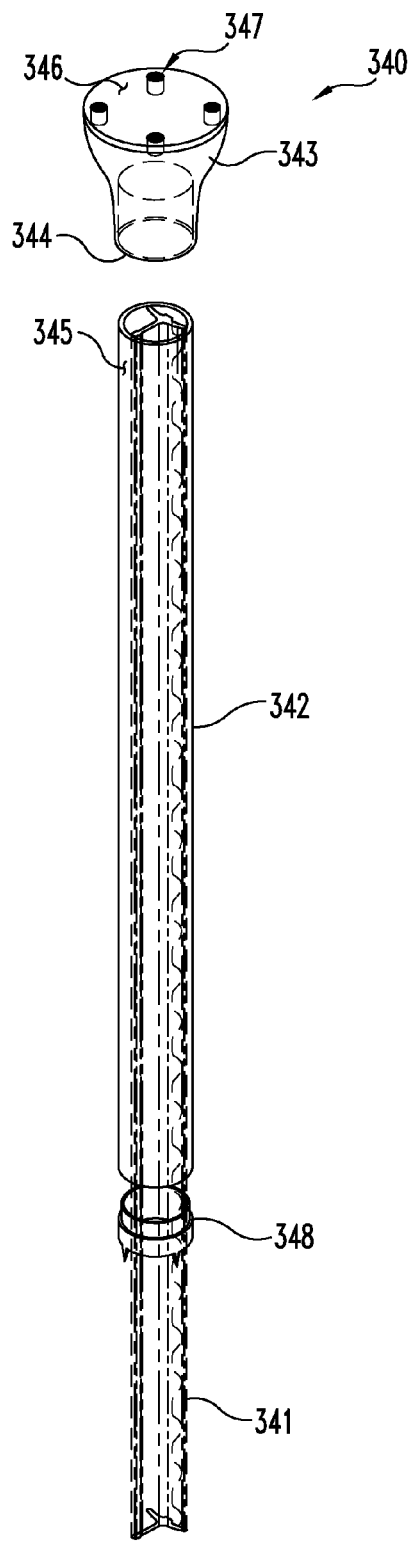
*Fig. 29*
*Fig. 30*

POST MOUNTING SYSTEMS AND ACCESSORIES

REFERENCE TO RELATED APPLICATION

The present application is a continuation-in-part patent application of U.S. patent application Ser. No. 11/644,530 filed Dec. 22, 2006 now U.S. Pat. No. 8,113,473 entitled T-POST AND OTHER MOUNTING SYSTEMS AND ACCESSORIES which is hereby incorporated by reference in its entirety.

BACKGROUND

The present invention relates generally to systems for mounting useful implements such as birdhouses, mailboxes, and signage, and in certain of its aspects to such systems which utilize post structures, and especially T-posts.

As further background, the need often arises to mount useful objects such as in residential, commercial, public, or other environments. Available mounting systems have flaws ranging from high end units that are overly complex and expensive to low end units that, while being inexpensive, offer inadequate stability. On the other hand, T-posts, including studded steel T-posts, are sturdy, relatively easy to install, manufactured in large numbers, and relatively inexpensive. Nonetheless, the adoption of T-post based mounting systems has been quite limited, perhaps due to their unrefined appearance and the unavailability of acceptable designs for supporting structures on or by T-posts.

In another area with which certain aspects of the invention are concerned, select few individuals mount birdhouses in or around their residences or commercial buildings, despite the fact that much natural bird habitat is being destroyed by residential and commercial development. In many instances, this may be due to a lack of satisfactory commercial products for mounting birdhouses. Needs therefore exist for improved and convenient systems for mounting birdhouses so that their numbers and use can increase.

In still other areas in which the present invention is concerned, increasing usages of signs, fencing and other implements drives needs for improved or alternative support systems.

These and other needs are addressed by various aspects of the present invention.

SUMMARY

In certain of its embodiments, the present invention provides unique accessories for and uses of T-posts. These inventive embodiments include, for example, improved mating configurations for accessories to be mounted atop T-posts, multi-purpose mount accessories for receipt atop T-posts, T-post mounted accessories with novel structural and functional features such as rope holders and lateral support members for supporting adjacent objects, unique birdhouse systems with T-post mounting, T-post based fence constructions, and systems and accessories involving the use of multiple associated T-posts to support vertical and/or lateral loads.

In additional embodiments of the invention, support systems and accessories are provided that can utilize T-posts supports or other post or wall-mounted support structures. These include, as examples, post-mounted systems including top-mounted cap, sleeve and footing elements, post-mounted spinner devices, post-mounted banner systems, and post mounting systems including a top-mounted element in combination with a removable secondary mounting element, as well as corresponding wall mounting systems including a first element mountable on a wall and a removable second element co-operable with the wall-mounted element.

Additional embodiments of the invention as well as features and advantages thereof will be apparent from the descriptions herein.

BRIEF DESCRIPTION OF THE FIGURES

FIG. 10 provides a perspective view of a T-post mounted rope holder of the invention.

FIG. 11 provides a perspective view of a T-post mounted dual rope holder of the invention.

FIG. 12 provides a perspective view of a wall-mounted birdhouse system of the invention.

FIG. 14 provides a perspective view of a post-mounted birdhouse system of the invention.

FIG. 15 provides a perspective view of a wall-mounted plate co-operable with the birdhouse component of FIG. 14.

FIG. 24 illustrates a T-post reinforced cross-board that can be used in the fencing system of FIG. 20.

FIG. 25 illustrates a telescoping cross-board that can be used in the fencing system of FIG. 20.

FIG. 27 illustrates an alternative T-post mounting assembly of the invention.

FIG. 28 illustrates an alternative T-post-supported fence post assembly of the invention.

FIG. 29 illustrates an alternative T-post-supported fence post assembly of the invention.

FIG. 30 illustrates an alternative post mount assembly of the invention.

DETAILED DESCRIPTION

Figure 1:
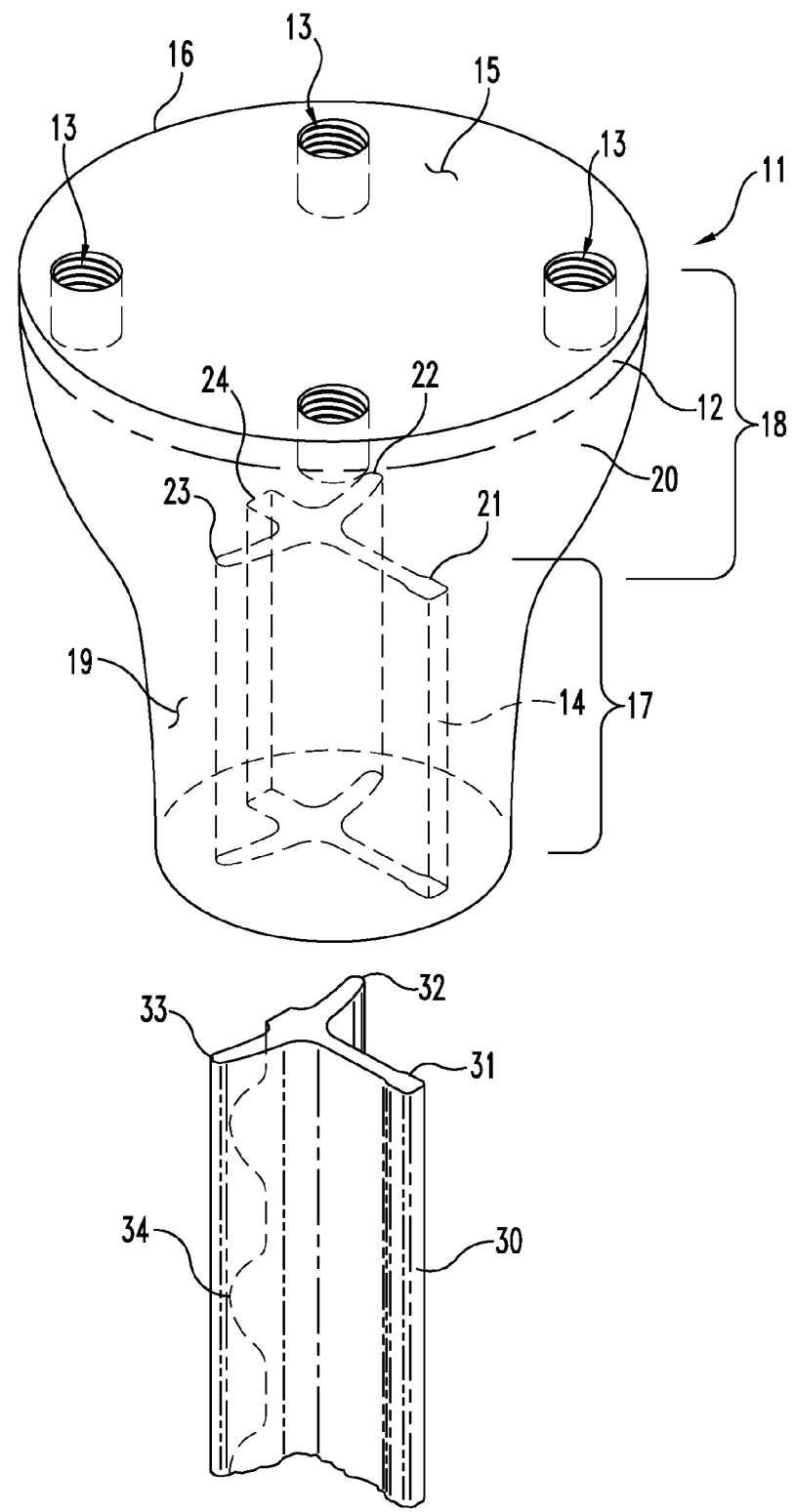
FIG. 1 provides a perspective view of a universal mount plate for receipt atop a T-post.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference now to FIG. 1, shown is one embodiment of a multi-purpose mounting plate 11 of the invention. Mounting plate 11 includes a generally solid body 12 having a plurality of mounting apertures 13 in an upper surface thereof, optionally threaded as shown. Body 12 defines an internal void 14 opening to a lower surface thereof, which is sized and shaped for receiving an upper end of a T-post 30 in such a fashion as to securely mount body 12 on T-post 30.

Body 12 also includes an upper bearing surface 15 in which mounting apertures 13 are defined. Upper bearing surface 15 includes a generally circular perimeter 16, although other regular or irregular shapes such as squares, triangles, hexagons, and the like, will also be suitable. In the illustrated embodiment, body 12 includes a first portion 17 for mounting upon the T-post 30, and a second portion 18 defining upper mounting surface 15 and apertures 13. In preferred embodiments, T-post mounting portion 17 is formed as an integral piece with a solid cross-section apart from void 14 defined therein. In this manner, a sturdy, stable and lasting engagement of T-post 30 can be achieved. In the illustrated embodiment, mounting plate 11 includes an outer surface 19 of T-post mounting portion 17 which tapers to a larger diameter 20 of upper portion 18.

Internal void 14 is configured for association with a T-post, and includes a first longer void portion 21 for mating with longer leg 31 of T-post 30, two intermediate sized void portions 22 and 23 for mating, respectively, with leg portions 32 and 33 of T-post 30, and a fourth void portion 24 sized to receive spines 34 of T-post 30.

Figure 2:
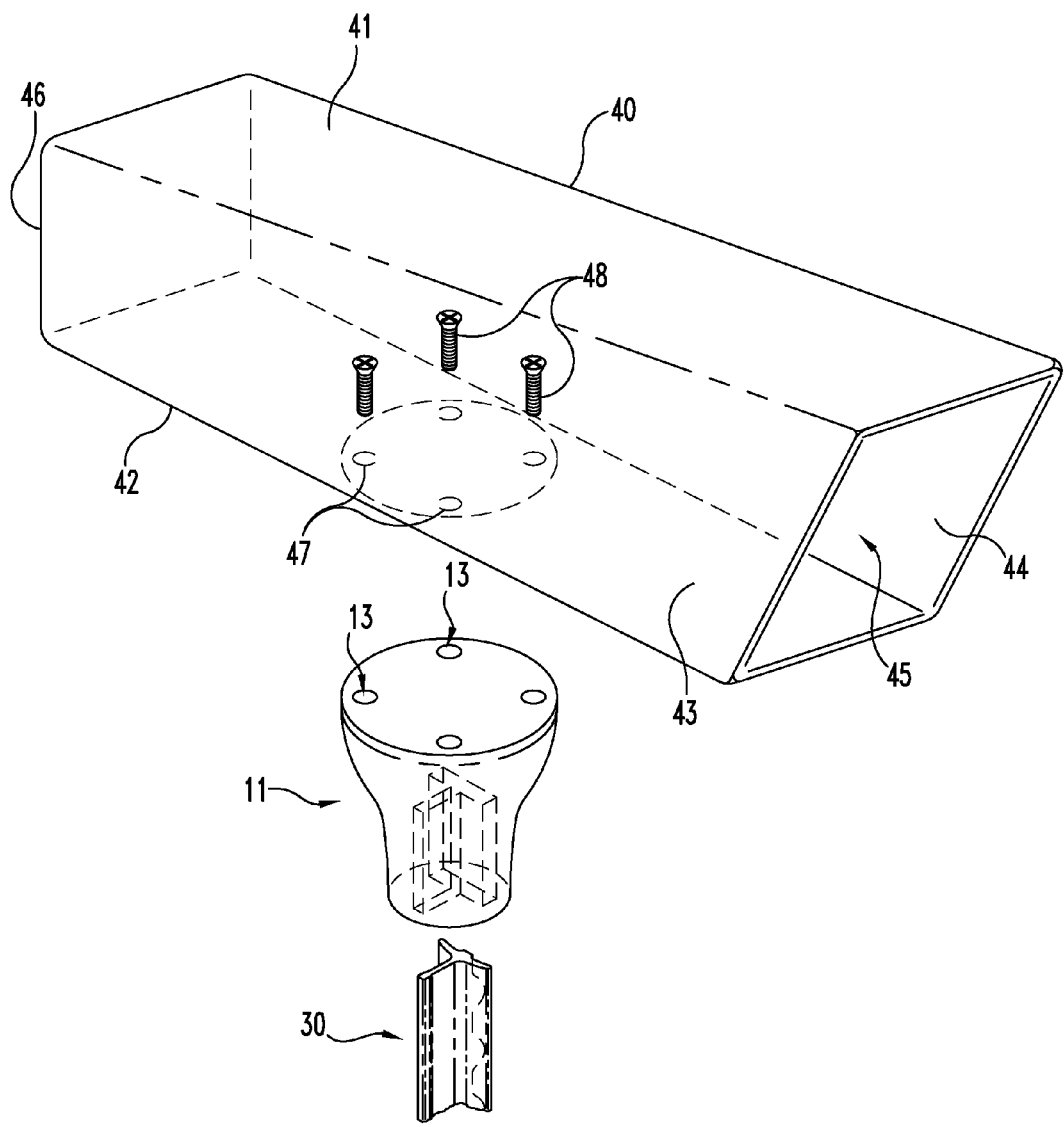
FIG. 2 provides a perspective view of the mount plate of FIG. 1 in use to support a mail or paper box.

With reference now to FIG. 2, shown is a mount plate 11 as in FIG. 1 in use to support a useful accessory, in the illustrated case the accessory being a box or container structure 40. Box or container structure 40 can be designed as a mailbox or newspaper box, and can include an upper wall 41, a lower wall 42, and side walls 43 and 44 extending therebetween. Box 40 in the illustrated embodiment also includes a frontal opening 45 and a rear wall 46. Apertures 47 are defined within lower wall 42 of box 40 and are in registry with apertures 13 of mounting plate 11. In this fashion, bolts 48 or other suitable connectors can be utilized to secure box 40 to mounting plate 11 which in turn is mounted upon T-post 30.

Figure 3:
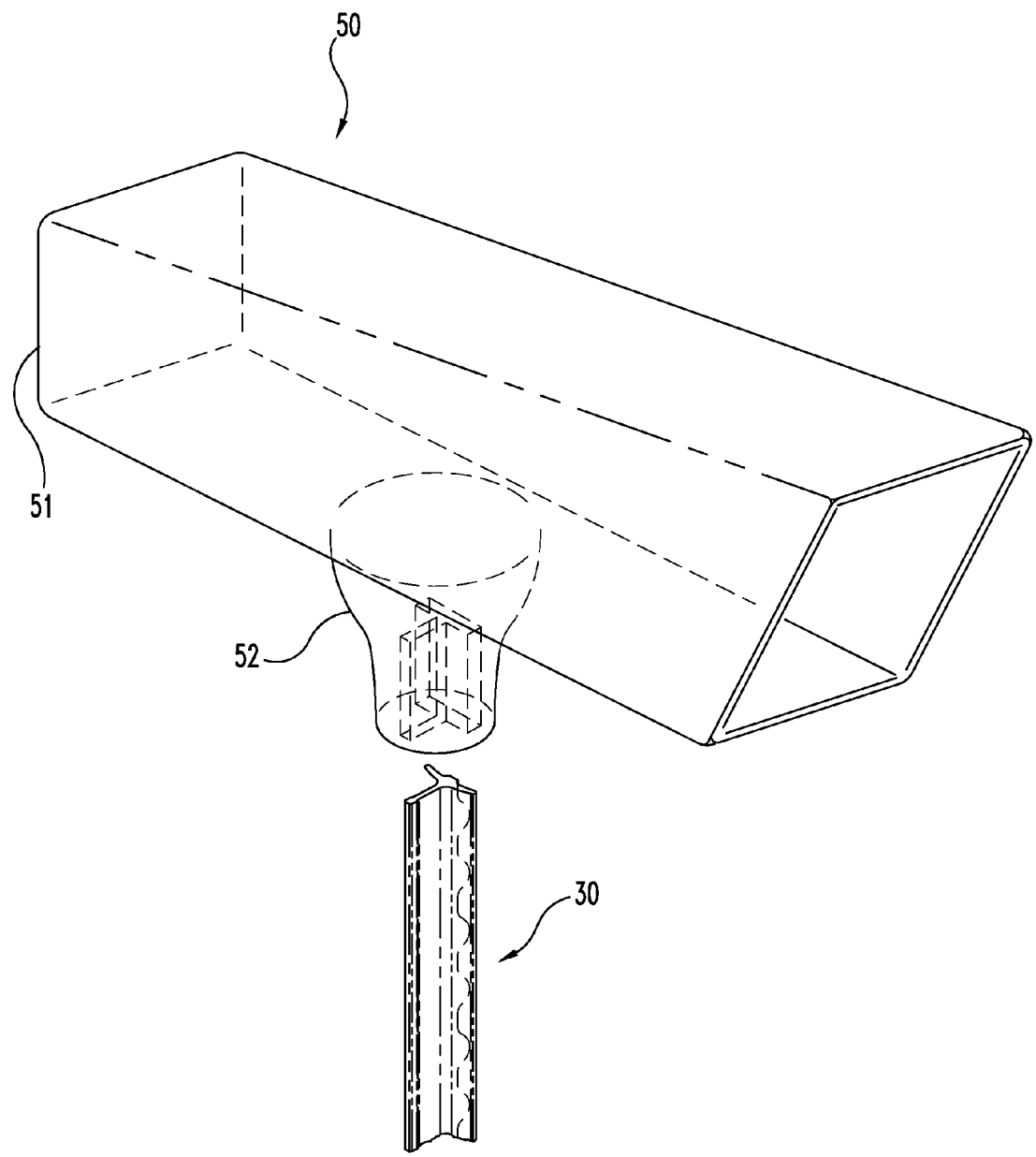
FIG. 3 provides a perspective view of a mail or paper box with an integrated T-post mount element.

With reference to FIG. 3, illustrated is another embodiment of the invention in which a T-post mounted system 50 includes a box or container 51 having a downwardly depending mount element 52 integrally formed or bonded thereto. In this manner, the use of bolts or other fasteners in mounting box 51 to T-post 30 can be avoided.

Figure 4:
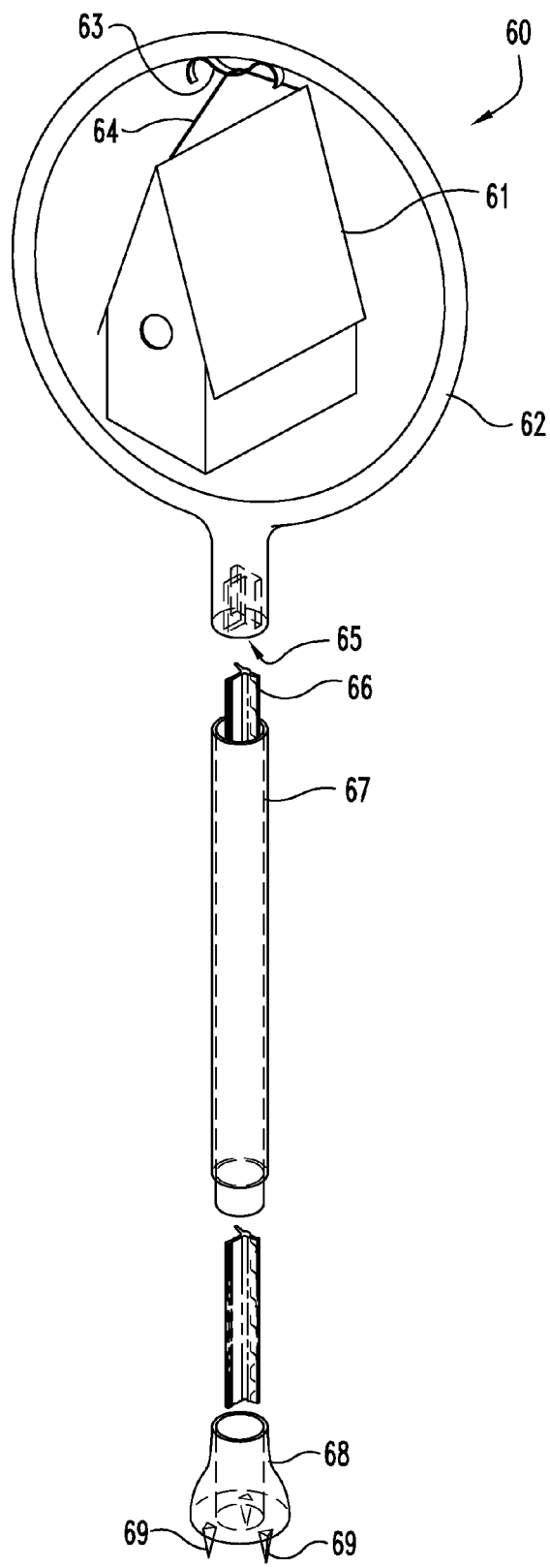
FIG. 4 provides a perspective view of a T-post mounted birdhouse and support system of the invention.

Referring now to FIG. 4, shown is a T-post mounted system 60 of the invention for supporting a birdhouse. In particular, system 60 includes a birdhouse structure 61 and an upstanding loop structure 62 within which birdhouse structure 61 is supported. In the illustrated embodiment, loop structure 62 has a retaining member 63 supported thereon, from which birdhouse structure 61 is supported with a supporting element 64. In the illustrated embodiment, supporting element 64 is shown as an elongate string or wire. It will be understood that other supporting elements such as hooks, snaps, or other attachments can also be used within the spirit and scope of the present invention.

Loop structure 62 is connected to a downwardly depending collar portion having an internal void 65 defined therein and configured to snugly mate with the top end of a T-post 66. System 60 further includes a sleeve element 67 covering T-post 66, as well as a footing element 68 mateable with sleeve element 67 and also including protruding member 69 for engaging within the ground in which T-post 66 is received. In this fashion, footing element 68 with spikes, barbs, or other protrusion 69 can serve to stabilize the overall accessory system and prevent rotation of sleeve 67 in situations wherein sleeve 67 does not have internal voids which conform to the T-post or otherwise interact with the T-post to resist rotation.

Figure 5:
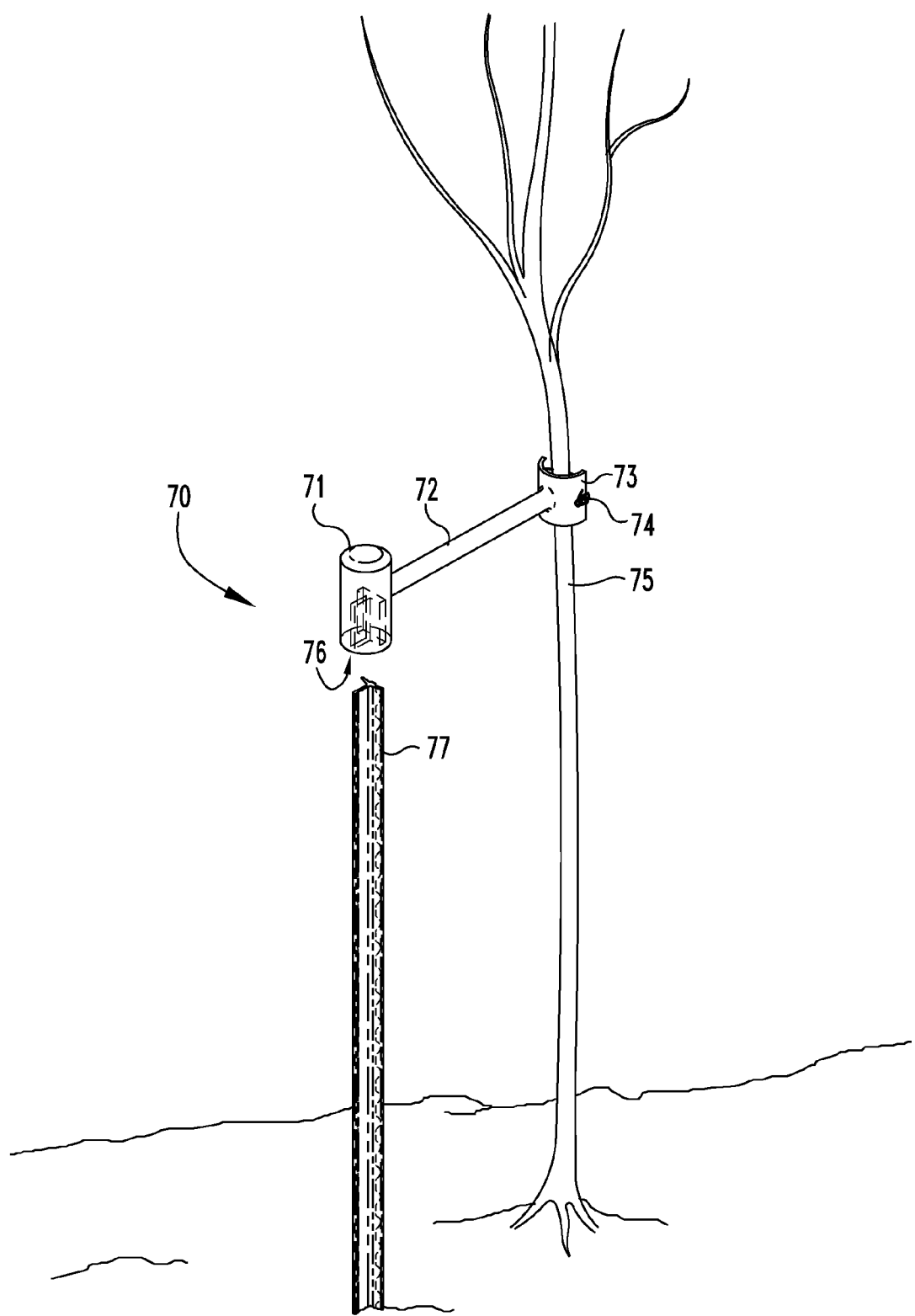
FIG. 5 provides a perspective view of a T-post mounted tree support system of the invention.

With reference to FIG. 5, shown is another T-post mounted system 70 of the invention. System 70 is designed to utilize a T-post 77 to stabilize an adjacent structure. System 70 includes a top-mounted collar element 71 having a lateral arm 72 extending therefrom and a T-post-receiving aperture 76. Engaging portion 73 is supported at the end of lateral arm 72 and can as in the illustrated embodiment define an inner region into which a tree 75 or other adjacent structure can be received. System 70 can also include a tethering element 74 or other element cooperable with engaging portion 73 to enable portions of system 70 to fully encompass tree 75 or another similar structure to be supported. It will be understood that if desired, sleeve and footing elements as shown in the system of FIG. 4 can be provided in the system of FIG. 5.

Figure 6:
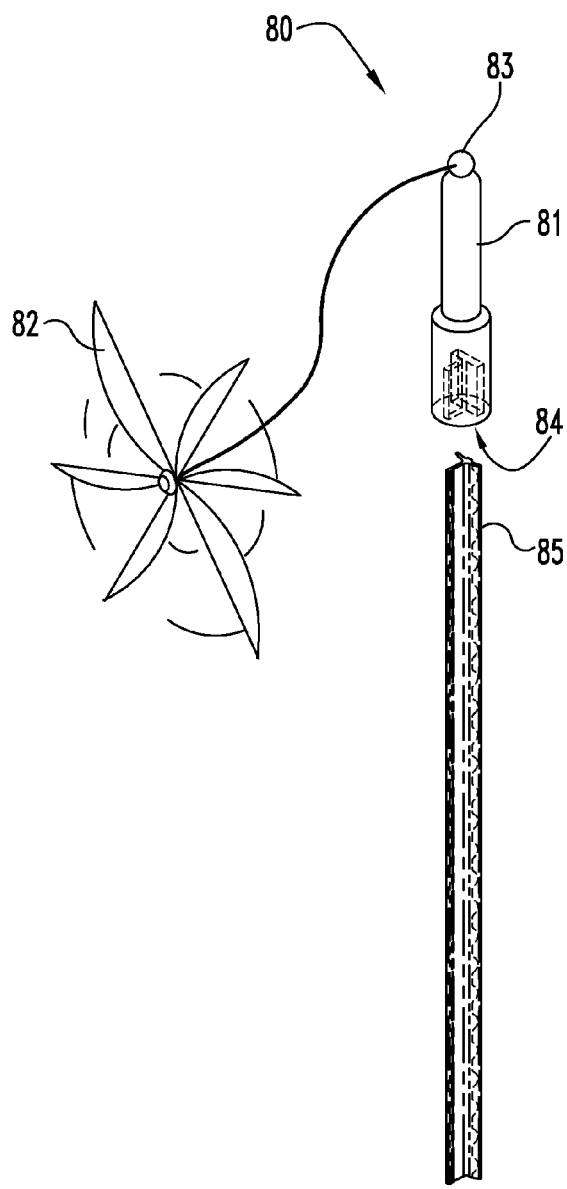
FIG. 6 provides a perspective view of a T-post mounted spinning device of the invention.
Figure 7:
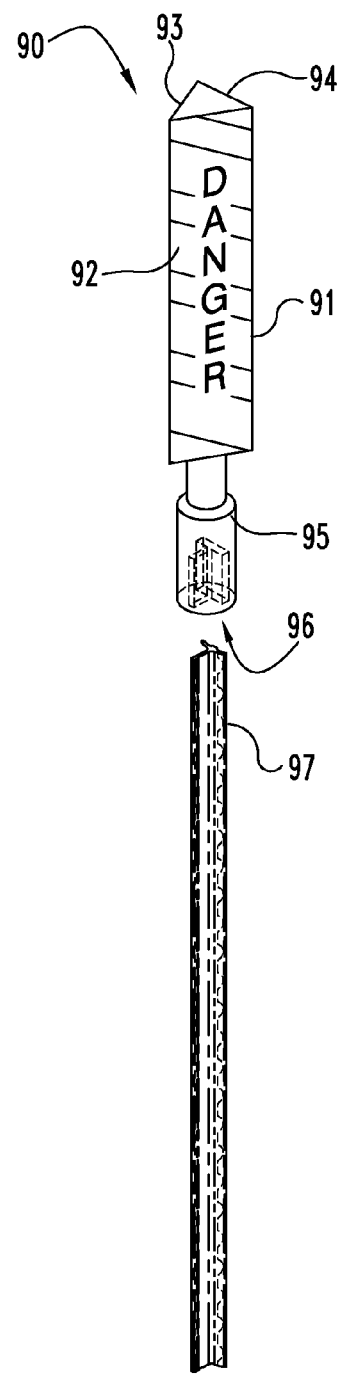
FIG. 7 provides a perspective view of a T-post mounted sign of the invention.

Referring now to FIGS. 6 and 7, shown are additional T-post mounted systems of the invention. In particular, shown in FIG. 6 is a decorative or amusement system 80 that includes a support component 81 mountable on T-post 85 and an element 82 depending therefrom configured to be impelled to motion upon impingement by wind or other moving air streams. Element 82 can, as illustrated, be a fan having a plurality of blades. Element 82 is rotatably connected to support 81 by a flexible wire, string or other filament 83. Support 81 includes an internal void 84 configured to mate with T-post 85. Referring to FIG. 7, shown is system 90 configured as a sign and/or reflector. System 90 includes an upstanding sign and/or reflector portion 91 which in the illustrated embodiment defines a triangular profile including a first surface 92, a second surface 93, and a third surface 94, some or all of which can carry the same or different messages and/or reflective qualities. Sign portion 91 includes a downwardly depending collar 95 having a void 96 defined therein sized and shaped to snugly mate with T-post 97. With systems 80 and 90 illustrated in FIGS. 6 and 7, respectively, it will be understood that sleeve and footing elements as illustrated in FIG. 4 could be included as well.

Figure 8:
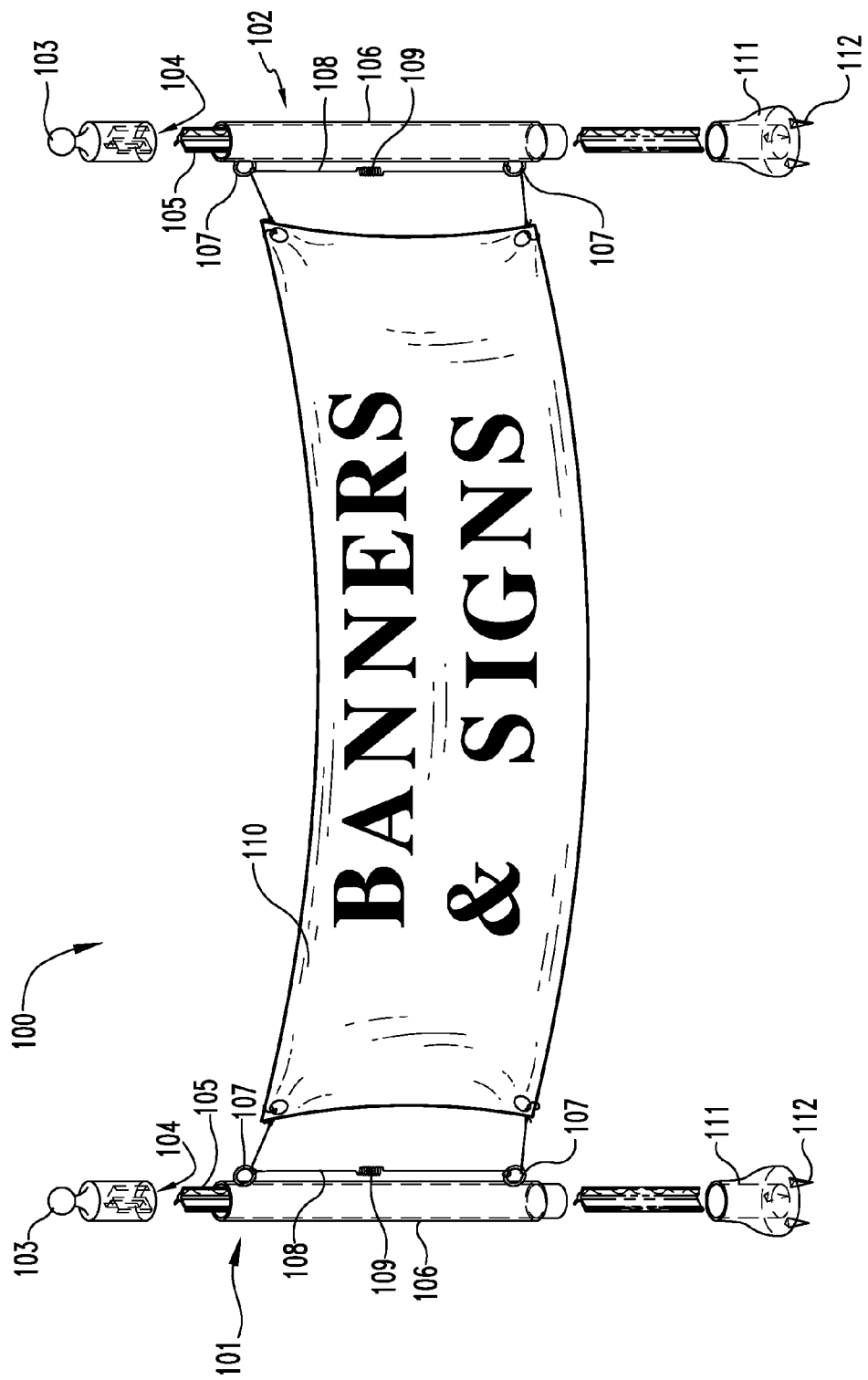
FIG. 8 provides a perspective view of a T-post supported banner system of the invention.

With reference to FIG. 8, shown is a banner system 100 in accordance with one embodiment of the invention. Banner system 100 includes a first post 101 and a second post 102. Posts 101 and 102 each include an upper cap element 103 which can have functional and/or decorative features, defining an internal void 104 for mating with an upper end of a T-post 105. Posts 101 and 102 each include a sleeve element 106 having attached thereto or formed therewith mounting rings 107. System 100 further includes a rope, string, wire or other elongate flexible member 108 received through mounting rings 107 and attached to banner or sign member 110 for bearing a message. Banner or sign member 110 can be constructed of a flexible or rigid material and can bear a message or other image for display. In the illustrated system 100, also included are tension springs 109 connected to flexible members 108 and configured to maintain tension on the banner 110 via flexible members 108. It will be understood in this regard that other similar means for maintaining tension on banner 110 can be used, for example by including elongate flexible members 108 that possess elasticity or other memory properties suitable to maintain tension on banner 110 such as, for example, devices commonly as known as "bungee cords". In addition or alternatively, springs 109 may be replaced by cinching devices or clips operable to secure flexible members 108 after they are manually drawn to the desired level of tension. In the illustrated system 100, posts 101 and 102 also each include a footing element 111 mateable with sleeve element 106 and including ground-engaging members 112 such as spikes.

Figure 9:
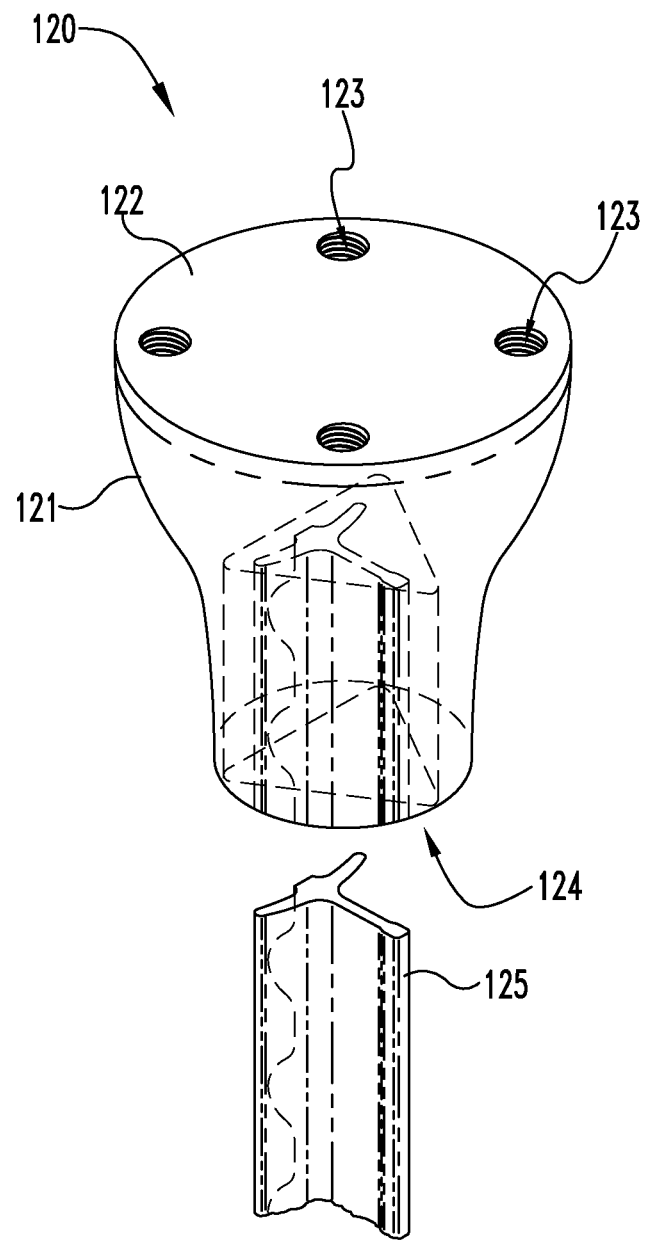
FIG. 9 provides a perspective view of a T-post mounted support plate of the invention having an alternative T-post mating configuration.

With reference now to FIG. 9, shown is another mounting plate embodiment 120 of the present invention. Mounting plate 120 is similar to that shown in FIG. 1, including downwardly depending side walls 121, an upper bearing surface 122 and apertures 123. Mounting plate 120, however, defines an internal void 124 non-conforming to the contours of T-post 125. Instead, void 124 in the illustrated embodiment has a generally triangular shape but is sized so as to frictionally contact the outer most projecting surfaces of T-post 125 to stably retain mounting plate 120 on T-post 125 and also avoid rotation thereof. It will be understood in this regard that other non-conforming shapes that nonetheless frictionally engage T-post 125 in a fashion which resists rotation can be used in additional embodiments of the invention, including for example both polygonal and non-polygonal shapes.

With reference now to FIGS. 10 and 11, shown are T-post mounted rope holders in accordance with the invention. The holder 130 of FIG. 10 includes a mounting portion 131 defining an internal void 132 configured to mate with a T-post. Holder 130 also includes an upstanding, closed loop structure 133 through which a rope 134 or other elongate article can be received. In FIG. 11, alternate holder 135 includes a body 136 defining an internal void 137 for mating with a T-post. Body 136 also includes a first arm 138 and a second arm 139 defining openings 140 and 141, respectively, for receiving a rope or other elongate article.

With reference to FIG. 12, shown is a wall-mountable birdhouse system 150. System 150 includes a housing structure 151 defining an internal enclosure and opening 152 into the defined enclosure. Structure 151 also includes a perch 153 mounted adjacent opening 152. Housing structure 151 also includes a mounting element 154 attached to its rear surface. Mounting element 154 is generally trapezoidal in shape and includes a first portion 154A spaced from the rearward wall of structure 151 be a second portion 154B. Mounting structure 154 can thereby cooperate with a wall-mounted receiver 155 defining a trapazoidally-shaped opening 156 sized and shaped to receive portion 154A of mounting structure 154 whereby housing structure 151 can be stably supported by receiver 155 under the force of gravity. Receiver 155 can be mounted to an adjacent wall structure by connectors 157, such as screws or bolts, received through respective apertures in receiver 155.

Figure 13:
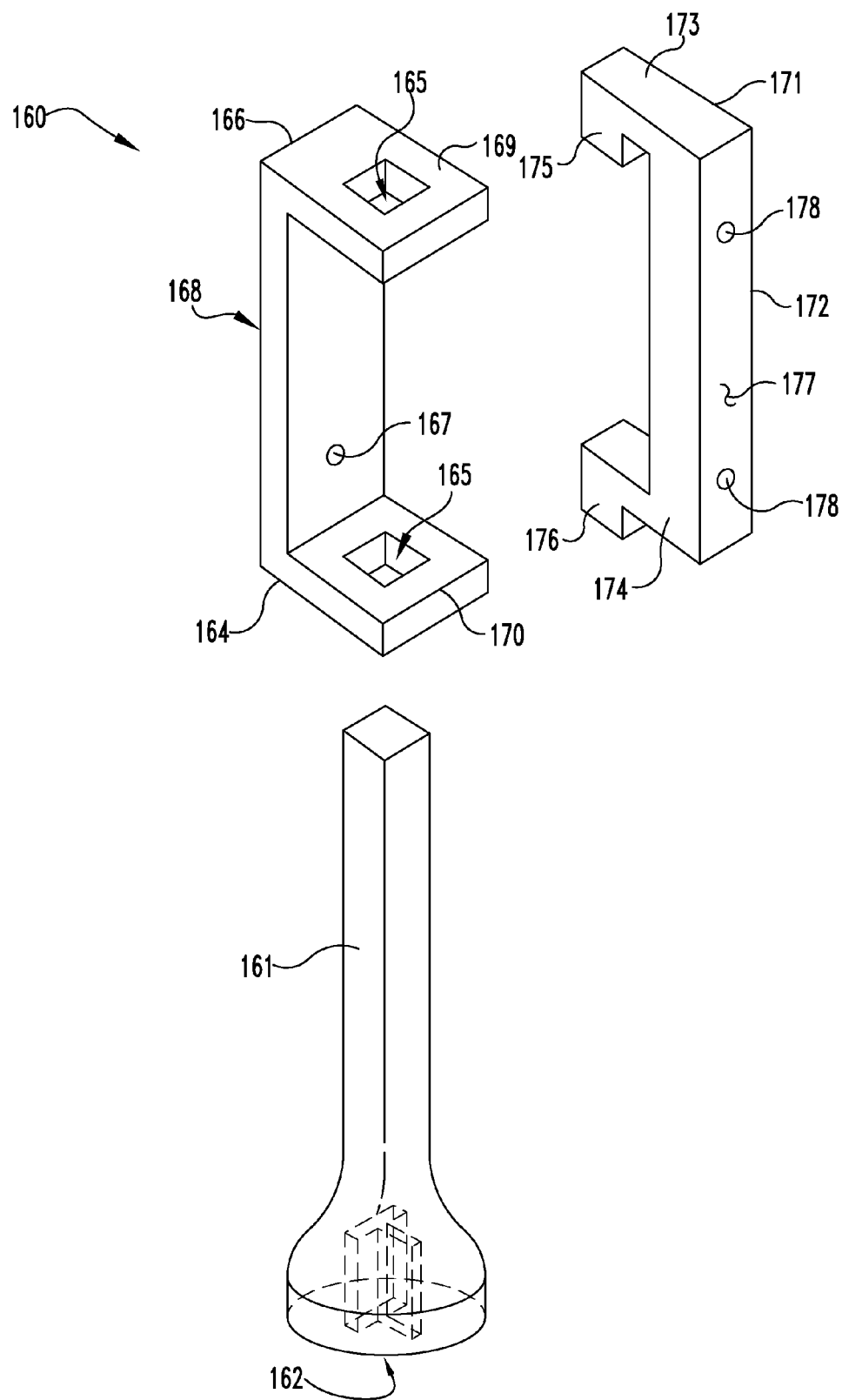
FIG. 13 provides a perspective view illustrating post-mounted and/or wall-mounted support systems of the invention including first and second cooperating elements.

FIG. 13 illustrates another multi-purpose mounting system of the present invention. System 160 in one embodiment includes a first component having an upstanding post 161 and defining an internal void 162 sized and shaped for receipt upon the top of a T-post. A cooperating mounting element 164 defines at least one opening and preferably two openings 165 corresponding in shape and size to receive over post 161. Mounting element 164 includes an upstanding wall 166 defining at least one aperture 167 and preferably multiple such apertures for attachment of an accessory, such as a birdhouse, against the outward face 168 of the mounting structure 164 with appropriate connectors. Mounting structure 164 also includes arms 169 and 170 extending transversely relative to wall 166, and preferably perpendicularly thereto, which define openings 165.

FIG. 13 also usefully illustrates a wall-mounting system that includes mounting structure 164 and a cooperating secondary mounting structure 171 having portions receivable within openings 165 of mounting structure 164. Secondary mounting structure 171 thus includes an upstanding arm 172 and lateral arms 173 and 174 extending transversely and desirably perpendicularly to upstanding arm 172. Lateral arms 173 and 174 define respective downwardly-extending portions 175 and 176 which are sized for receipt within openings 165 of mounting structure 164. In use, mounting structure 164 can be mounted to an adjacent wall of a house or other structure using connectors extending through apertures 167. Secondary mounting structure 171, attached to an accessory such as a birdhouse received against the outward face 177 and using appropriate connectors extending through apertures 178, can be positioned with portions 175 and 176 over top openings 165, and lowered into place to mount the accessory to the adjacent wall.

With reference to FIG. 14, shown is another birdhouse mounting system 180 in accordance with the invention. System 180 includes a cap and mounting element 181 defining an inner void 182 for receipt atop a post, such as a T-post or a post of a wooden or chain-link fence. Element 181 defines a second void 183 opening to an upper surface thereof and providing means for mounting an accessory. In the illustrated embodiment, a birdhouse includes a housing structure 184 and a mounting post 185. Mounting post 185 has a lower portion receivable within void 183 of capping and mounting element 181. Housing structure 184 defines an internal enclosure 186 for housing birds and provides an opening 187 for access to the enclosure 186. Cap and mounting element 181 also includes an alternate square void plug 188 attached by a tether 189.

With reference to FIG. 15, in combination with the birdhouse structure illustrated in FIG. 14, usefully illustrated is a wall-mounting system 190 for mounting a birdhouse. System 190 includes a wall-mounted element 191 defining an internal opening or void 192 for receiving mounting post 185 of the illustrated birdhouse structure. Wall mounted element 191 further defines apertures 193 which can be used to mount the element 191 to an adjacent wall structure with appropriate connectors. Once so mounted, the illustrated birdhouse structure can be removably received within wall mounted element 191 by lowering post 185 into opening 192.

Figures 16, 17:
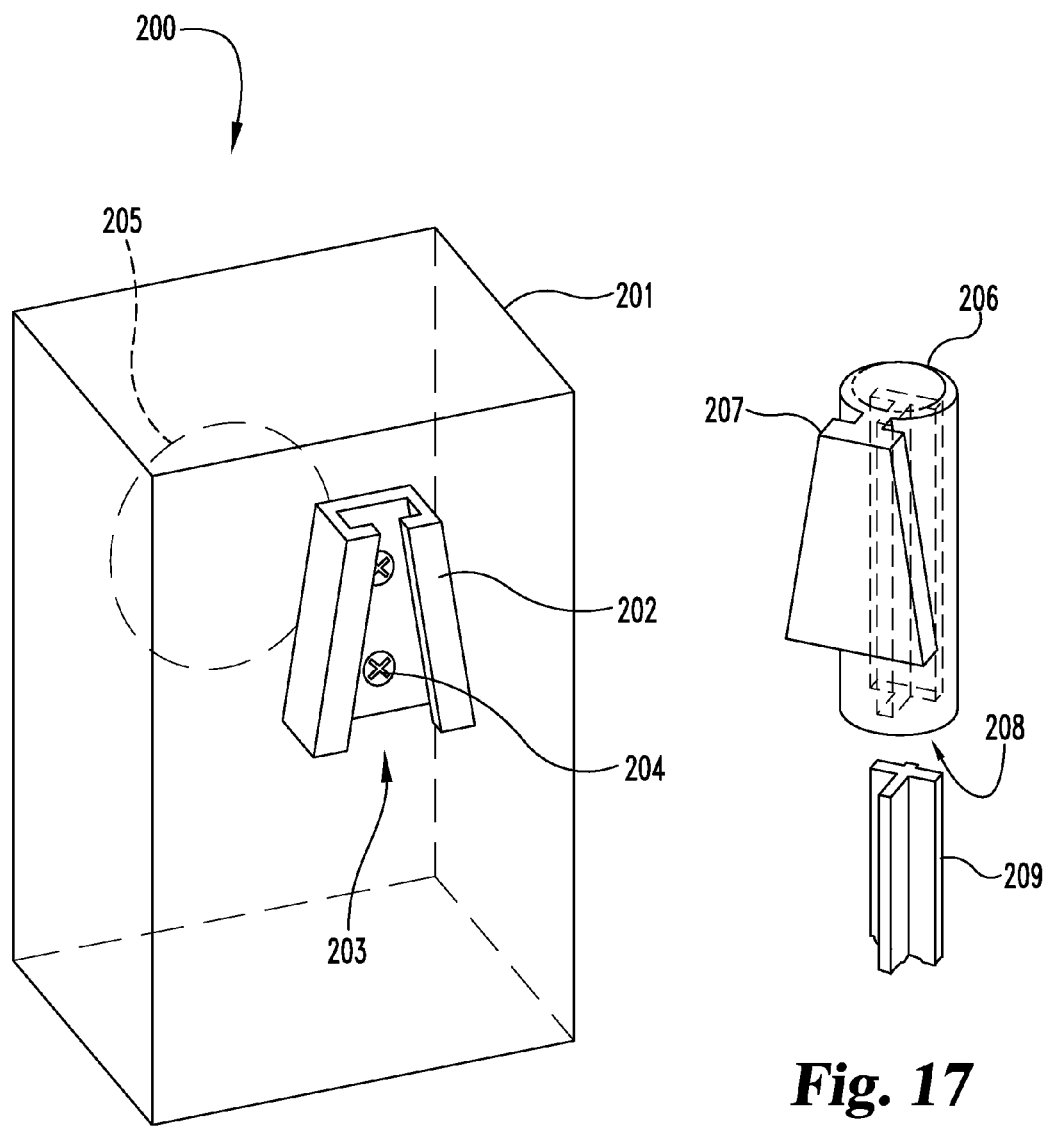
FIGS. 16 and 17 provide perspective views illustrating components of a post-mounted birdhouse system of the invention.

With reference now to FIGS. 16 and 17 together, illustrated is another T-post mounted birdhouse system 200 of the invention. System 200 includes a housing structure 201 defining an internal enclosure and a mounting bracket 202 attached to the rearward surface of structure 201 with connectors 204 received through corresponding apertures in bracket 202. Housing structure 201 further defines an opening 205 providing access to the internal enclosure.

FIG. 17 illustrates a T-post mounted receiver 206 defining a trapezoidal wedge piece 207. Wedge piece 207 is receivable within wedge-shaped slot 203 defined by bracket 202. Receiver element 206 further defines an internal void 208 sized and shaped for mating receipt over top T-post 209. In use, housing structure 201 can be lowered onto receiver element 206 with wedge piece 207 extending into slot 203 to provide a removable mount of housing structure 201 to receiver 206.

Figure 18:
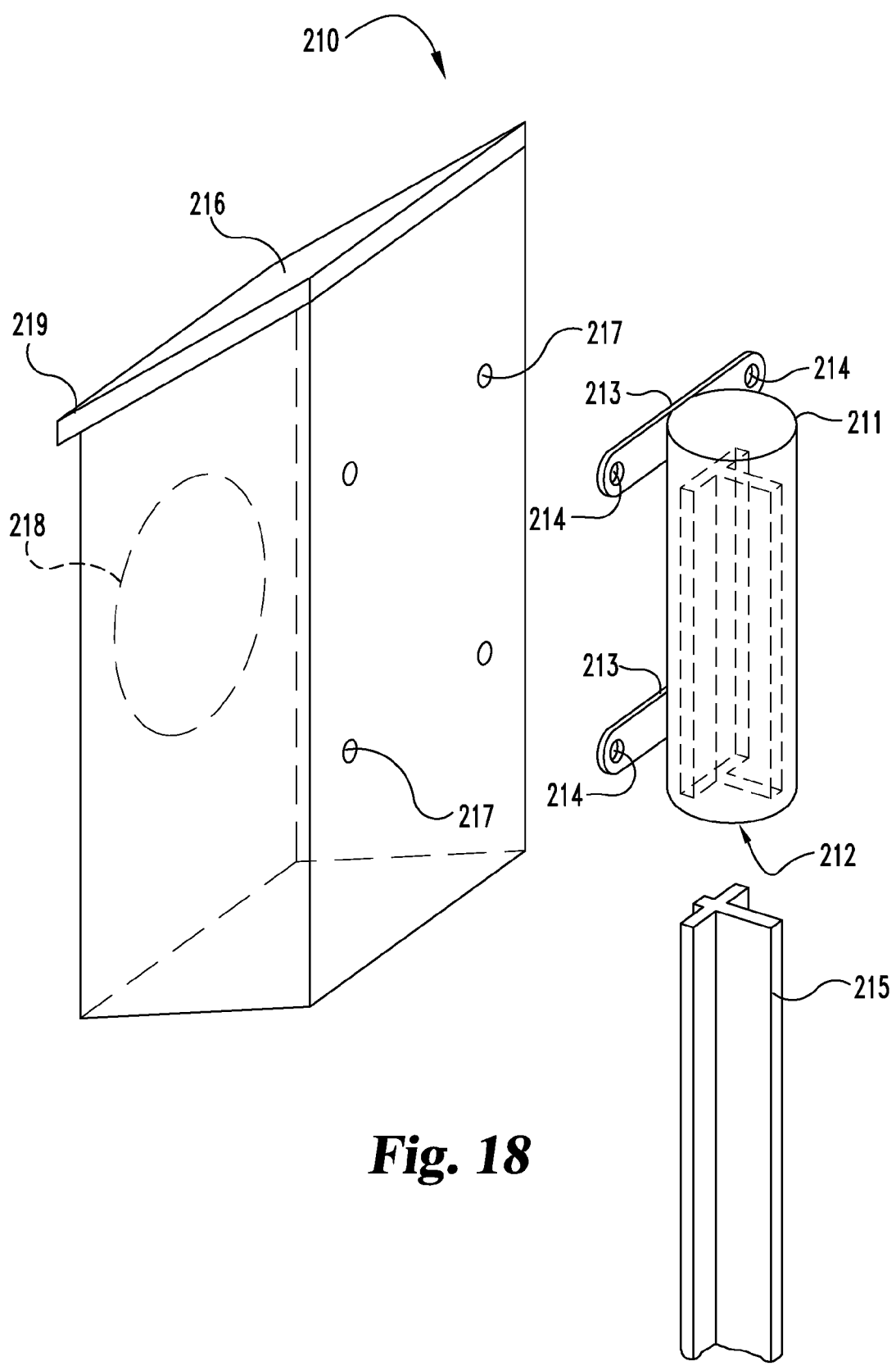
FIG. 18 provides a perspective view of a post-mounted birdhouse system of the invention.

Referring now to FIG. 18, shown is another T-post mounted birdhouse system 210 of the present invention. System 210 includes a multi-purpose mounting cap 211 defining an internal void 212 sized and shaped for mating with a corresponding T-post 215. Mounting cap 211 further includes lateral arms 213 each defining a plurality of apertures 214. System 210 further includes a housing structure 216 defining an internal enclosure and mounting apertures 217 positioned in registry with apertures 214 of mounting cap 211. Suitable connectors extending through apertures 214 and 217 can be used to attach housing structure 216 to mounting cap 211. Housing structure 216 further defines an opening 218 providing access to its interior enclosure. In the illustrated embodiment, housing structure 216 includes a sloped roof 219 which helps to resist puddling or pooling of water atop housing structure 216.

Figure 19:
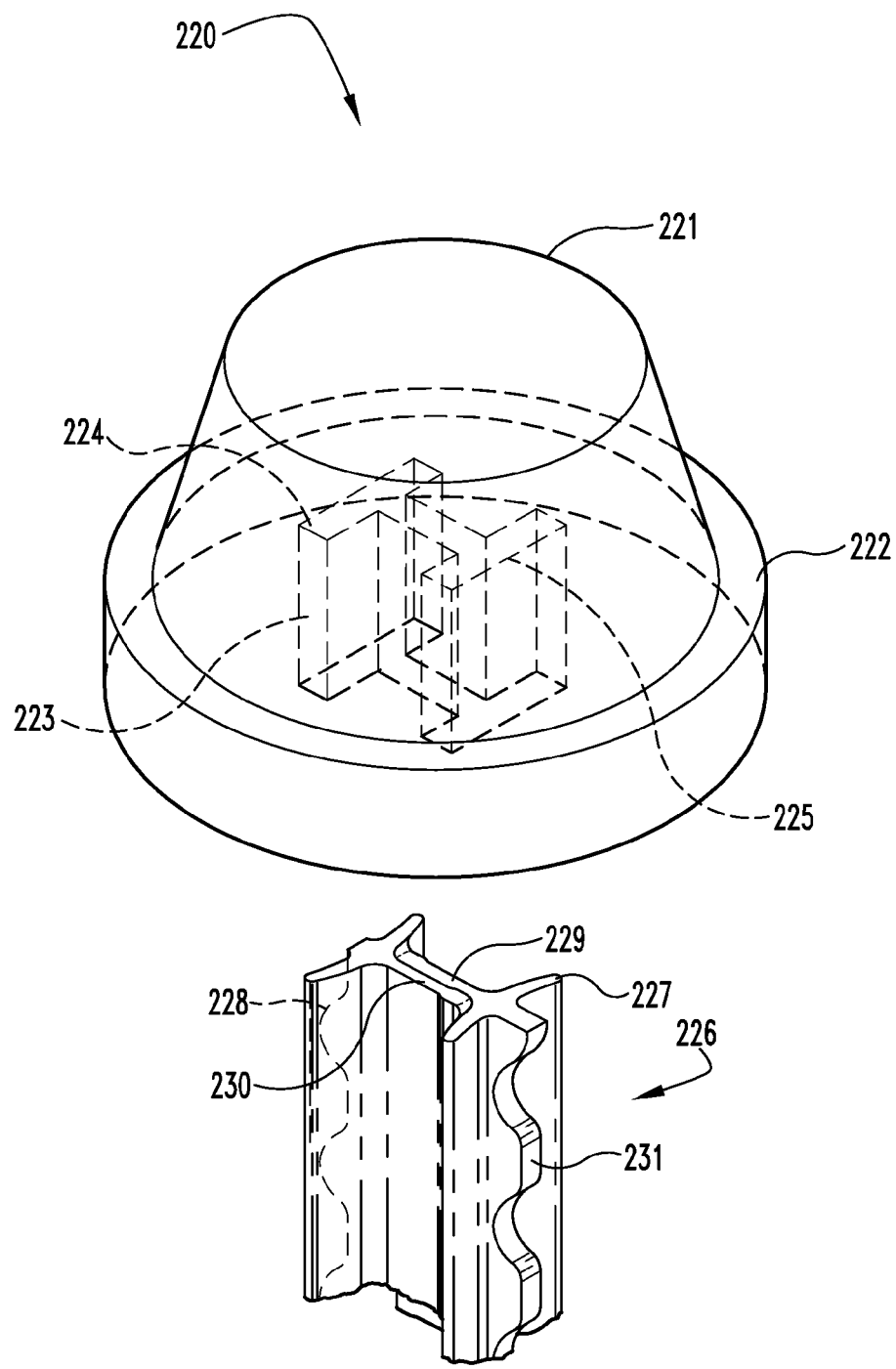
FIG. 19 provides a perspective view depicting a T-post support system including two associated T-posts and a corresponding retaining element receivable over the combined T-posts for driving the combination into the ground.
Figure 20:
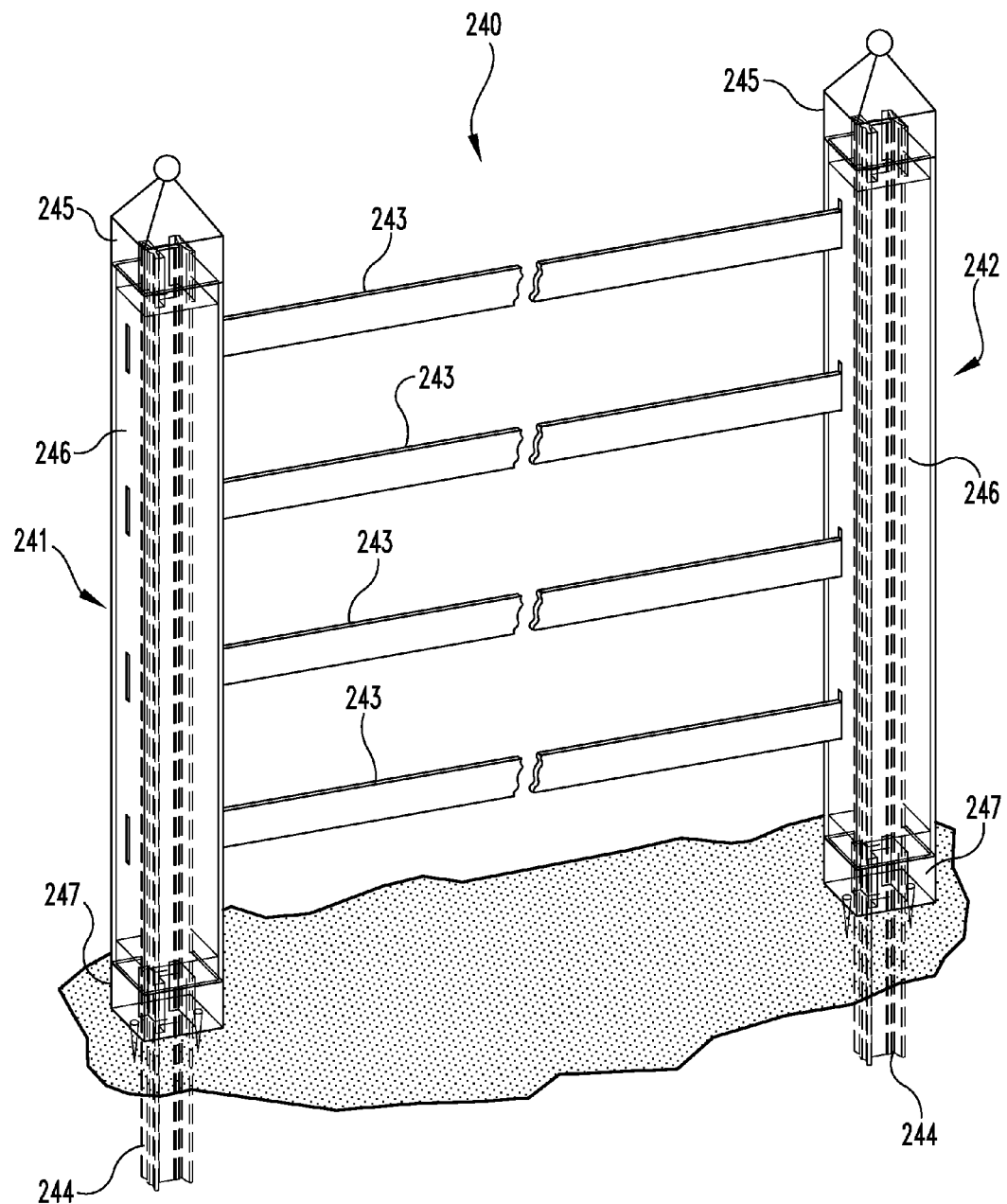
FIG. 20 provides a perspective view of a T-post fencing system of the invention.

FIG. 19 illustrates a system 220 for driving a dual T-post assembly into the ground, for use in situations in which a more robust post structure is desired, for example in the case of a street sign, fencing system, or other similar implement. System 220 includes a driving cap 221 having a generally cylindrical outer surface 222. Driving cap 221 defines an internal void 223 having first and second portions 224 and 225 sized and shaped to correspond to components of an overlapped dual-T-post assembly 226. Assembly 226 includes a first T-post 227 and a second T-post 228 having an overlapped region formed by overlapping the long arms 229 and 230 of respective T-posts 227 and 228. In such an overlapped condition, splines or ribs (e.g. 231) of the T-post will face outwardly from one another. In use, T-posts 227 and 228 are positioned to the overlapped condition, and potentially held in such position by appropriate welds, clamps or other means. Driving cap 221 is then placed over top the assembly 226 and a driving force is applied to the upper surface of driving cap 221 to drive assembly 226 into the ground. The driving force can, for example, be applied using a conventional cylindrical T-post driver. Once driven, the assembly 226 provides a post having increased capacity to withstand vertical and lateral loads imposed upon accessories or other structures mounted to T-post assembly 226. For example, with reference to FIGS. 2, 3 and 8, supported mailbox and banner or sign structures may benefit from support by T-post assembly 226, and components thereof can be suitably modified to accommodate the assembly 226 rather than a single T-post.

Figure 21:
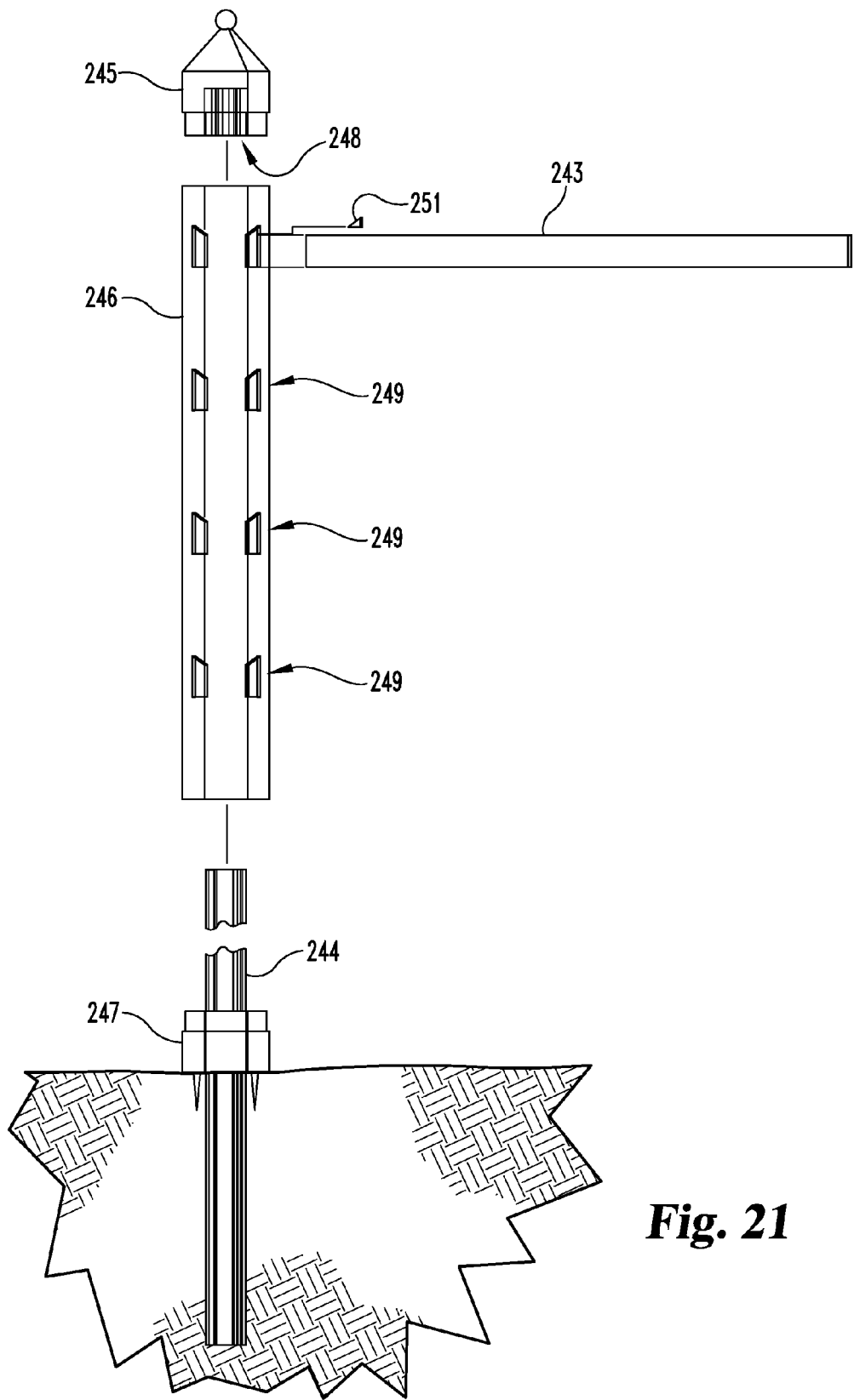
FIG. 21 provides an exploded view of elements of the fencing system of FIG. 20.
Figure 22:
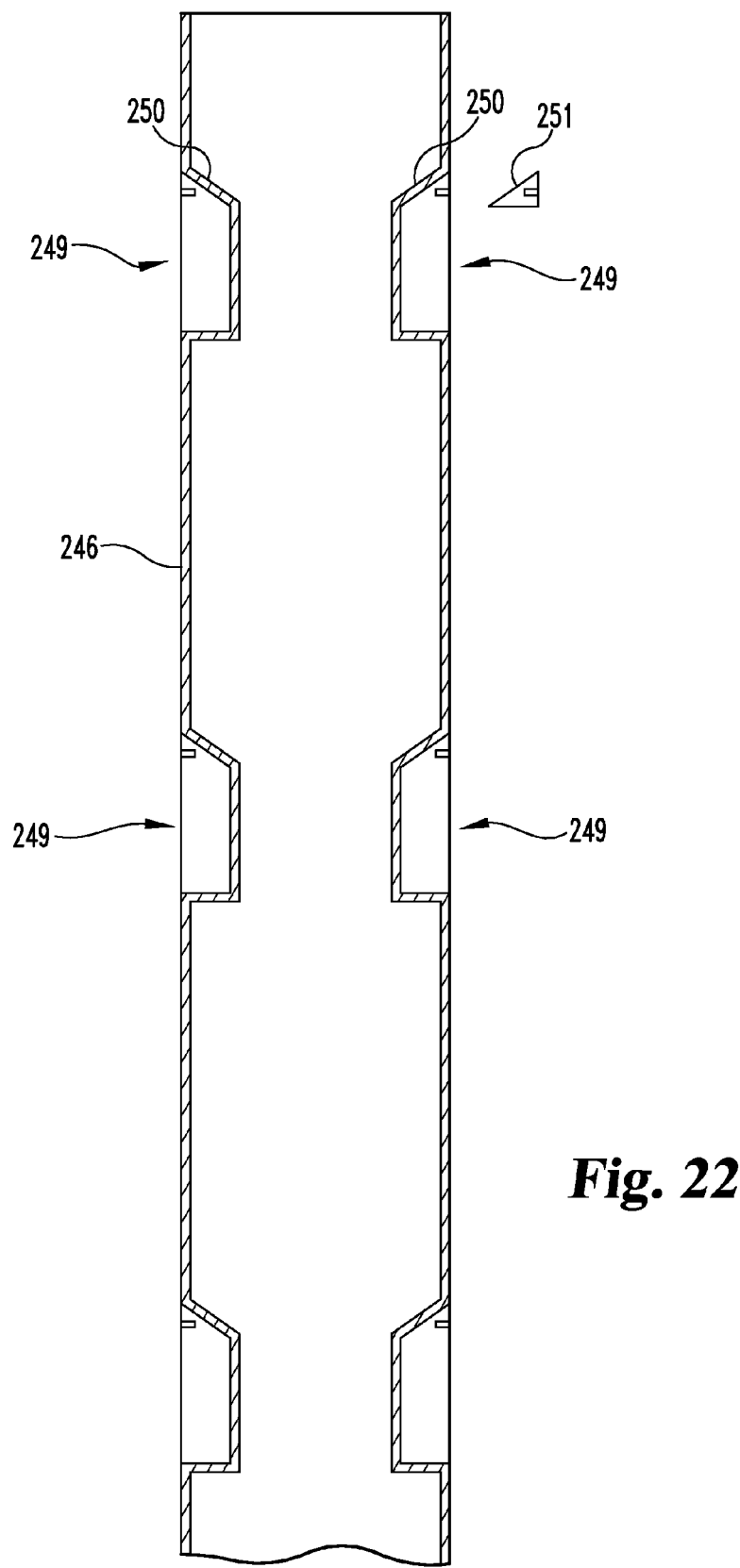
FIG. 22 provides a cross-sectional view of a post sleeve element of the fencing system of FIG. 20.
Figure 23:
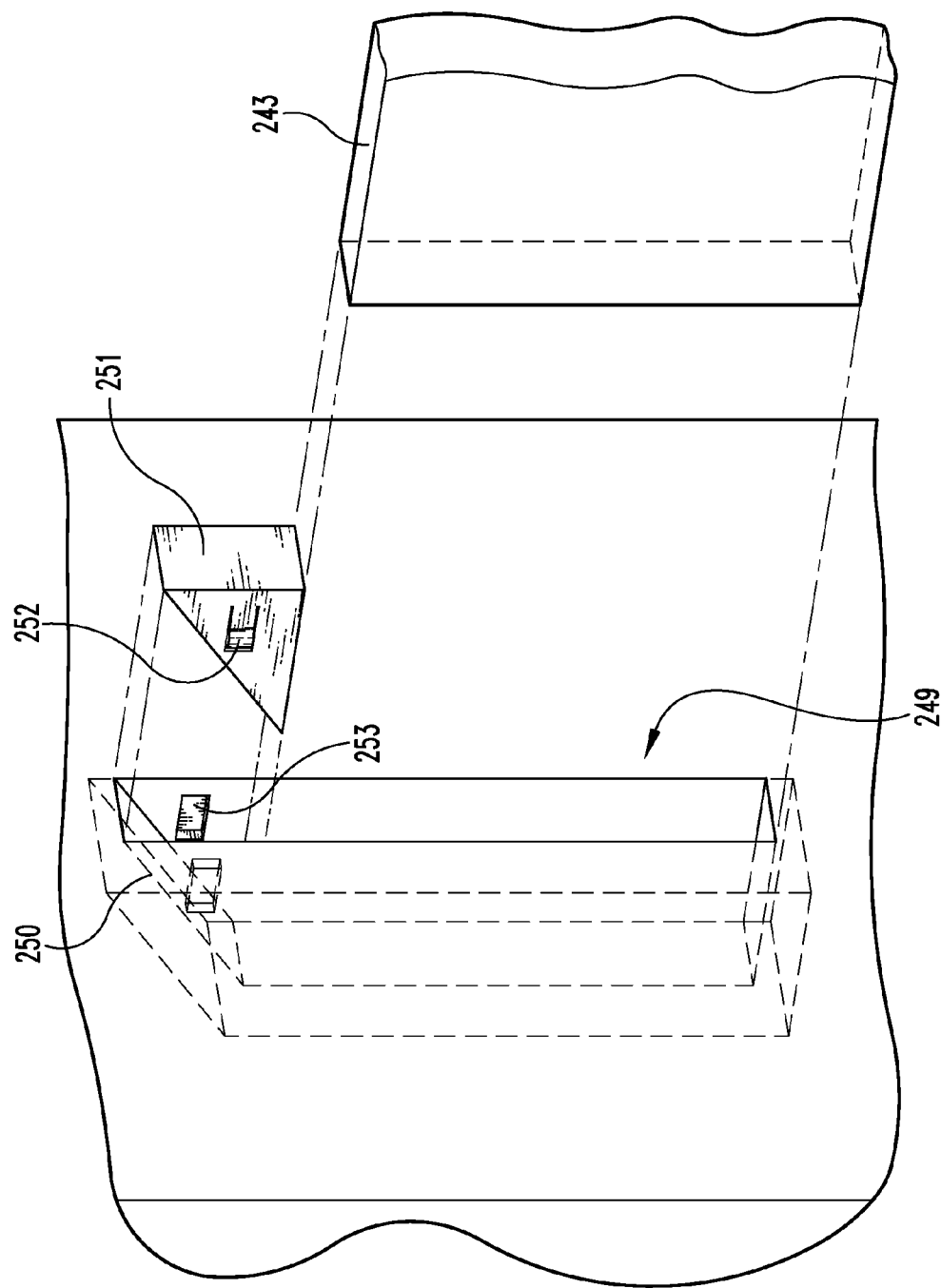
FIG. 23 provides a fragmentary view depicting cross-board, sleeve and filler elements of the fencing system of FIG. 20.

With reference now to FIGS. 20 through 23, shown is one embodiment of a fencing system of the invention and components thereof. Fencing system 240 includes a plurality of posts such as first post 241 and second post 242. Posts 241 and 242 each include a dual T-post assembly as illustrated in FIG. 19 along with a mating cap 245, sleeve 246, and footing element 247 combination. These components can have features similar to those described hereinabove for corresponding components. In alternative embodiments, posts 241 and 242 could each be supported by a single T-post, as illustrated for other embodiments disclosed herein, and/or the T-post(s) can be replaced by other post structures received into the ground, including posts with circular or ovate cross-sections, X-shaped cross sections, or other suitable shapes. A plurality of cross boards 243 are received and supported between post 241 and 242. As best shown in FIG. 21, cap 245 defines an internal void 248 that corresponds and mates with the shape of the dual T-post assembly 244. With continuing reference to FIG. 21 along with FIGS. 22 and 23, sleeve 246 defines slots or openings 249 for receiving the ends of cross boards 243. Each opening 249 includes an inclined upper surface 250. Inclined upper surface 250 provides clearance for use during the operation of mounting cross boards 243 between posts 241 and 242. In particular, to mount a cross board 243, the board is inclined relative to its intended final position and the lower end thereof is inserted into a slot 249 of one of sleeves 246. The cross board 243 is then rotated toward its intended lateral position, desirably generally perpendicular to posts 241 and 242. In this motion, the upwardly inclined surface 250 of the slot 249 of the opposite sleeve 246 provides clearance through which the downwardly-moving end of cross board 243 swings until cross board 243 is in its final resting position with its lower surface contacting the lower surface of the slot 249. It will be appreciated that this arrangement leaves an open space or void within slots 249 occurring above the upper edge of the mounted cross board 243. In accordance with one embodiment of the invention, a wedge-shaped filler piece 251 is inserted to fill that void. Wedge-shaped piece 251 can include a detent tab 252 as shown in FIG. 23, which becomes received within a corresponding hole or opening 253 in the side wall of slot 249. In this fashion, a reversible snap fit of piece 251 into the upper void of slot 249 can be attained. Piece 251 can also engage the adjacent cross-board to stabilize the same against vertical and/or lateral movement. Such engagement can be any suitable mechanical engagement including for instance frictional or detent-style engagements.

With reference now to FIG. 24, shown is a composite cross board assembly 260 which in one embodiment can be used in the place of cross board 243 of FIGS. 20-23. Assembly 260 includes an internally-received T-post 261 or another suitable reinforcing element, the ends of which are received within generally rectangular caps 262 and 263 forming the ends of the cross board assembly. Assembly 260 further includes a generally rectangular sleeve 264 fitted to caps 262 and 263, for example by frictional or bonded receipt over shoulders 265 of caps 262 and 263. While reinforced assembly 260 is shown and discussed as suitable for cross boards 243 in FIGS. 20-23, it will be understood that such reinforced assemblies 260 are not necessary to broader aspects of the inventions, and cross boards can be fabricated from any suitable material and can lack internal reinforcements.

Referring now to FIG. 25, shown is a telescoping cross board assembly 270 that can be used in fencing systems as illustrated in FIGS. 20-23. It is often the case that the final posts in a fence row will be separated from a prior post by a non-standard distance. In this situation, it is desirable to provide for an assembly which provides flexibility in the length of cross boards to be received in the final segment of the fence row. Referring to assembly 270, it can be assembled to a variety of lengths as appropriate by choosing or cutting internal reinforcing T-post 271 to the required length and fitting a first cap 272 on one end thereof. A first sleeve portion 274 is then fitted over shoulders of cap 272. A second sleeve portion 275, which is capable of telescoping within sleeve portion 274, is then fitted to a second cap 273, and the thus-created assembly is then telescoped within sleeve portion 274 and cap 273 is friction fitted and/or attached or bonded over the opposite end of the reinforcing T-post 271. The resulting assembly 270, manufactured to length, can then be used in the final and potentially non-standard segment of the fence row, generally in the same manner as discussed in connection with FIGS. 20-23 above.

Figure 26:
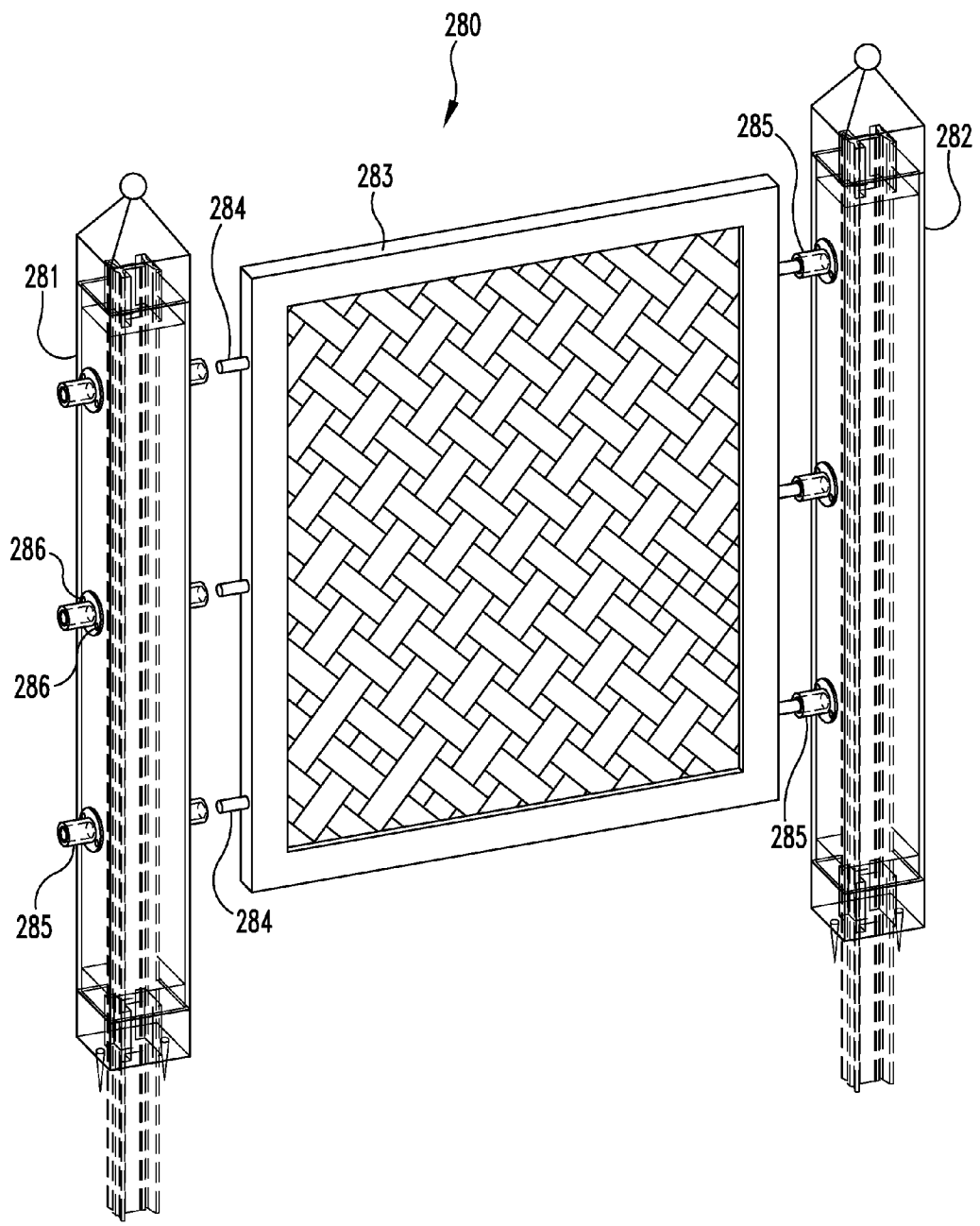
FIG. 26 illustrates one embodiment of a fencing system of the invention.

With reference to FIG. 26, shown is another fencing system 280 of the invention. System 280 includes a first post assembly 281 and a second post assembly 282, which are similar to the assemblies 241 and 242 of FIG. 20 except lacking the slots 249 in the sleeve elements. System 280 includes a fence panel 283, which can as illustrated be a latticework or other privacy panel, mounted to the post assemblies 281 and 282. In the illustrated embodiment, such mounting is achieved with lateral pegs 284 that are connected to panel 283 and that cooperate with collared mount elements 285 defining bores into which pegs 284 are received. Collared mount elements 285 are in turn attached to posts 281 and 282 with fasteners 286 such as screws, bolts, nails, or any other suitable fastener. A plurality of the fencing system units 280 can be assembled to create an elongate privacy and/or security fence in residential or commercial areas.

FIG. 27 shows an alternative mounting post system 290 of the invention. Assembly 290 includes a post assembly 291 and a mounting cap 292. Post assembly 291 includes a T-post 293 received into the ground and a sleeve 294 received over the T-post. Sleeve 294 includes a laterally-extending foot 295 which contacts or resides near the surface of the ground and has an opening defined therein for receiving a stake 296 for securing the position of the sleeve 294 (e.g. against vertical, lateral and/or rotational motion). Sleeve 294 further includes an opening 297 defined in a sidewall thereof. Opening 297 receives a pin 298. Pin 298 extends into the inner lumen of sleeve 294 and passes between adjacent ribs or flanges 299 of the T-post 293. In this fashion, additional resistance of the sleeve 294 to motion can be provided.

Referring now to FIGS. 28 and 29, additional post systems of the invention are illustrated. In FIG. 28, a post system 300 includes an internal T-post 301 and an outer sleeve element 302 mounted thereover. Sleeve element 302 includes an outer tube portion 303 and an inner tube portion 304 connected by a plurality of struts 305. Sleeve element 302, having this design, can optionally be manufactured by extrusion. In certain embodiments, sleeve element includes slots 306 in sidewalls thereof such that post system 300 can be used in fencing systems as illustrated herein. Post system 300 also includes a cap member 307 having a downwardly depending sleeve 308 with a reduced diameter relative to upper portions of cap member 307. Sleeve 308 defines an internal void 309 configured to mate with the upper end of T-post 301. In the illustrated embodiment, inner tube portion 304 has an internal diameter of a size sufficient to leave clearances between its inner surface 311 and the arms of T-post 301. In this manner, downwardly depending sleeve 308 of cap member 307 fits within inner tube 304. Sleeve 308 can be sized and shaped such that its outer surface 310 engages the inner surface 311 of inner tube portion 304. This engagement can for example be frictional, threaded, or otherwise, and can serve to provide resistance to lateral motion of the sleeve element 302 relative to the T-post 301. As shown, post system 300 can include a footer element .312 similar to those described hereinabove.

FIG. 29 illustrates a post system 320 of the invention. Post system 320 includes a ground-mounted dual T-post combination 321 as discussed hereinabove and a polygonal (e.g. square or rectangular cross-sectioned) sleeve element 322 received thereon. Sleeve element 322 includes an outer tube portion 323 and an inner tube portion 324 connected by struts 325. Inner tube portion 324 is sized for a close and desirably friction fit over dual T-post assembly 321, to prevent substantial lateral movement of the sleeve element 322 relative to the dual T-post assembly 321. In certain embodiments, sleeve element 322 includes slots 326 in sidewall portions thereof such that it can be used in fencing systems as disclosed herein. Post system 320 also includes a cap member 327 having a lower collar 328 sized and shaped to fit over the outside of sleeve element 322, e.g. with the inner surfaces of collar 328 friction fitted (and potentially otherwise attached such as with a bonding agent or connector(s)) over the outer surfaces 329 of sleeve element 322. As shown, post system 320 can include a footer element 330 similar to those described hereinabove.

In certain embodiments, the invention provides post mounting systems that include a post structure including a post having a cross-sectional shape including three or more outwardly-extending arms (e.g. a T-post), with the outwardly-extending arms each having an outermost arm surface. The post structure also includes a sleeve element received over the post, the sleeve element including an internal cylindrical void, preferably circular in cross section, sized to frictionally engage the outermost arm surfaces of the three or more outwardly-extending arms. The post mounting systems also includes a top-mounted element mounted atop the post structure.

FIG. 30 illustrates one such post mounting system 340. System 340 includes a T-post 341 received within a sleeve element 342. Sleeve element 342 in the illustrated embodiment has a substantially circular cross section and is sized to have an internal diameter that provides a close and desirably friction fit over the radially-extending arms of T-post 341. In this manner, substantial lateral movement of the sleeve element 342 relative to the T-post 341 is prevented. System 340 also includes a capping member 343 having a lower collar portion 344 designed to fit over the outside of sleeve element 342, e.g. with the inner surfaces of collar portion 344 friction fitted (and potentially otherwise attached such as with a bonding agent or connector(s)) over the outer surfaces 345 of sleeve element 322. As illustrated, capping member 343 can have functional features, e.g. being designed as a multi-purpose mounting structure having a bearing surface 346 and apertures 347 generally as discussed for similar mounting caps herein. As shown, post system 340 can include a footer element 348 similar to those described hereinabove.

Figure 31:
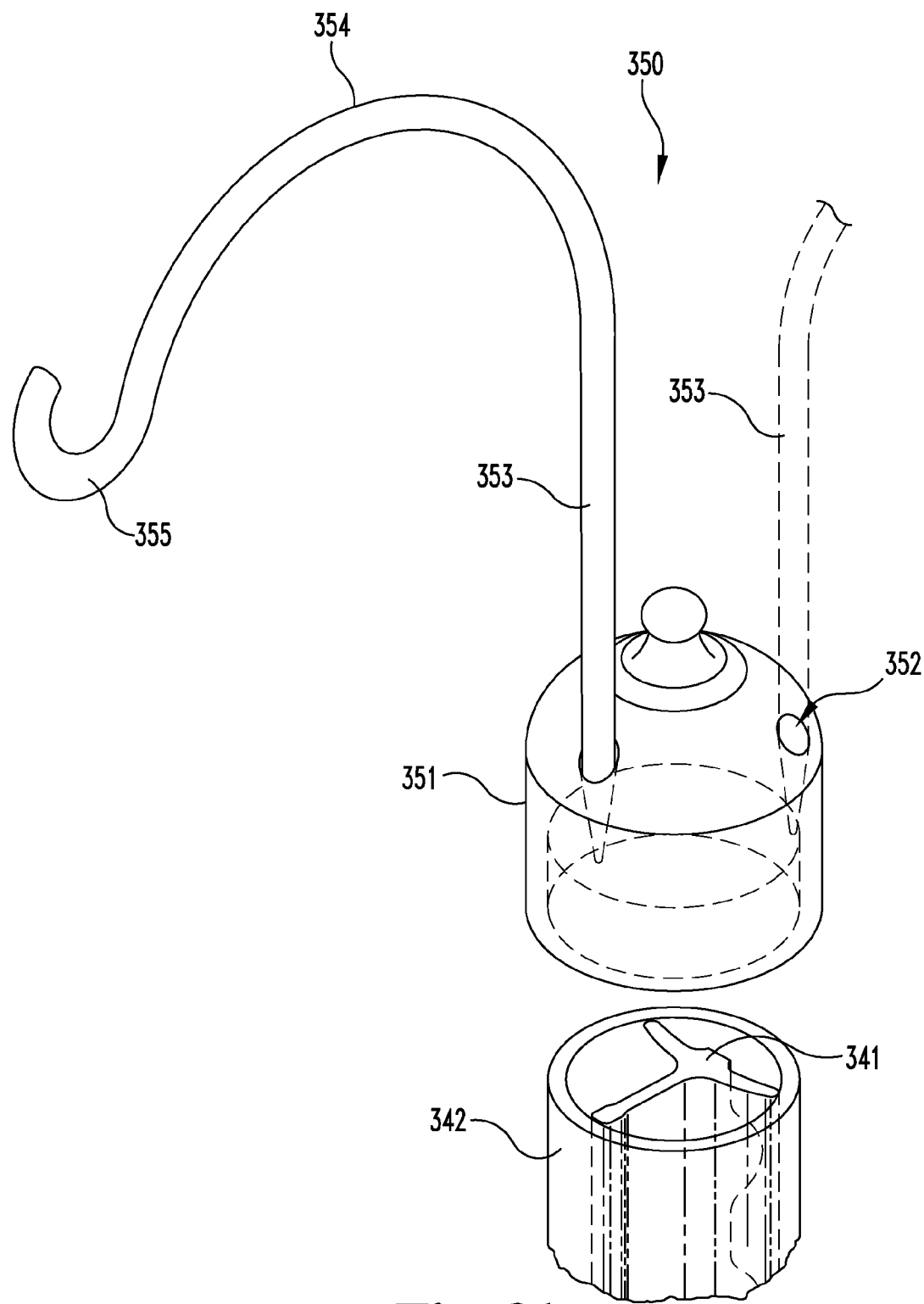
FIG. 31 illustrates a further alternative post mount assembly of the invention.

FIG. 31 shows a break-away view of the top end of a post system 350 of the invention. Portions of the system 350 not shown can be similar to those shown for system 340 of FIG. 30, e.g. including a T-post 341 and sleeve 342 as discussed. In system 350, a capping member 351 is provided having a plurality of holes 352 therein. A rod 353 is received through each hole 352 and extends into the inner lumen of sleeve element 342. Rod 353 can be of sufficient length to extend to the ground for support, or can be supported by a structure mounted within sleeve element 342 and/or a collar or widened portion on rod incapable of passage through opening 352 which thereby supports rod 353 against the upper surface of capping member 351. Rod 353 can have an arcuate portion 354 leading to a hanging loop 355, which can be a partial loop as shown, a full loop, or any other suitable configuration from which to hang functional, decorative, or amusement structures. Illustratively, bird-related implements such as perches, mirrors, figurines, etc., can be supported from rods 353 of system 350.

Figure 32:
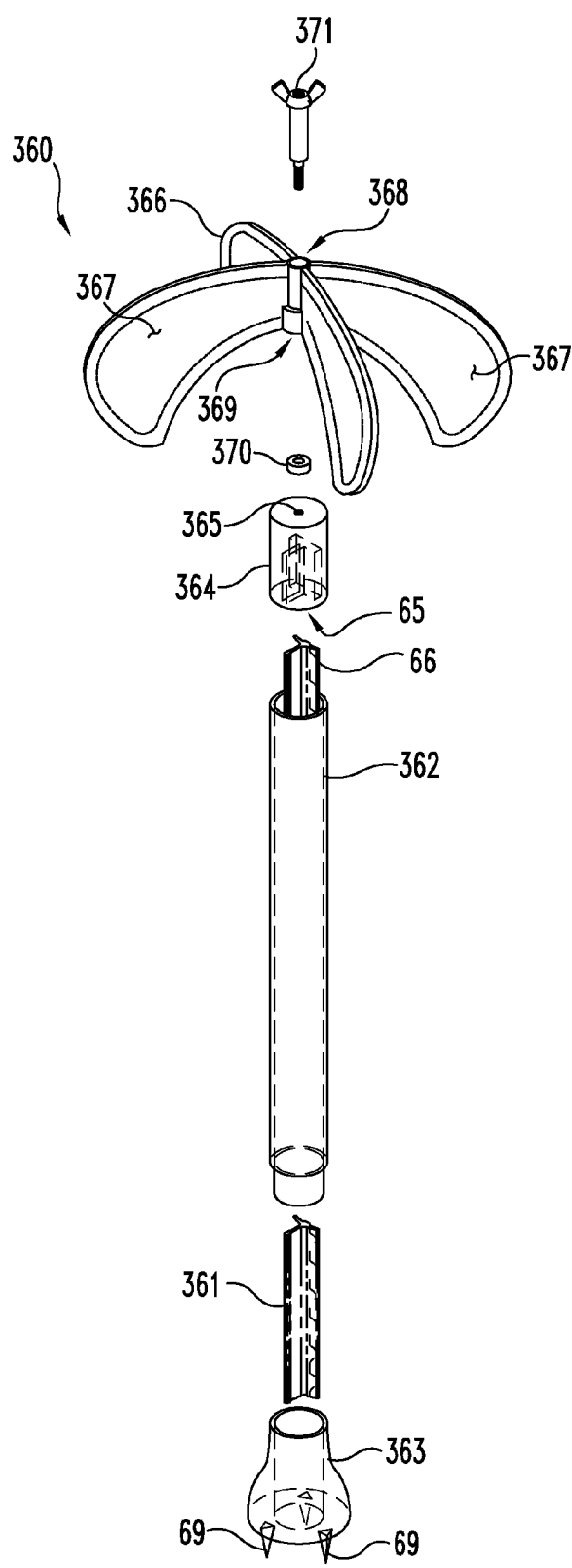
FIG. 32 illustrates a post-mounted wind-driven spinner system of the invention.

FIG. 32 illustrates a T-post mounted advertising spinner system 360 of the invention. Spinner system 360 includes a ground-mounted T-post 361, a sleeve 362, and a sleeve 362, and a footer element 363 similar to those described hereinabove. Spinner system 360 includes a capping element 364 having a threaded nut 365 connected to a top surface thereof (e.g. being integral or bonded to the top surface). A spinning element 366 is provided having a plurality of fins or sails 367 for imparting a spinning motion when impinged by wind or another moving air stream. A press-fit bearing 370 is received within larger portion 369 of central bore 368 to provide smooth rotation of the spinning element. A wing bolt 371 with a threaded lower portion extends through central bore 368 and bearing 370 and is threaded into nut 365 (but no so as to frictionally bear upon the upper surface of spinning element 366 in a fashion that would prevent rotation) to secure the spinning element 366 to capping element 364.

Figure 33:
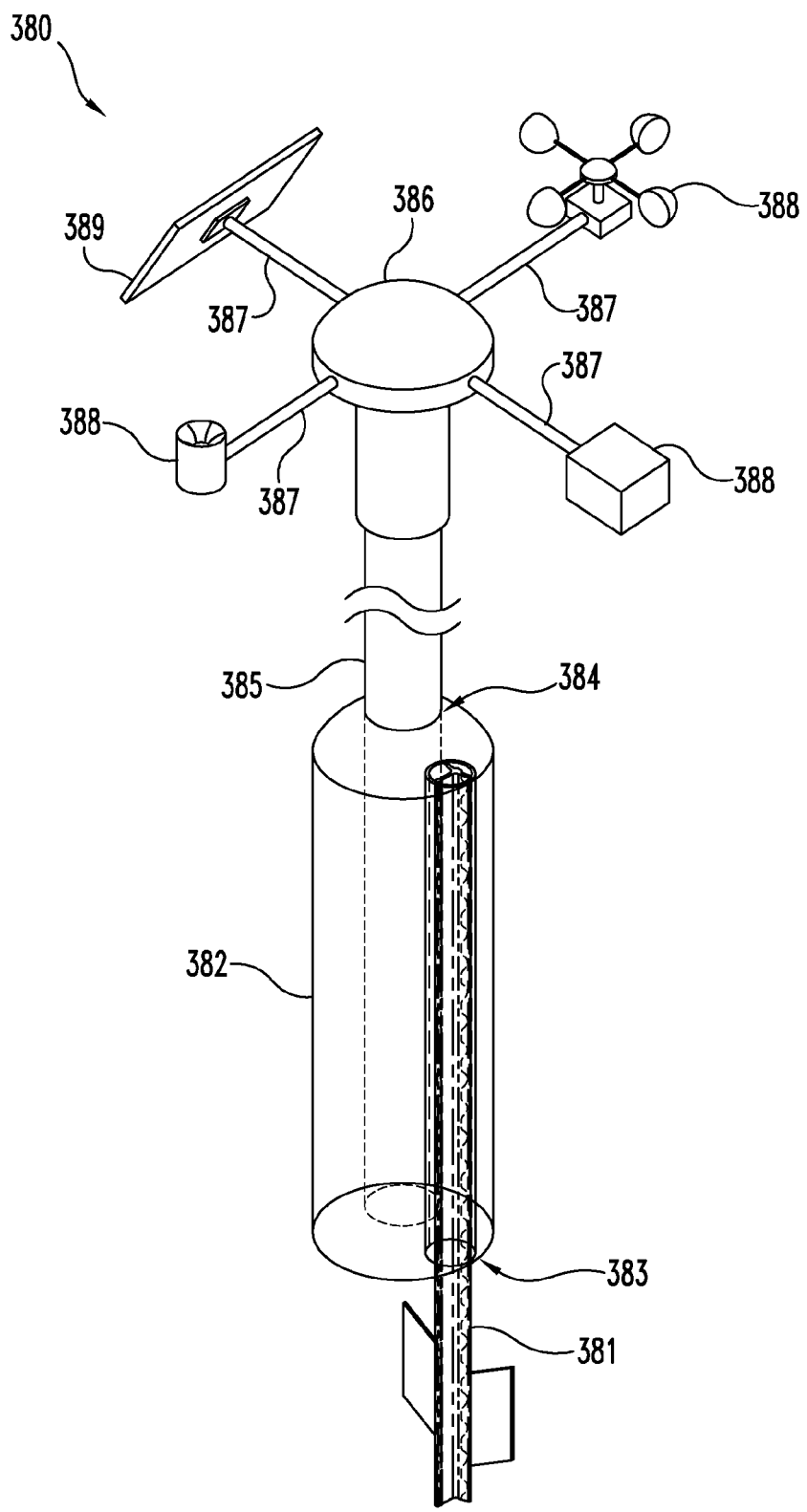
FIG. 33 illustrates one embodiment of a T-post supported pole mounting system of the invention.

With reference to FIG. 33, shown is a pole mounting system 380 of the invention. Pole mounting system 380 includes a T-post 381 and a sleeve element 382 received thereon. Sleeve element 382 includes a first internal channel 383 configured for receipt of T-post 381, desirably in a close or friction fit to prevent substantial lateral movement of the sleeve element 382 relative to the T-post 381. In the illustrated embodiment, first channel 383 is offset to one side of a central axis of sleeve element 382. Sleeve element 382 defines a second channel 384 generally along its central axis. Received within second channel 384 is a long pole 385 extending through channel 384, out a top opening in sleeve element 382, and vertically therefrom a distance. Mounted at the top of pole 385 is a mount structure 386 having a plurality of lateral arms 387 for mounting instruments 388, e.g. weather-related gauges such as rain gauges, temperature gauges, wind gauges, etc. In the illustrated embodiment, a solar panel 389 is mounted upon one of lateral arms 387, for powering other instruments mounted upon the mount structure 386. Appropriate wiring can be provided in mount structure 386 for distributing this power to the instruments. As well, a battery or other energy storage structure can be provided in or on mount structure 386, to store energy generated by solar panel 389. Instruments 388 can be configured to wirelessly transfer data to a remote receiver for display, e.g. a receiver located within a nearby home or other building structure.

Figure 34:
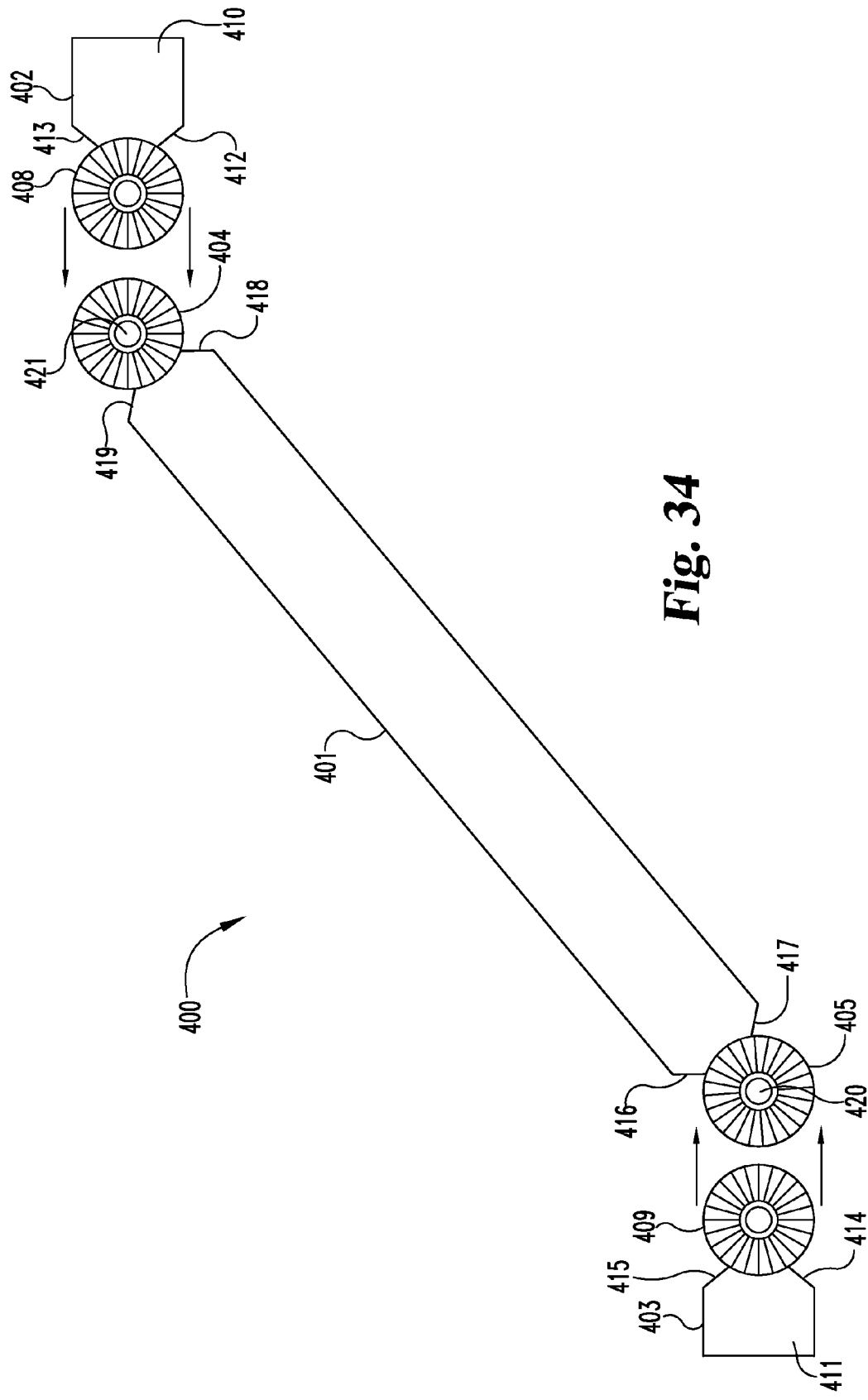
FIG. 34 and FIG. 35 illustrate an embodiment of a variable-angle crossboard that can be used in fencing systems of the invention.
Figure 35:
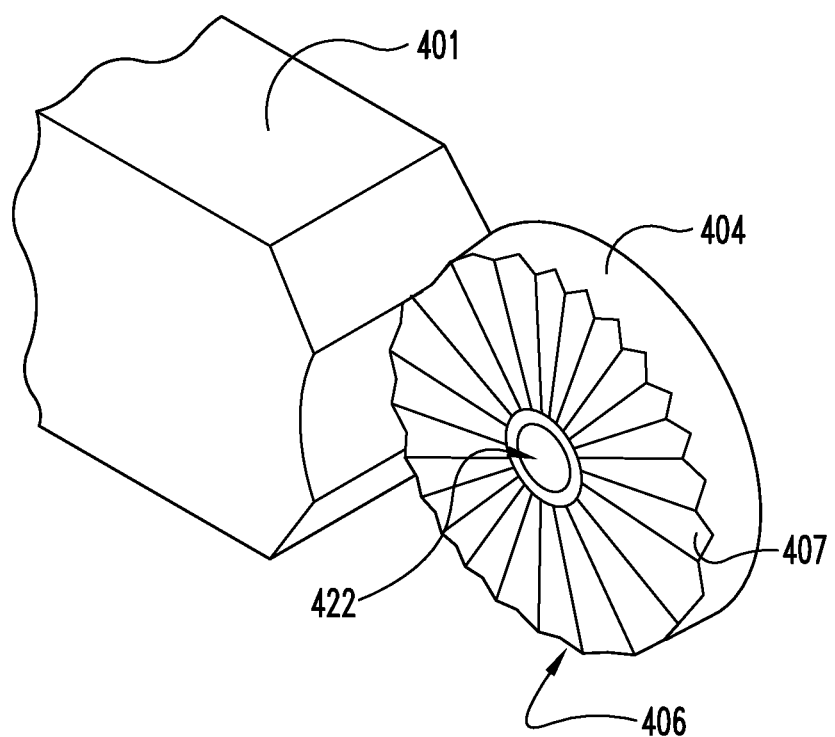

With reference to FIGS. 34 and 35, illustrated in an exploded view is an embodiment of a variable-angle crossboard that can be used in T-post-supported or other post-supported fencing systems as disclosed herein. In particular, crossboard 400 is configured with a central portion 401 and end pieces 402 and 403 that can be adjusted and then securely fixed at various positions relative to one another, for example to define varying angles between end pieces 402 and 403 and central portion 401. This may be used, for example, when fencing along a non-level grade such as a hill using a fencing system with posts as described in FIGS. 20-26. In this fashion, central portion 401 of crossboard 400 can be adjusted to substantially match the grade of the terrain while end pieces 402 and 403 can be positioned substantially at horizontal level for secure attachment to the posts between which crossboard 400 spans (e.g. for receipt of end pieces 402 and 403 within slots 249 of FIGS. 20-23 or into correspondingly shaped receivers such as receivers 285 of FIG. 26).

With continued reference to FIGS. 34 and 35, central portion 401 includes end portions 404 and 405, respectively, each of which includes an inner face 406 having a plurality of radially-extending ridges or teeth 407 which can be overlapped with and mesh and interlock with corresponding ridges or teeth on end portions 408 and 409 of end pieces 402 and 403, respectively. The outermost portions 410 and 411 of end pieces 402 and 403 can thereby be rotatably adjusted relative to central portion 401 to achieve a desired angle, and then the teeth or ridges on portions 404 and 408 and on portions 405 and 409 can be caused to securely intermesh and lock together to stably position the crossboard 400 in the desired configuration. In the illustrated embodiment, end portions 404, 405, 408, and 409 have a generally rounded external profile, although other configurations are possible. Additionally, in the illustrated embodiment, end portions 402 and 403 have beveled wall portions 412, 413, 414, and 415 adjacent their respective rounded end portions, which can serve to provide additional rotational freedom in the crossboard 400. Similarly, central portion 401 includes beveled walls 416, 417, 418, and 419 adjacent its rounded end portions 404 and 405, which can serve to provide additional rotational freedom. Bolts 420 and 421 can extend through apertures 422 in end portions 404 and 408 in an overlapped condition, and 405 and 409 in an overlapped condition, respectively, and receive a correspondingly threaded nut on the opposite side (not shown) to secure the meshing faces (e.g. 406, FIG. 35) together to stably position the crossboard 400 in its desired configuration. It will be understood, however, that other devices or means for securing the meshing faces against one another can also be used.

In use, a plurality of crossboards 400 can be provided and secured between posts in regions of fence row covering a non-level grade. On the other hand, in regions of that fence row that are on level grade, differing crossboards such as those otherwise disclosed herein may optionally be used.

Figure 36:
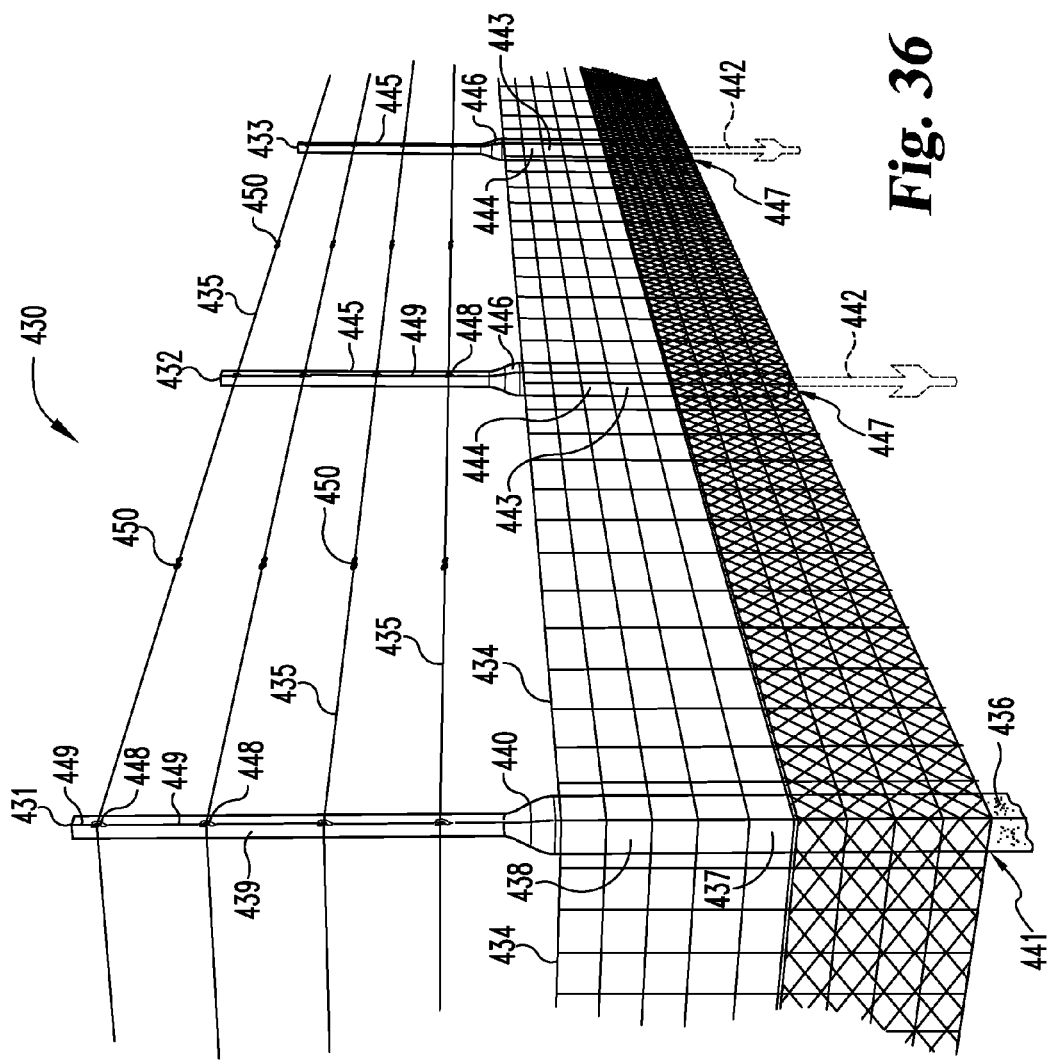
FIGS. 36-38 illustrate a barricade fencing system of the invention.
Figure 37:
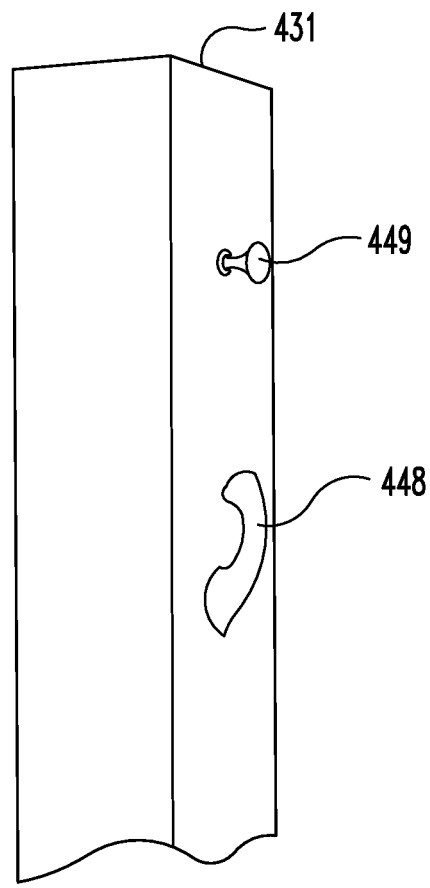
Figure 38:
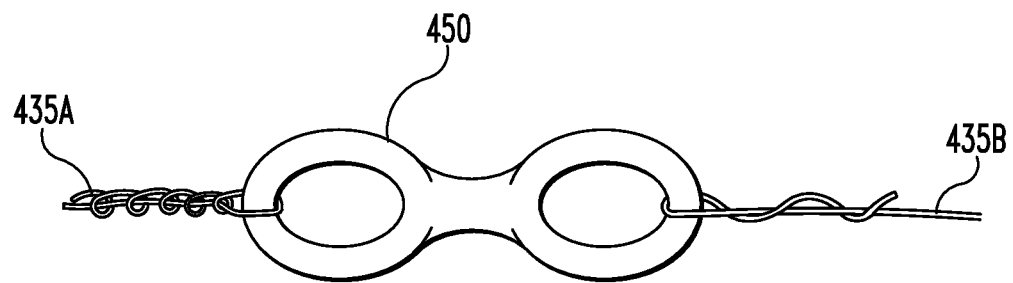

With reference now to FIGS. 36-38, shown are features of a fence barricade system 430 of the invention. System 430 includes a plurality of post structures 431, 432, and 433. In a lower region of the post structures, a wire mesh 434 or other preferably flexible fence barrier material is supported between the posts under relatively high tension. In an upper region of the posts, a wire, tape, or other preferably flexible elongate material is strung between the posts under a relatively low tension. In the illustrated embodiment, post 431 is a corner post and includes a post 436, such as a wooden or metal post, received into the ground and optionally embedded in concrete. Post 436 and a corresponding opposite corner post, or one or more intermediate posts, are secured with sufficient lateral stability to support the fencing material 434 under a relatively high tension. Post structure 431 also includes post sleeve 437 defining an inner void 441 for receipt over post 436 secured in the ground. Post sleeve 437 includes a relatively wider external profile 438 in the lower portion thereof, e.g. in a region defining the internal void, and an upper region 439 having a relatively smaller external profile. Upper region 439 is desirably but not necessarily solid in cross section. A transition zone 440 is located between lower region 438 and upper region 439, and has an external profile of varying size to transition from region 438 to region 439.

Other post structures in the fence barricade system, e.g. posts 432 and 433 in the illustrated embodiment, are supported by T-posts 442 driven into the ground and received within post sleeve elements 443. Post sleeve elements 443, similar to sleeve element 437, include a relatively larger external profile 444 in a lower region thereof, and a relatively smaller external profile region 445 in an upper region thereof. A transition zone 446 is also similarly provided. Post sleeves 443 include an internal defined void 447 for receiving the upper portion of the T-posts 442. The internal void can have any suitable configuration for securement over T-post 442, including for example any of those disclosed hereinabove, or others. Upper regions of post sleeves 437 and 443 define adaptations for holding the low-tension fencing material. With particular reference to FIG. 37, these can include clasps 448 into which wire or other fencing material can be inserted and/or tabs 449 which can be inserted into corresponding slits or openings in fencing materials such as tapes. The lower portions of the post sleeves can include similar adaptations such as clasps or tabs for facilitating holding the higher tension fencing material. To protect against breakage or other damage to the upper regions of posts 431-433 due to falling trees or other impingements, the upper fencing material 435 can have predetermined weakened zones at which the fencing material 435 will break or otherwise separate when subjected to a force that would damage the posts. In the illustrated embodiment, as best shown in the enlarged view of FIG. 38, a double-eye connector 450 connects a first wire or other fencing portion 435A and a second wire or other fencing portion 435B. The connection between fencing portions 435A and 435B is of such a nature as to break or separate when subjected to a damaging force, e.g. in the illustrated embodiment wherein wire portions are threaded through the eyes of connector 450, doubled back and twisted upon themselves. It will be understood that other breakaway arrangements are also suitable.

In use, the fencing barricade system shown in FIGS. 36-38 can be used to contain animals for which high barriers are necessary, e.g. deer, or to restrain those animals from entering certain areas. Fencing system 430 can be erected with relative ease, requiring relatively fewer posts with sufficient lateral stability to support tensioned fencing material, with intervening posts supported on T-posts that are sufficient to support the vertical fence load, but need not possess the same lateral stability or load capacity as the other posts.

Figure 39:
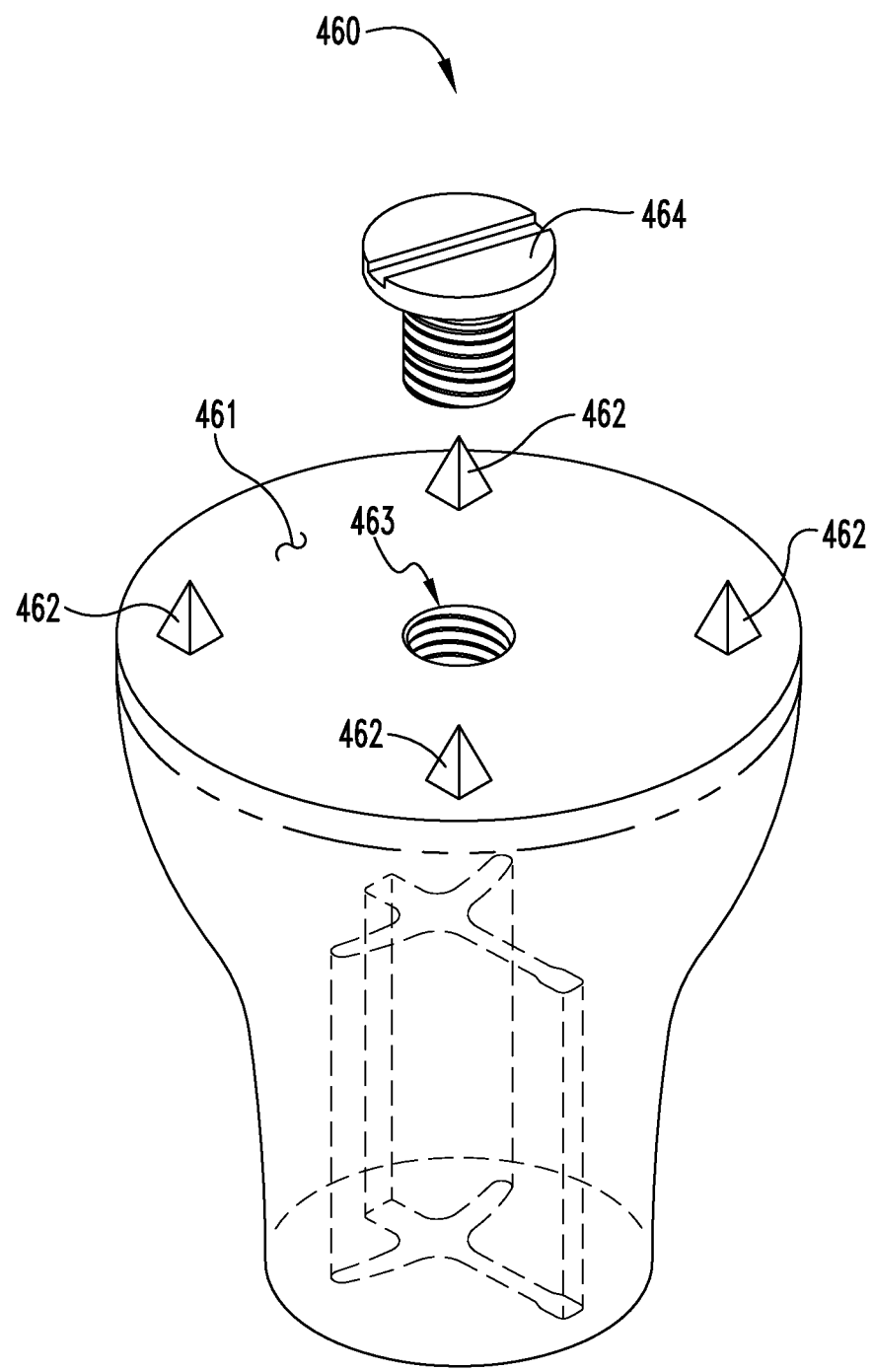
FIG. 39 provides a perspective view of an alternate mount plate for receipt atop a T-post.

FIG. 39 provides a perspective view of another mount plate for receipt atop a T-post. Mount plate 460 includes an upwardly-facing bearing surface 461 and a plurality of penetrating elements 462 for penetrating the material of an object to be mounted atop mount plate 460. Penetrating elements 462 as shown in the drawing are generally pyramidal-shaped teeth; however, it will be understood that other penetrating element configurations including spikes, pins, and the like, can also be used. Mount plate 460 also includes a threaded bore 463 in the upper surface 461 thereof, which can threadedly engage a bolt 464 or other connector. In use, an implement such as a birdhouse having a wooden, foam, or other penetrable lower member can be pressed downwardly upon penetrating elements 462 such that elements 462 penetrate the lower member and secure the same against rotation and potentially other movement. Bolt 464 can be passed through an opening in the lower member of the birdhouse or other implement to be mounted and threaded into bore 463 to secure the implement atop the mount plate 460.

Figure 40:
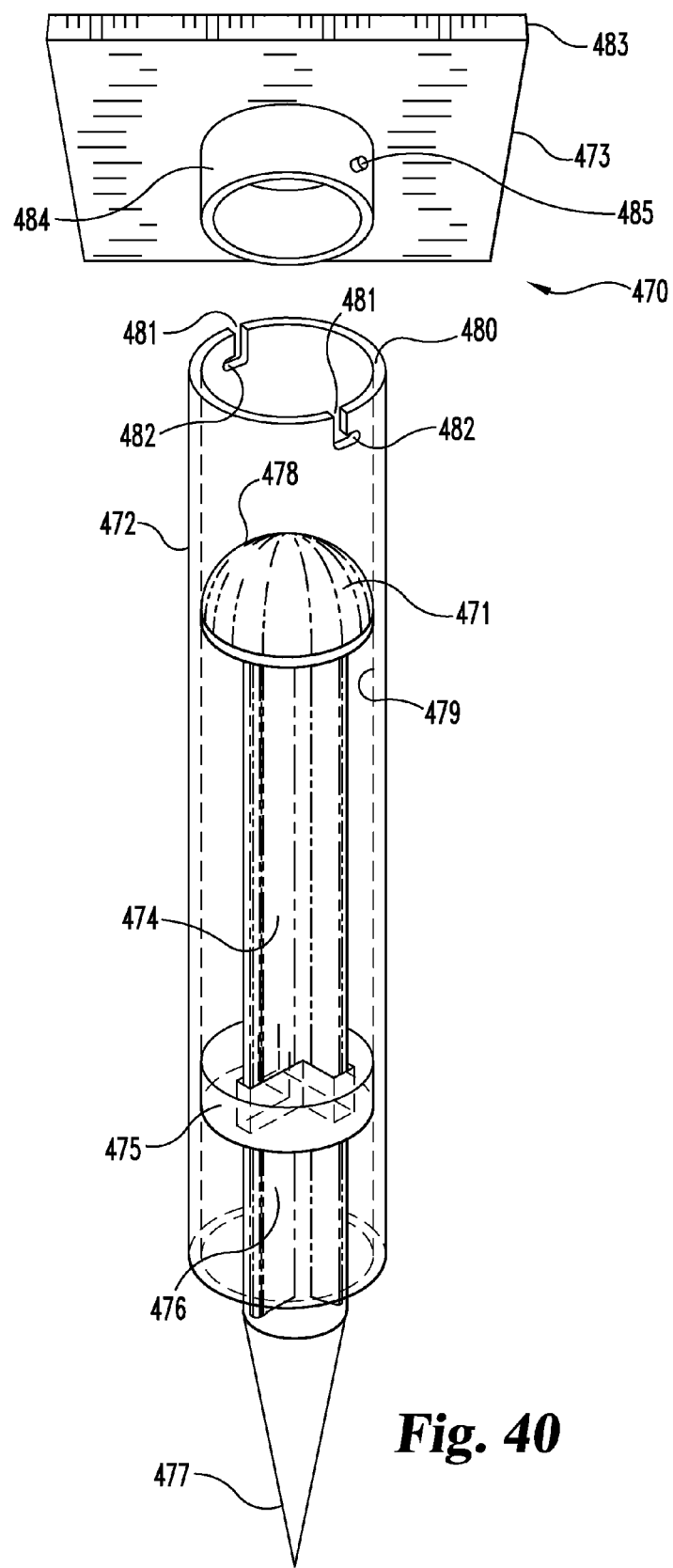
FIGS. 40-43 provide exploded perspective views of further post mount assemblies of the invention having a uniquely equipped post.

With reference now to FIG. 40, shown is another post mounting system of the invention. Shown is system 470 including a supporting stake or post 471, a sleeve 472 supported by the post 471, and a mounted implement 473 mounted atop the sleeve 472. Mounted implement 473 can, for example, be a relatively simple mounting plate for in turn mounting any of a number of implements, or can itself be a more complex implement such as a birdhouse. Post 471, the structure and uses of which form a part of the present invention, includes a first body portion 474, a sleeve-engaging member 475, and a second and lower body portion 476. Sleeve-engaging member 475 occurs at an intermediate position along the length of the post 471 as a whole, and is configured with external surfaces that engage inner surfaces of sleeve 472 to support and stabilize the position of sleeve 472 when mounted over post 471. One, two, or more such members 475 can be provided along the length of post 471. Post 471 has a penetrating point 477 at its lower end configured for penetrating a supporting material such as the ground. Post 471 also has an upper cap 478 configured and effective for receiving a driving force to drive the post 471 into the ground or other supporting material. Cap 478 can, like sleeve-engaging member 475, have external surfaces sized and configured to engage the inner surface of sleeve 472. The outermost surfaces of member 475 and/or cap 478 can, for example, be sized and contoured to match those of the inner surface of sleeve 472, to achieve a snug, supporting frictional engagement therebetween. In the illustrated system, the inner surface of sleeve 472 and the outermost surfaces of member 475 and cap 478 are circular in cross-section and sized to fit snugly against the circular cross-section of the inner surface of sleeve 472. This is illustrated at positions 479 shown in FIG. 40. It will be understood that in other embodiments, the inner surface of the sleeve 472 and the outermost surfaces of member 475 and cap 478 can have other cross sections, including for example having an oval, square, rectangular or other polygonal cross-section.

With continued reference to FIG. 40, sleeve 472 has an upper end 480 having means thereupon for engaging mounted structure 473. In the illustrated system, upper end 480 includes the female component of a "lock ring" system, thus including two or more generally "L"-shaped slots having a first region 481 and a second region 482 including a portion extending laterally with respect to region 481. Supported structure 473 includes a bottom piece 483 having a downwardly-extending collar 484 attached thereto, e.g. by integral molding or other physical attachment mechanisms. Collar 484 includes projections such as pins 485 or knobs that are receivable into slot regions 481, whereafter structure 473 can be rotated to lodge pins 485 in laterally-extending slot regions 482. In this manner, structure 473 is mounted upon and secured to sleeve 472. To remove the mounted structure 473, the rotating motion is reversed and the structure 473 simply lifted from the sleeve 472. In this manner, birdhouses or other implements can be conveniently mounted atop system 470 and removed and/or replaced quickly and efficiently.

Figure 41:
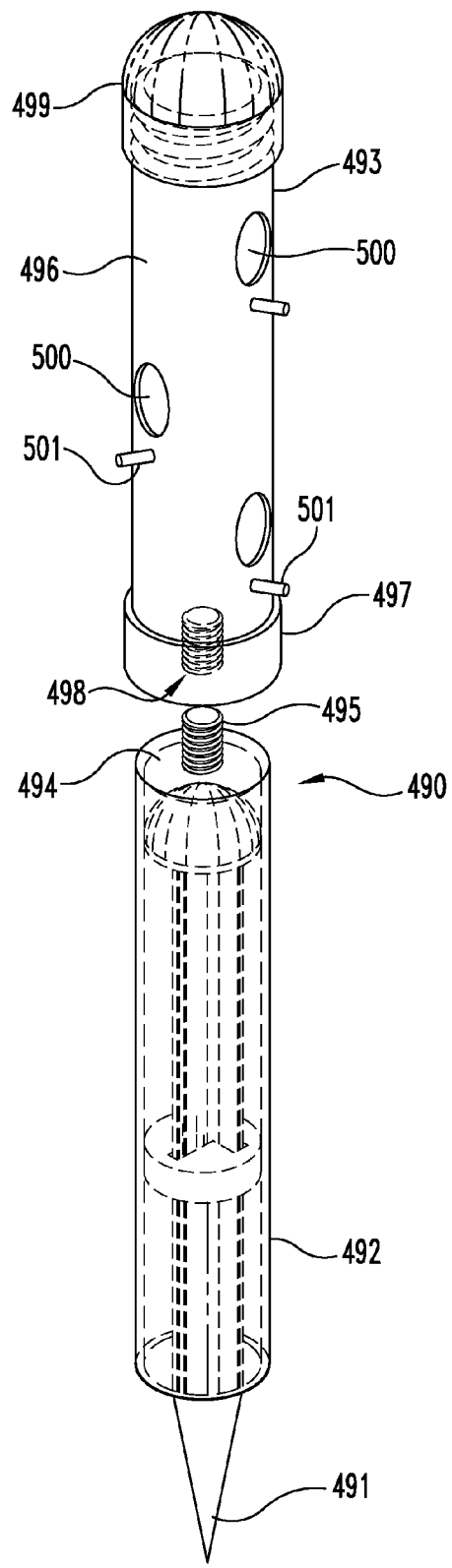

With reference to FIG. 41, shown is another post-supported mounting system 490 of the invention. System 490 includes a post 491 and sleeve 492 the relevant components of which are designed and cooperatively arranged as described for post 471 and sleeve 472 of FIG. 40 above. System 490 also includes a tubular birdfeeder structure 493. Sleeve 492 has an upper end 494 including an integral or otherwise attached threaded bolt portion 495. Birdfeeder 493 includes a tubular enclosure 496 having a lower collar member 497 with a threaded orifice 498 defined in the bottom surface thereof. Threaded orifice 498 provides for a threaded attachment of feeder 493 onto threaded bolt portion 495. Desirably, feeder 493 is threadable onto bolt 495 sufficiently to abut the lower surface of collar 497 against the upper surface 494 of sleeve 492 to participate in the support of the feeder 493. Feeder 493 also has a removable upper cap 499, which can for example be threaded or pulled off in order to add feed to the feeder 493. Feeder 493 also includes a plurality of feed stations having openings 500 providing access to the feed within the tube 496, with the feed stations also potentially including perch structures 501. It will be understood that while in the embodiment shown a threaded attachment of feeder 493 to sleeve 492 is depicted, other attachment mechanisms between these two structures, including those others described herein, can be used to achieve the attachment.

Figure 42:
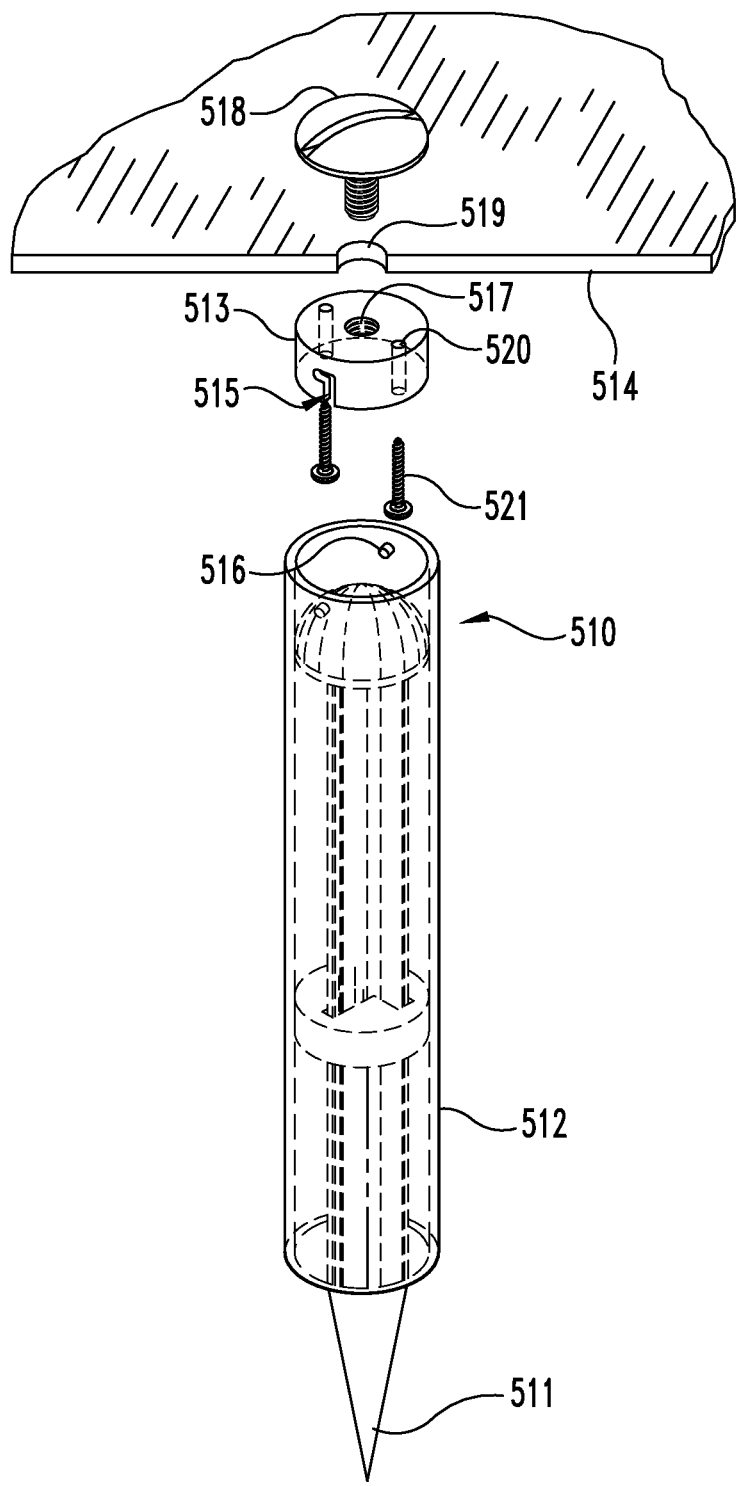

FIG. 42 depicts another post-supported mounting system 510 of the invention. System 510 includes a post 511 and a sleeve 512 which in relevant portions are designed and arranged to cooperate as described for post 471 and sleeve 472 in FIG. 40. System 510 also includes a cap member 513 mountable atop sleeve 512, which can further be used to attach an implement 514 such as a mount plate or birdhouse or other useful structure. Cap member 513 includes features suited to a lock-ring style attachment to sleeve 512. For this purpose, cap member 513 can include two or more generally "L"-shaped slots 515 which cooperate with ends 516 or other protuberances on the upper end of sleeve 512, to connect cap member 513 to sleeve 512. Cap member 513 also includes a threaded bore 517 generally centrally located therein. Threaded bore 517 can cooperate with a threaded screw or bolt 518 to attach implement 514 to cap member 513 by receipt of the threaded portion of bolt 518 through orifice 519 in implement 514, with the threaded portion of bolt 518 then being threaded into threaded bore 517 of cap member 513. To achieve additional securement of cap member 513 to implement 514, cap member 513 can include a plurality of additional holes 520 through which connectors 521 such as screws can be inserted and driven into and potentially through a lower member of implement 514. In one mode of use, cap member 513 can be assembled to implement 514 using the mechanisms shown, and thereafter this assembled structure mounted to sleeve 512 in a lock-ring fashion as discussed above.

Figure 43:
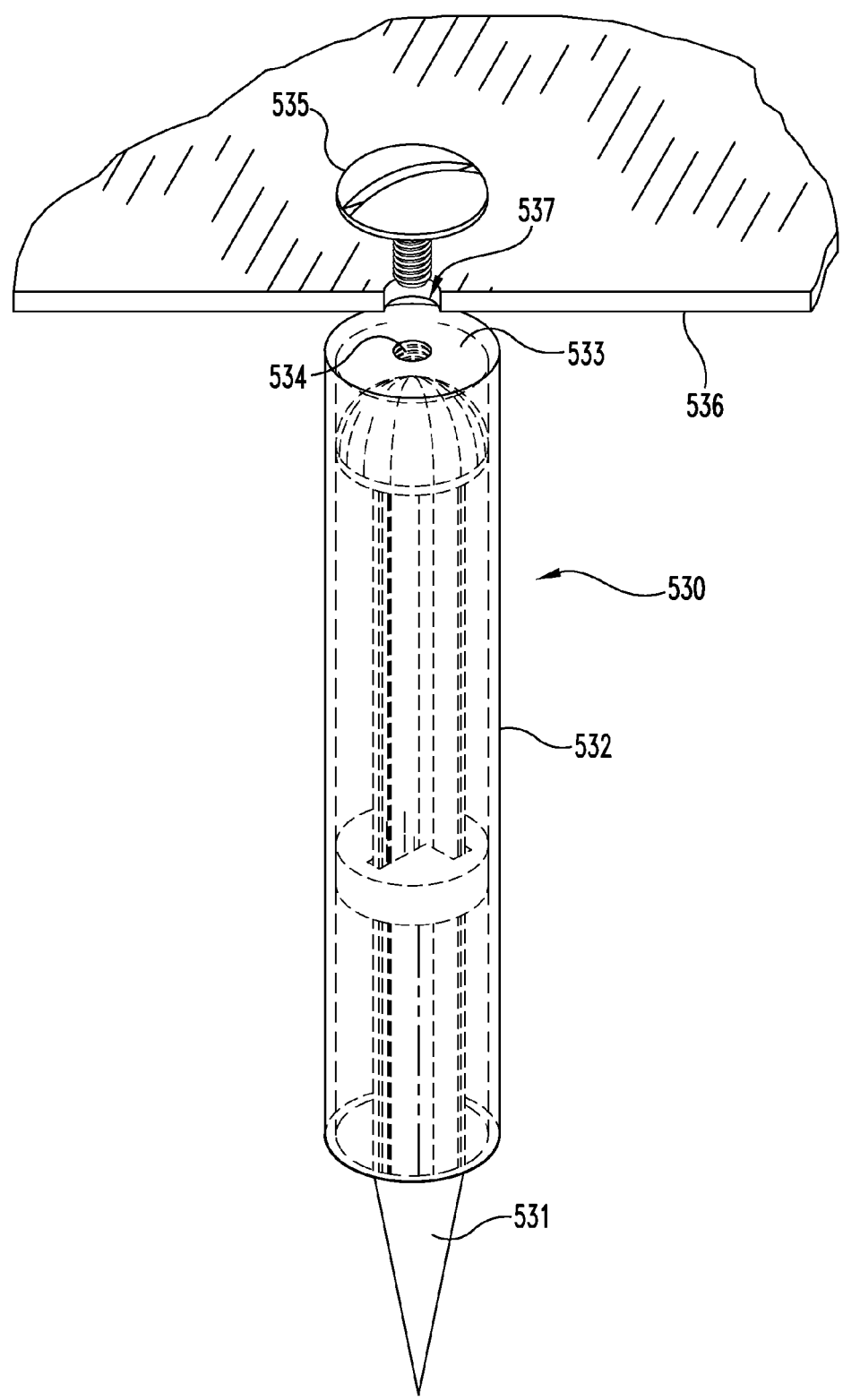

With reference to FIG. 43, shown is another post-supported mount system 530 of the invention. System 530 includes a post 531 and sleeve 532 which are configured and cooperate as described as for post 471 and sleeve 472 of FIG. 40. Sleeve 532 includes an upper end 533 having a threaded bore 534 centrally located therein. In this fashion, sleeve 532 can be assembled and arranged to support an implement 536 such as a mount plate, birdhouse, or other structure, by receipt of a threaded connector such as a bolt 535 through an opening 537 in structure 536, with the threaded portion of bolt 535 thereafter being threadedly engaged with threaded bore 534.

Figure 44A:
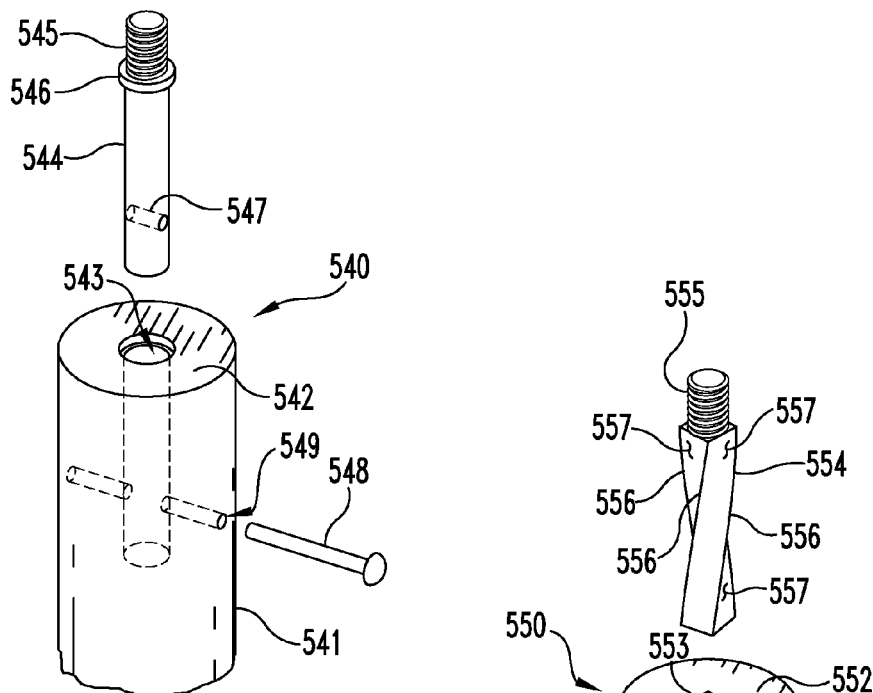
FIGS. 44A-44C provide exploded perspective views of further post mount assemblies of the invention having secondary structures threadably connectable to implements to be supported.
Figure 44B:
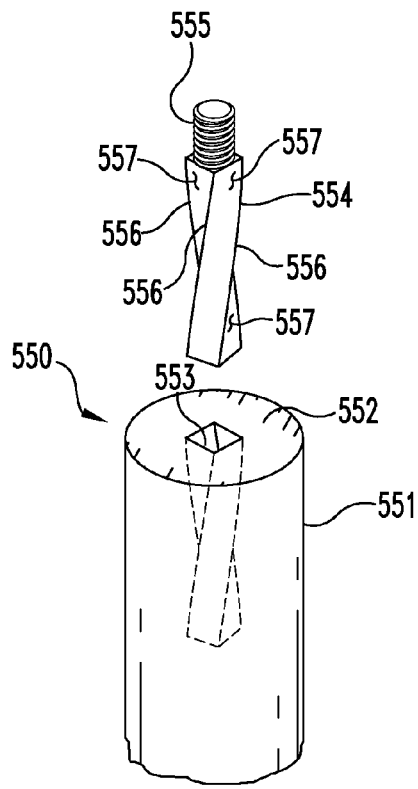
Figure 44C:
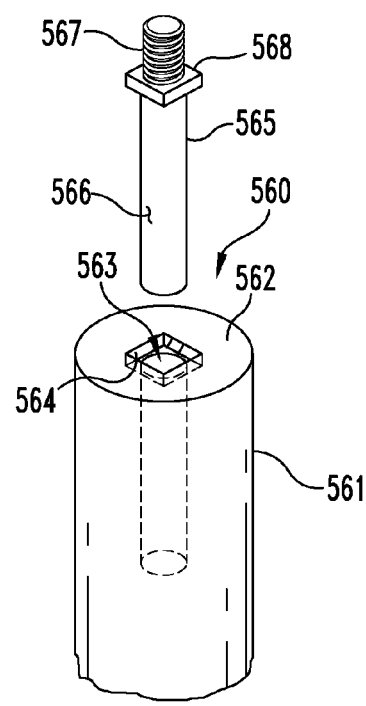

FIGS. 44A, 44B, and 44C depict several arrangements for mating a product to a support post by use of a first piece that engages (e.g. threadably engages) the product and which also engages the tube or sleeve member supported by the support post. In this regard, for each of the systems depicted in 44A-44C, the configuration and cooperable arrangement of the tube or sleeve and the post can be the same as that depicted in FIG. 40. Referring now to FIG. 44A, shown is a mounting system 540 that includes a post-mounted sleeve 541 having an upper end 542. Upper end 542 includes a generally centrally located hole or bore 543 for cooperating with a secondary post element 544 in turn to be connected to the product or implement to be supported. Secondary post element 544 includes an upper end having an engagement mechanism for engaging the product or implement of interest. In the illustrated device, secondary post element 544 includes a threaded portion 545 for threadably engaging the implement to be supported. Element 544 also includes a collar 546 having a dimension greater than that of opening 543 such that collar 546 will abut upper surface 542 of sleeve 541 when secondary post element 544 is inserted into opening 543. Secondary post element 544 also includes a transversely-extending orifice 547 extending through its body for receipt of a pin 548 to resist rotational movement of element 544 when mounted within sleeve 541. That is, after insertion of secondary post element 544 into opening 543, with the collar 546 abutting upper surface 542, pin 548 can be passed through an opening 549 in the side wall of sleeve 541 and through orifice 547 to prevent rotation of element 544. In use, it will be understood that the product or implement can be attached to secondary post element 544 prior to, during or after the placement of secondary post element 544 into orifice 543 of sleeve 541.

FIG. 44B depicts another embodiment of a secondary post element 554. Element 554 includes a threaded upper portion 555 positioned atop a body having a spiraling or twisted rectangular shape. Such body includes a plurality of elongate corners 556 with faces 557 therebetween. Corners 556 traverse in a helical path as they travel in a vertical direction. Opening 553 in the upper surface 552 of sleeve 551 is correspondingly shaped so as to receive secondary post element 554 in a rotating fashion. In this manner, upon full receipt within opening 553, secondary post element 554 cannot be rotated absent overcoming at least in part the forces of gravity. This stabilizes secondary post element 554 within opening 553. As discussed in connection with FIG. 44A, the implement or product to be supported atop secondary post element 554 can be attached to such element before, during or after securement of element 554 within opening 553 in mounting system 550.

With reference to FIG. 44C, shown is another mounting system 560 of the invention. Mounting system 560 includes a post-supported sleeve 561 having an upper end 562. Upper end 562 includes a generally centrally located orifice 563 surrounded by a shaped opening 564, desirably in the shape of a polygon such as a rectangle, including for instance a square, as depicted. System 560 also includes a secondary post element 565 having a generally cylindrical body 566 and a threaded portion 567 at an upper end thereof. Element 565 also includes a shaped collar portion 568, desirably corresponding in shape to the opening 564 of sleeve 561. In this fashion, the body 566 of secondary post element 565 can be inserted into central opening 563 until shaped collar 568 is securely received within shaped opening 564. The cooperation of collar 568 and opening 564 will prevent or inhibit rotational motion of secondary post element 565 when thus mounted to sleeve 561.

Figure 45:
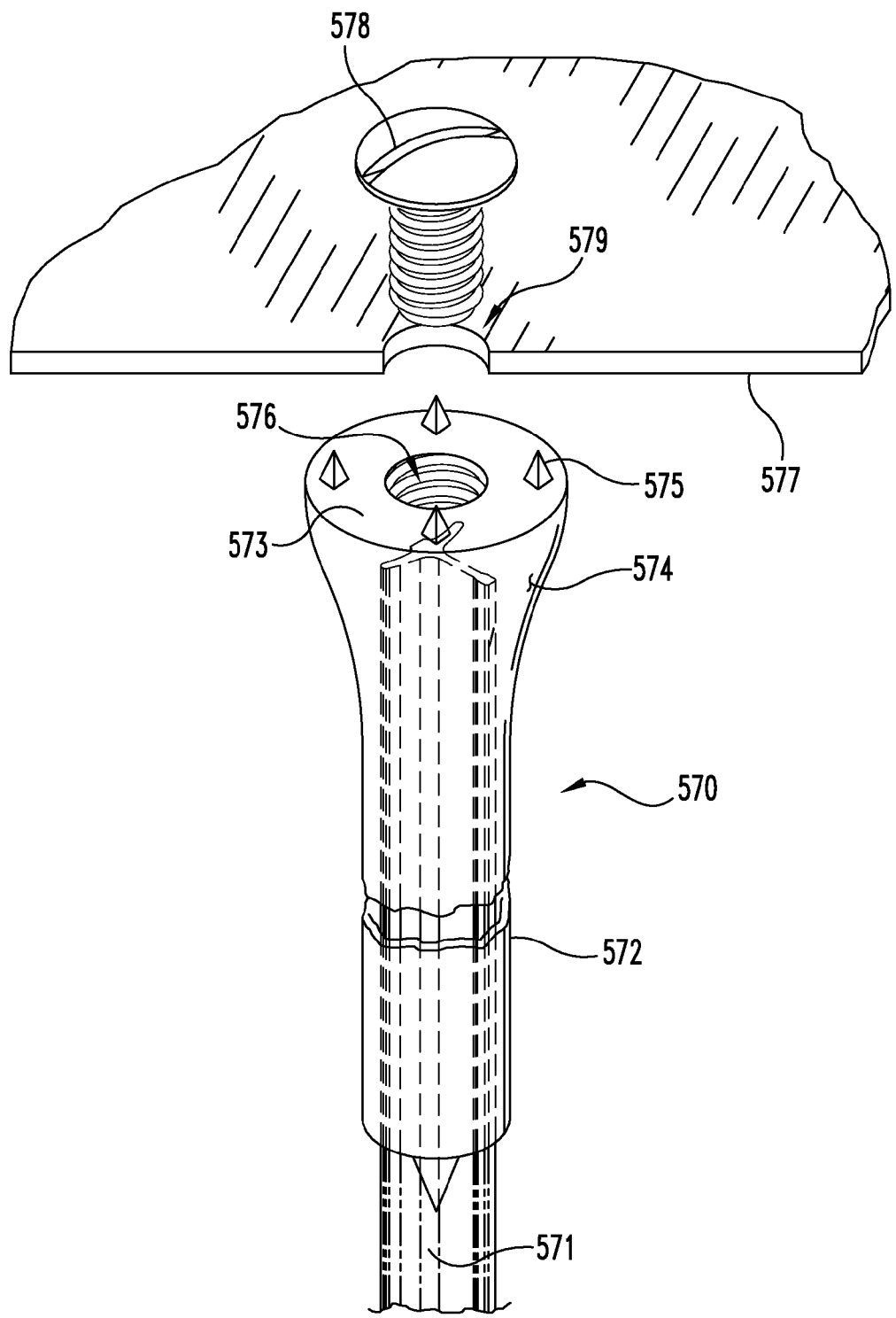
FIGS. 45 and 46 provide perspective views of further post mount assemblies of the invention having upwardly directed bearing surfaces.

FIG. 45 depicts another mounting system 570 of the invention. System 570 includes a post 571 and sleeve 572 which can cooperate as do those components described in FIG. 40. Sleeve 572 includes an upper end having an upper surface 573 generally enlarged in cross-section as compared to that of the main body of sleeve 572. Thus, sleeve 572 includes a portion 574 of transitioning and enlarging cross-sectional dimension at or near its upper end. Sleeve 572 further includes a plurality of upwardly-directed teeth, spikes or other penetrating protuberances 575. Sleeve 572 also includes a centrally located, threaded bore 576 positioned in the upper surface 573 thereof. In use, a mount plate, birdhouse or other implement having a lower member 577 is mounted to the sleeve 572 by use of a threaded bolt or other member 578 which is passed through opening 579 in lower member 577 and threaded into threaded bore 576 of sleeve 572. In so doing, teeth 575 partially or fully penetrate lower member 577 to enhance the integrity of the mount, including adding resistance to rotational movement of the member 577 relative to the sleeve 572.

Figure 46:
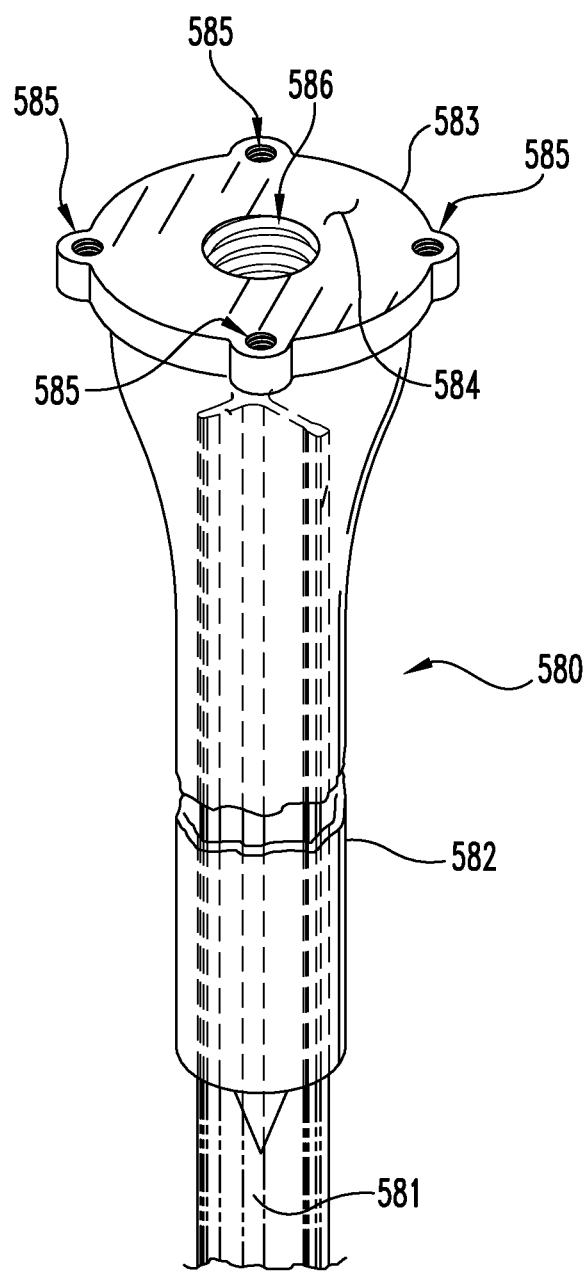

Referring now to FIG. 46, shown is a mount system 580 similar in many respects to system 570 of FIG. 45. System 580 thus includes a post 581 engaging a sleeve 582 as described for FIG. 45. Sleeve 582 has an upper end 583 presenting an upper mount surface 584. A plurality of openings extend through upper end 583 for receipt of connectors such as screws or bolts therethrough. In addition, upper end 583 includes a generally centrally located threaded bore 586. In use, system 580 is used to mount an implement in a similar fashion as that described in connection with FIG. 45, except that instead of securement with penetrating teeth 575, a plurality of connectors are passed through holes 585, e.g. from below, and penetrate into a lower surface of the implement to be mounted. Connectors could of course also be passed through holes 585 from above if desired. Such connectors can, for example, be screws or bolts.

Figure 47:
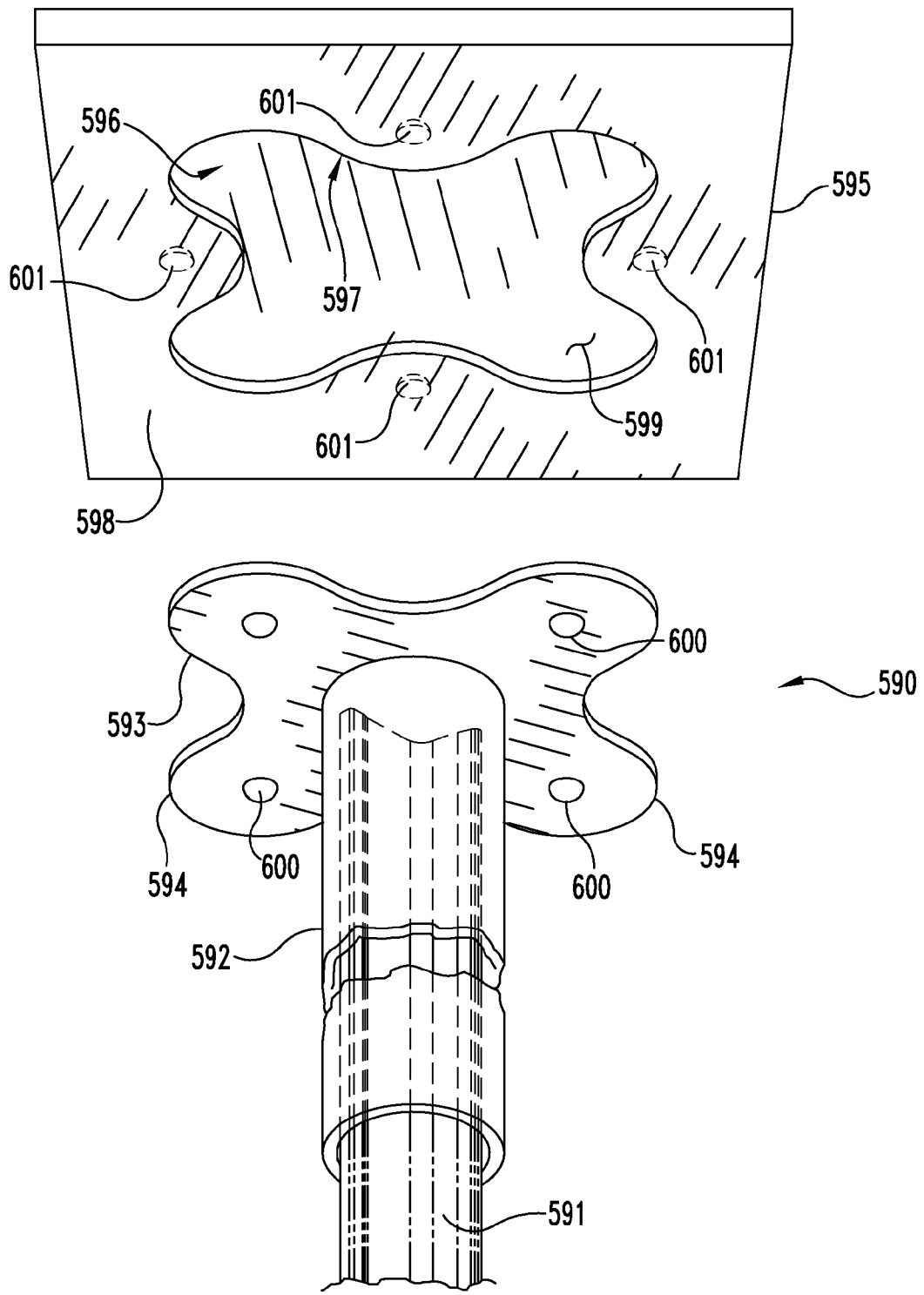
FIG. 47 provides a perspective view of a further post mount assembly of the invention having an upper post portion receivable and rotatable within a recess in the mounted implement.

FIG. 47 shows another mounting system of the invention. Mounting system 590 includes a post 591 and sleeve 592 combination, which engage and cooperate as described in connection with FIG. 40. Sleeve 592 has an upper end 593 which presents a plurality of radially-extending projections 594. A mount plate 595 or lower member of another implement to be mounted includes a shaped opening 596 at the bottom surface thereof. Shaped opening 596 corresponds to the size and shape of upper end 593 of sleeve 592, such that upper end 593 can be received within shaped opening 596. Mount plate or other implement member 595 includes a slotted or recessed space 597 defined between an outermost wall member 598 and an inner wall member 599, such that once received within shaped opening 596, upper end 593 of sleeve 592 can be rotated so as to pass projections 594 underneath portions of outermost wall 598 to be received between outermost wall 598 and inner wall 599. Further, projections 594 each include a knob or other raised portion 600 which indexes into corresponding indentations or openings 601 of inner wall 599 to provide a detent fit. In this fashion, relative rotation of the mount plate or other member 595 and the upper end 593 of sleeve 592 will be stopped at this index position, to achieve a secure mount of the mount plate 595 or other implement to the sleeve 592. To remove such mount, mount plate or other implement 595 can be forcibly rotated again to overcome the detent and align the shapes of opening 596 and upper end 593, whereupon mount plate or other implement 595 can be detached from sleeve 592.

Figures 48, 49:
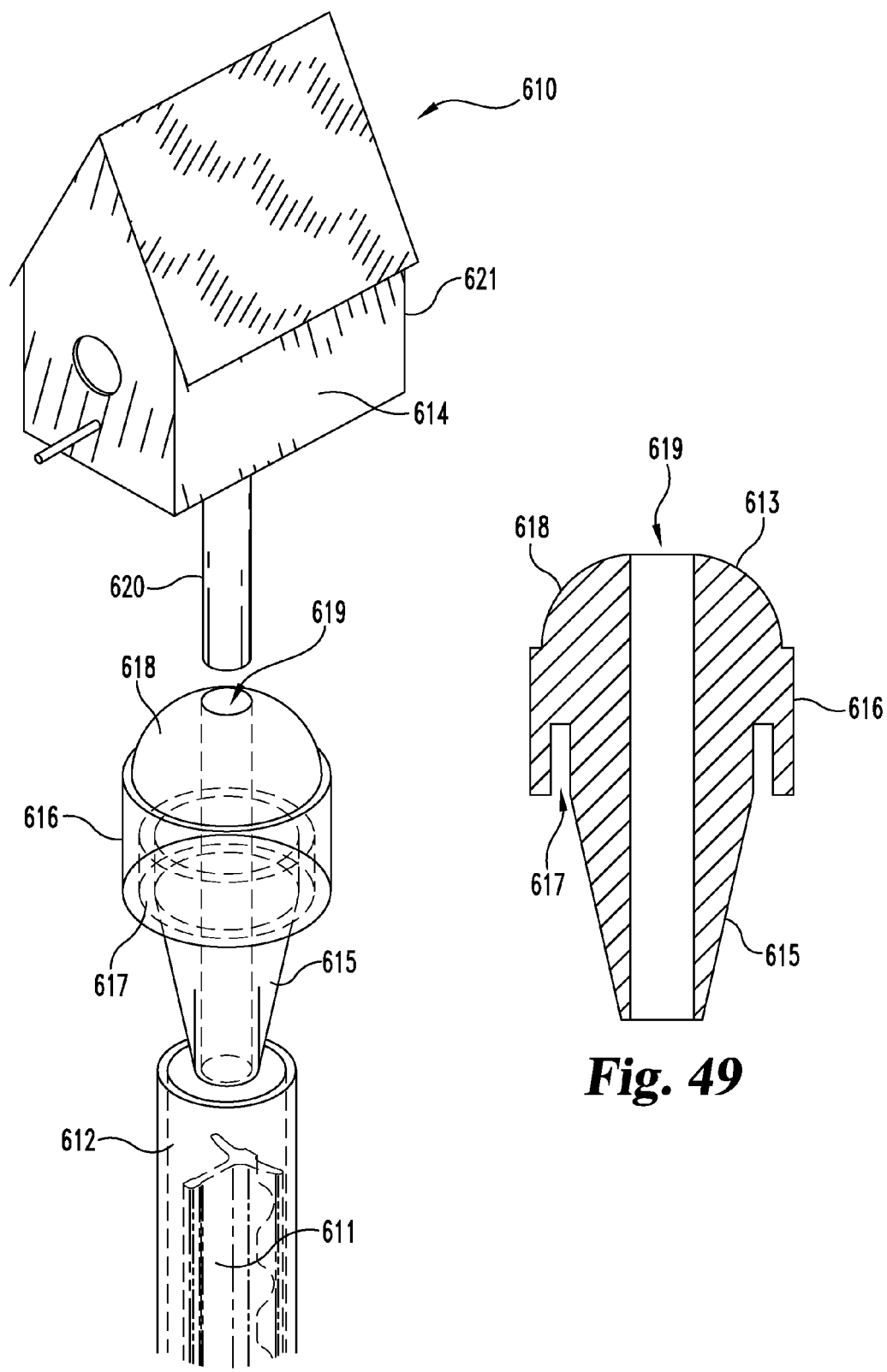
FIG. 48 provides a perspective view of a further post mount assembly of the invention including a post-mounted sleeve and cap member.
FIG. 49 provides a cross-sectional view of the cap member shown in FIG. 48.

With reference to FIGS. 48 and 49, shown is another post mounting system 610 of the invention. System 610 includes a T-post 611 and a sleeve 612 received therearound. System 610 also includes a capping member 613 received atop sleeve 612, and a birdhouse 614 or other useful implement mounted to capping member 613. Capping member 613 includes a lower portion 615 for receipt within sleeve 612, which can for example be a tapered portion. Capping member 613 also includes a collar 616 to be received over an upper portion of sleeve 612 against an outer surface thereof. Collar member 616 and inner body portions 615 define a slot 617 for receiving the upper end of sleeve 612. Capping member 613 also includes an externalized portion 618 residing outside of sleeve 612. A generally centrally located bore 619 passes through capping member 613. Bore 619 is sized and configured to receive a downwardly extending post 620 on implement 614, with the implement 614 being or comprising a birdhouse 621 or other potential structure. In use, it can be seen that system 610 provides a convenient mounting system for removable support of an implement 614. As well, it will be understood that as an alternative to a T-post such as post 611, sleeve 612 could be supported by other post members, for example a post such as post 471 of FIG. 40.

Figure 50:
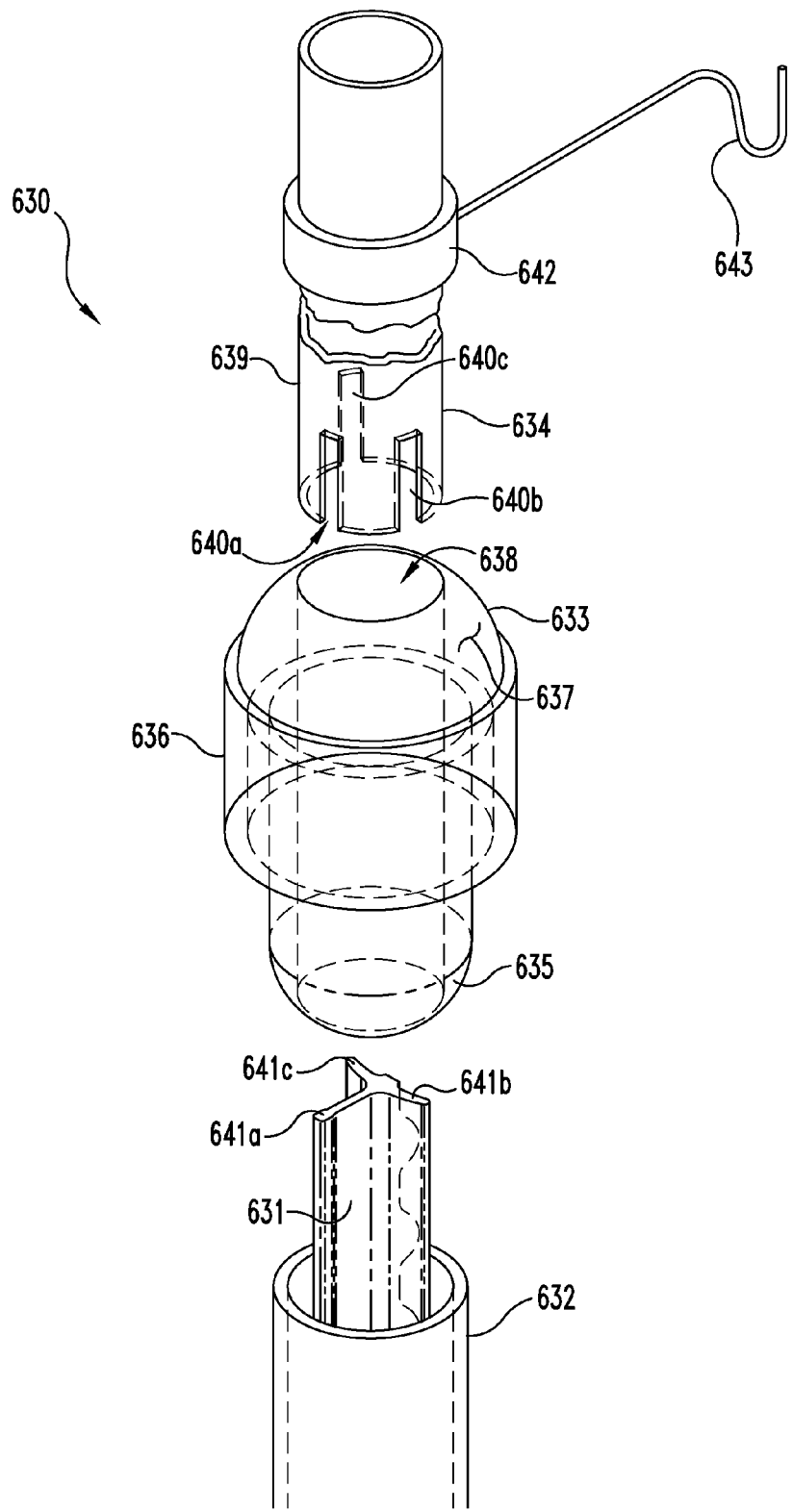
FIG. 50 provides a partial cutaway perspective view of another post mount assembly of the invention including a post-mounted sleeve and cap member.

FIG. 50 depicts another post mounting system of the invention. Post mounting system 630 includes a T-post 631 or other similar post, a sleeve 632 supported by the T-post 631, a capping member 633 received atop sleeve 632, and a supported implement 634 received atop capping member 633. Capping member 633 includes a first portion 635 for receipt within the sleeve 632, a collar portion 636 for receipt around the external surface of sleeve 632, and an externalized portion 637 for residing above and external of sleeve 632. Cap member 633 includes a generally centrally located bore 638 for cooperating with a post 639 of implement 634. Post 639 is configured not only for receipt through opening 638, but also to engage T-post 631 to improve the integrity and strength of the mounting system. In the depicted embodiment, post 639 is formed of a generally hollow tubular material and includes a plurality of slots 640a, 640b, and 640c which are sized to slip over radially extending arms 641a, 641b, and 641c, respectively, of T-post 631. In this fashion, to achieve a strong and secure mount of implement 634, post 639 can be passed through opening 638 until slots 640a-640c pass over and engage arms 641a-641c, respectively. Post 639 can then support any number of useful implements, including for example perching and/or entertainment articles for birds. In one manner of supporting such articles, a collar 642 can be secured to post 639 and support a bird-related or other accessory 643.

Figures 51, 51A:
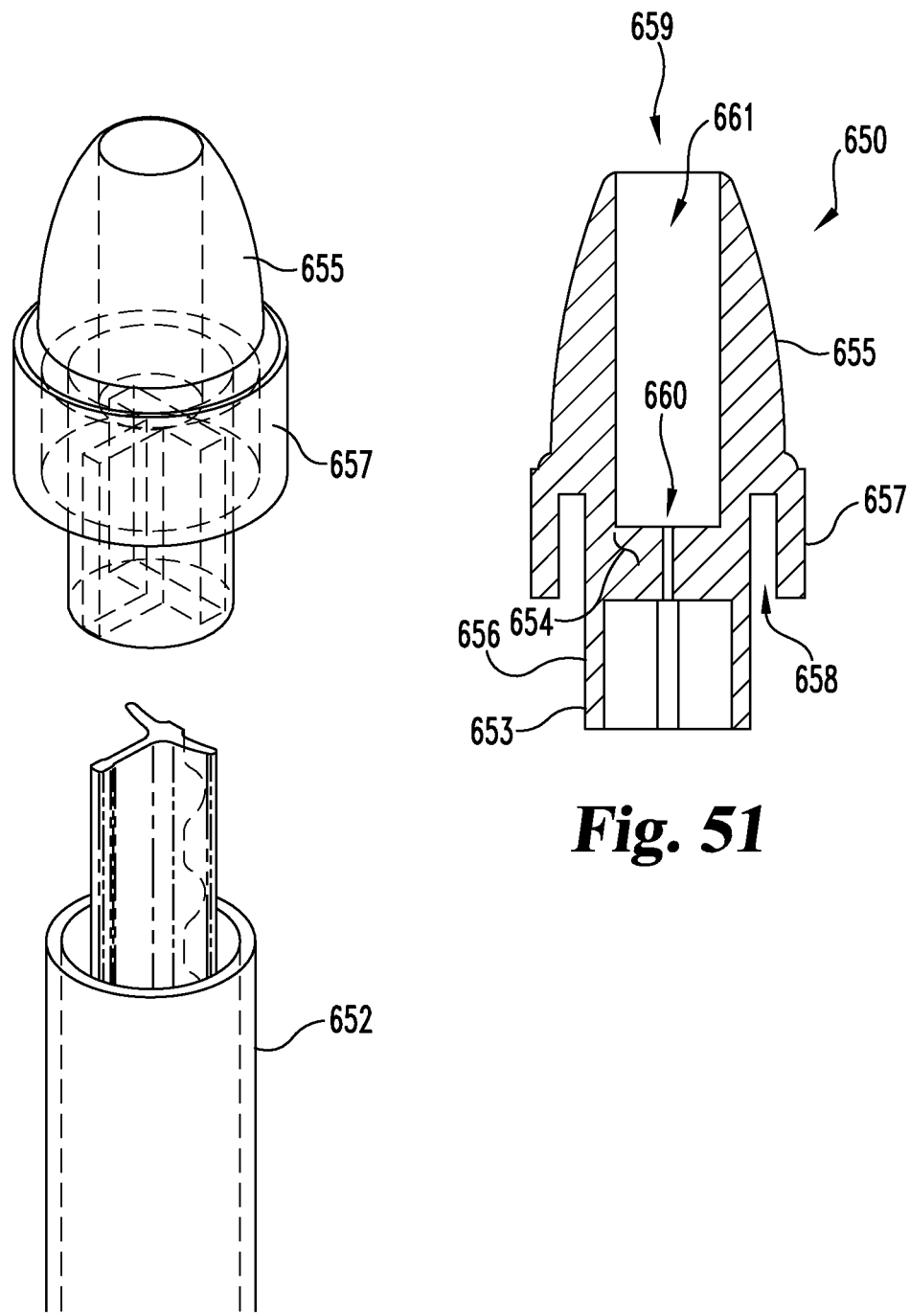
FIG. 51 provides a cross-sectional view of another post mount assembly of the invention including a post-mounted sleeve and cap member.

With reference to FIGS. 51 and 51a together, depicted is another post mounting system 650 of the invention. System 650 includes a T-post 651 and sleeve 652 generally as discussed hereinbefore. System 650 also includes a capping member 653 having a generally solid body 654. Capping member 653 includes an external portion 655, an internal portion 656 for receipt within sleeve 652, and a collar 657. Collar 657 defines a slot 658 between itself and internal portion 656, for receiving the upper end of sleeve 652. Capping member 653 also defines an internal bore 659 for cooperating with a post of an implement to be mounted. Capping member 653 also includes an internal void 661 corresponding to the shape of T-post 651 for frictional engagement thereof. Preferably, at the bottom of bore 659 there is located a weep hole 660 for passing any fluids that may collect within opening 659 into internal void 661 and thus downwardly through the structure of system 650. Post 662 of implement to be mounted is received within opening 659 of cap member 653. Post 662 can, for example, support bird-related, garden ornamental, or other accessories through a plurality of mounted collars 663 supporting laterally-extending branch accessories 664, which in turn can support other accessories such as platform 665.

Posts and other components of embodiments of the invention can be made from any suitable materials, including for example metals and/or plastics. In certain embodiments, footing elements, sleeve elements, capping elements, crossboards, fencing panels, and other similar elements described herein are made of tough plastic materials and/or of metals, e.g. cast metals. Especially in the case of elements used for fencing, but also potentially other elements, a reinforced plastic material can be used, such as fiberglass or wood fiber reinforced plastics. The polymeric material in the plastics can be any suitable material including for instance polyvinyl chlorides (PVC), polyesters, polyethers, polystyrenes, natural or synthetic rubbers, polyolefins, or copolymers of these or any other suitable polymer material. The elements formed of these plastics material can carry surface patterning and/or pigment, e.g. a wood grain surface pattern in the case of fencing or other components described herein. These and other variations will be apparent to those of ordinary skill in the art from the descriptions herein.

Figure 52:
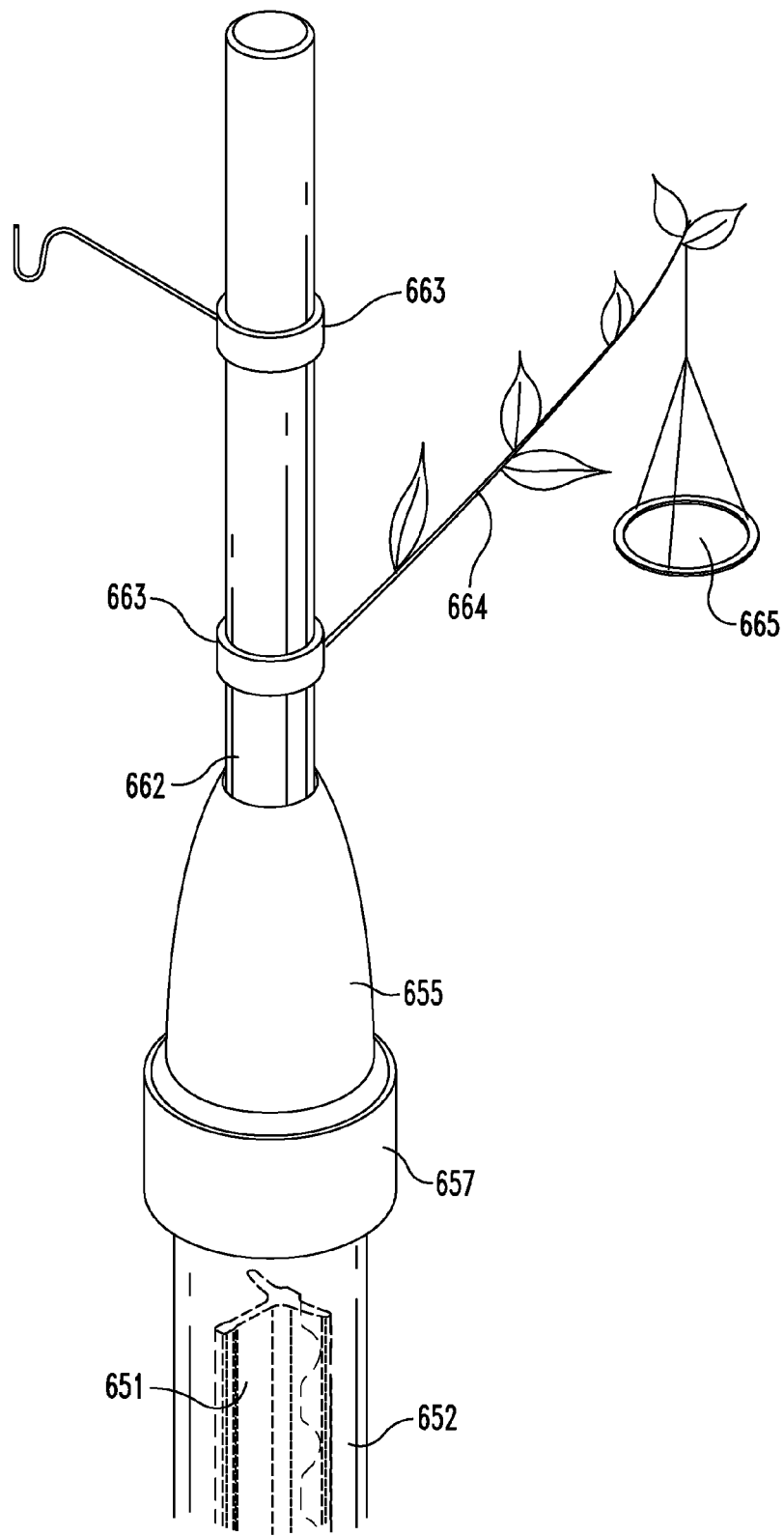
FIG. 52 provides a perspective view of the assembly of FIG. 51 supporting a bird-related accessory.

It will be appreciated that a variety of inventive embodiments are encompassed within the structures set out in FIGS. 1 through 52 above. However, it should be understood that the inventive embodiments disclosed herein are not limited to the specific, disclosed structures. For example, in one aspect, the present invention provides a capping accessory for receipt atop an underlying T-post, which mates with the T-post via a defined internal opening in the shape of a T-post. In such embodiments, in the region defining the internal opening, the capping member benefits by having a solid cross-section apart from the defined T-post-shaped opening. In this fashion, a sturdy, long-lasting structure is provided.

In other aspects, T-post mounted accessories of the invention are provided as multi-purpose mounting structures, with either horizontal or vertical bearing surfaces against which secondary accessories can be mounted using mounting apertures defined in the bearing surfaces. Additional inventive aspects disclosed herein involve the use of multiple associated T-posts, such as dual T-post structures, to provide a more robust post element for use in supporting any of a variety of T-post mounted accessories as disclosed herein.

Still further aspects broadly involve T-post mounted accessories which are suited to support adjacent objects such as trees, or to receive ropes or wires which can be used in multiples to cordon off areas. Still further embodiments relate broadly to fencing systems having posts supported by T-posts, and cross boards extending between the T-posts. Such systems can be rapidly and inexpensively installed, for example as residential fences, privacy fences, horse fences, commercial fences, and the like. The use of dual T-post assemblies in fence structures such as those disclosed creates a sturdier, longer-lasting structure. As well, the use of T-post reinforced cross boards strengthens such fences.

In other aspects, novel systems and assemblies are provided which can use T-posts or other posts as support structures. Illustratively, in certain embodiments, post-supported structures include a capping element received atop the post, a sleeve, and a footing element. These elements can mate to cover and preferably conceal the T-post or other post structure of the assembly. In still further embodiments, accessory mounting systems can utilize posts or wall-mount features, desirably in such situations wherein the accessory is a birdhouse, a windchime, a sun catcher, a thermometer, a sun dial, a wind-driven ornament, or the like. In addition, birdhouse mounting systems which provide for a removable mount of the birdhouse to a wall or a T-post or other post structure are provided which include first and second mounting elements that cooperate with one another for the removable mount. In favored designs, cooperation is achieved through corresponding trapazoidally shaped wedges and openings which provide a secure gravity mount of accessories such as birdhouses.

In still other inventive aspects, unique and convenient attachment systems between post-mounted sleeve elements and implements to be mounted are provided, which in some cases provide securement against vertical and/or rotational displacement from their intended, mounted position. As well, advantageous post mounting assemblies include posts, including T-posts or other posts, that are adapted to stably support a sleeve member thereover, potentially with the post especially adapted to stably support and potentially prevent rotation with a mating sleeve structure. In certain aspects, such posts include one or more elements along the length of the post that frictionally engage the inner surface of a sleeve member to stabilize the same when mounted over the post. These and other inventive aspects of the assemblies and components depicted and described herein will be appreciated by those of ordinary skill in the art.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A post mount assembly, comprising:
    a post structure for receipt in the ground;
    a sleeve structure received over said post structure, said sleeve structure having a longitudinal axis and a shaped upper end presenting an upwardly facing bearing surface;
    an implement having a wall member, wherein said wall member defines an opening for receiving said shaped upper end;
    said wall member also defining a recess between a generally planar face of a first wall portion and a generally planar face of a second wall portion, said recess communicating with said opening; and
    wherein said shaped upper end of said sleeve structure has portions that are lodgeable in said recess upon inserting said shaped upper end into said opening and rotating said wall member relative to said shaped upper end around said longitudinal axis of said sleeve structure.

2. The post mount assembly of claim 1, wherein said shaped upper end comprises a plurality of radially-extending projections.

3. The post mount assembly of claim 1, wherein said shaped upper end and said recess are configured to cooperate to provide a detent to resist rotation therebetween.

4. A post mount assembly, comprising:
    a primary post structure for receipt in the ground;
    a sleeve structure receivable over said post structure;
    a cap member mountable at an upper end of said sleeve structure, said cap member defining an opening;
    a secondary post structure receivable in said opening;
    an implement supported or supportable by said secondary post structure; and
    wherein said cap member is sized and configured to engage both said sleeve structure and said primary post structure when mounted at the upper end of said sleeve structure.

* * * * *